US006877284B2

(12) United States Patent
Thompson

(10) Patent No.: US 6,877,284 B2
(45) Date of Patent: Apr. 12, 2005

(54) RETROFIT HURRICANE AND EARTHQUAKE PROTECTION

(76) Inventor: Thomas C. Thompson, 92-543 Kokole Pl., Makakilo, HI (US) 96707

( * ) Notice: Subject to any disclaimer, the term of this patent is extended or adjusted under 35 U.S.C. 154(b) by 61 days.

(21) Appl. No.: 09/794,931

(22) Filed: Feb. 28, 2001

(65) Prior Publication Data

US 2002/0139080 A1 Oct. 3, 2002

Related U.S. Application Data

(60) Division of application No. 09/131,871, filed on Aug. 10, 1998, now Pat. No. 6,324,810, which is a continuation-in-part of application No. 08/578,081, filed on Dec. 26, 1995, now abandoned, which is a continuation-in-part of application No. 08/191,852, filed on Feb. 2, 1994, now abandoned.

(51) Int. Cl.[7] .................................................. E04B 1/38
(52) U.S. Cl. .............................. 52/112; 52/700; 52/712; 52/715
(58) Field of Search .......................... 52/23, 700, 712, 52/547, 520, 92.2, 93.1, 167.1, 715, 693, 112; 403/389; 411/466, 478

(56) References Cited

U.S. PATENT DOCUMENTS

| | | | | | |
|---|---|---|---|---|---|
| 1,280,173 | A | * | 10/1918 | Butler | |
| 2,724,960 | A | * | 11/1955 | Nelsson | 72/118 |
| 4,570,407 | A | * | 2/1986 | Palacio et al. | 52/693 |
| 4,896,985 | A | * | 1/1990 | Commins | 403/11 |
| 5,150,553 | A | * | 9/1992 | Commins et al. | 52/264 |
| 5,595,031 | A | * | 1/1997 | Commins | 52/264 |
| 5,885,024 | A | * | 3/1999 | Zupan et al. | 403/389 |
| 6,209,280 | B1 | * | 4/2001 | Bruce et al. | 52/702 |
| 6,295,780 | B1 | * | 10/2001 | Thompson | 52/712 |

* cited by examiner

Primary Examiner—Carl D. Friedman
Assistant Examiner—Basil Katcheves

(57) ABSTRACT

Retrofit connectors that secure together the outside sheathing and underlying structural members of wood-frame or masonry houses, preventing damage when subjected to lateral stresses from a hurricane, or transverse loads from an earthquake. The connectors have special bushings and bearing surfaces that tie the outside sheathing and underlying structural members together, but allow deflection, and transfer of energy to other structural members. Different embodiments of the connectors allow them to adapt to most wood-frame and masonry homes, and to most roof pitches.

8 Claims, 44 Drawing Sheets

LEFT SIDE FACING HOUSE

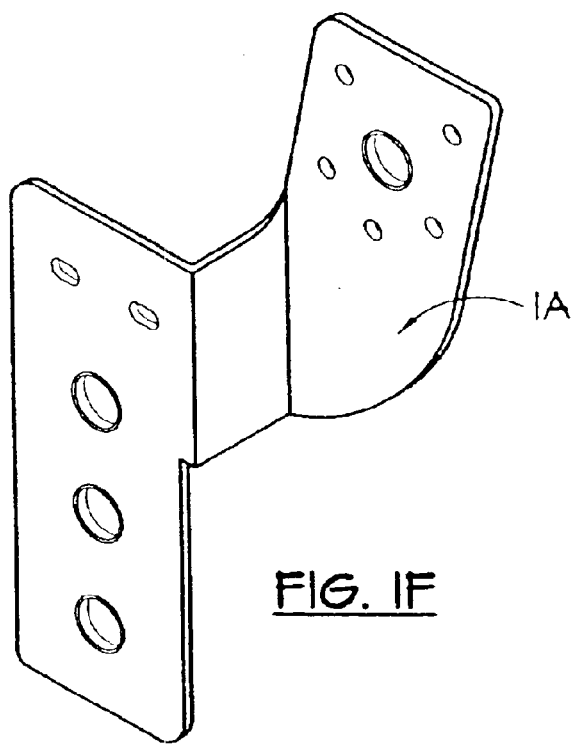
FIG. IF
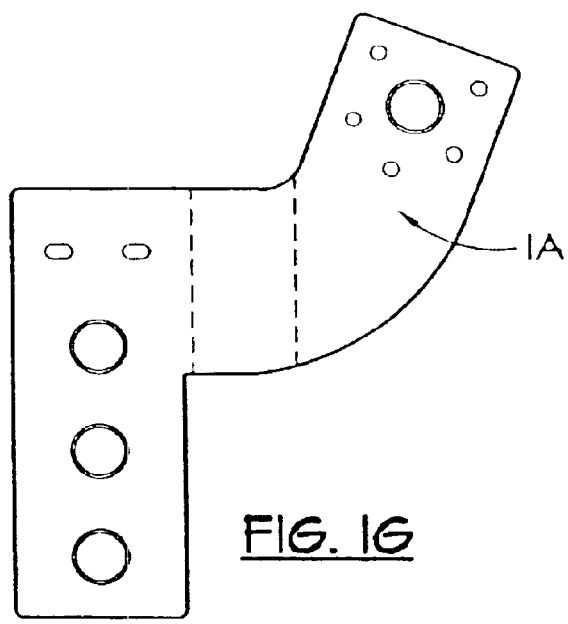
FIG. IG

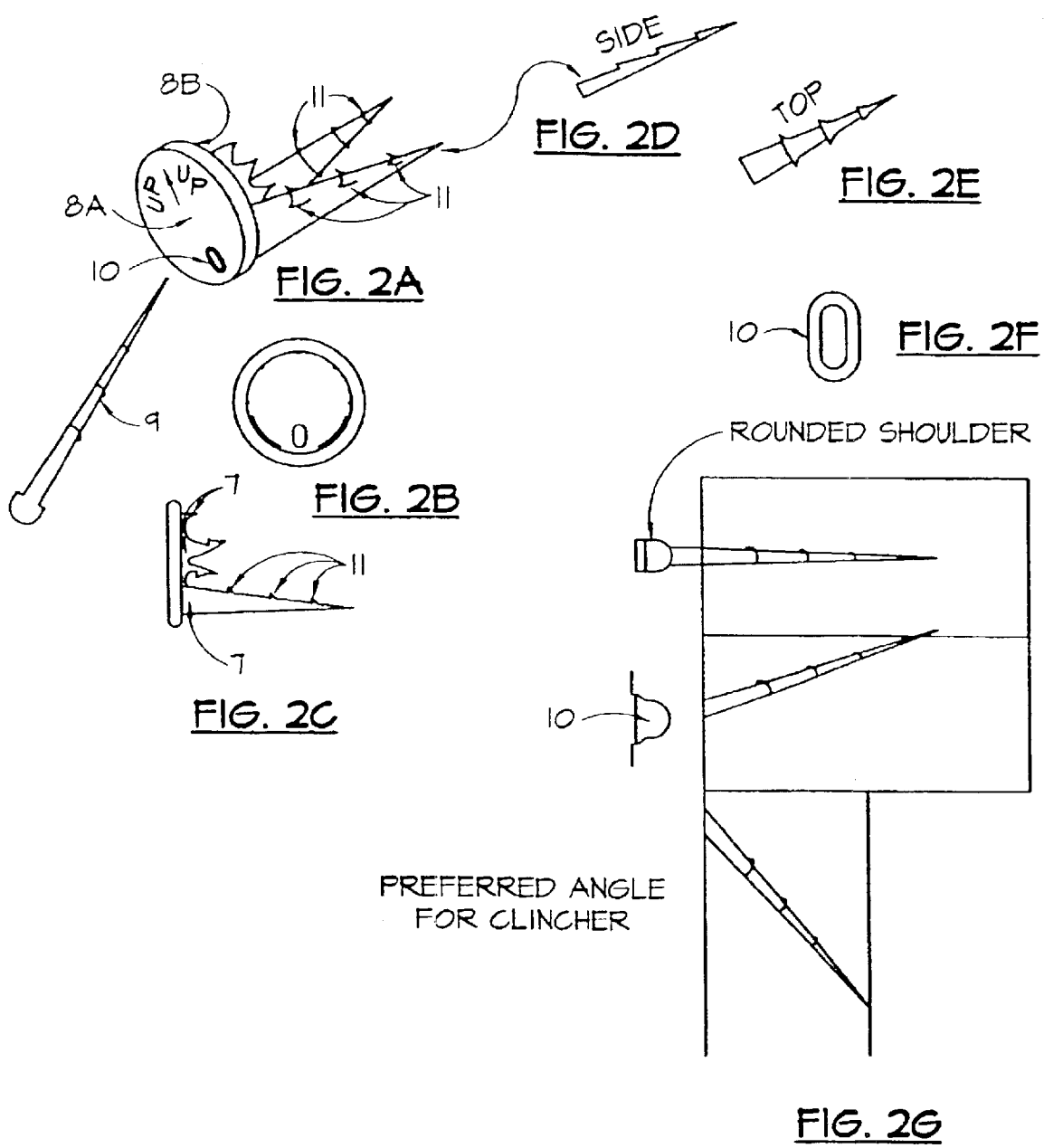

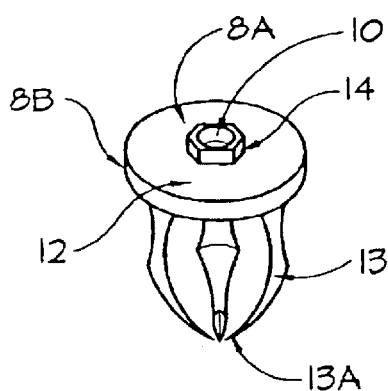
FIG. 3A
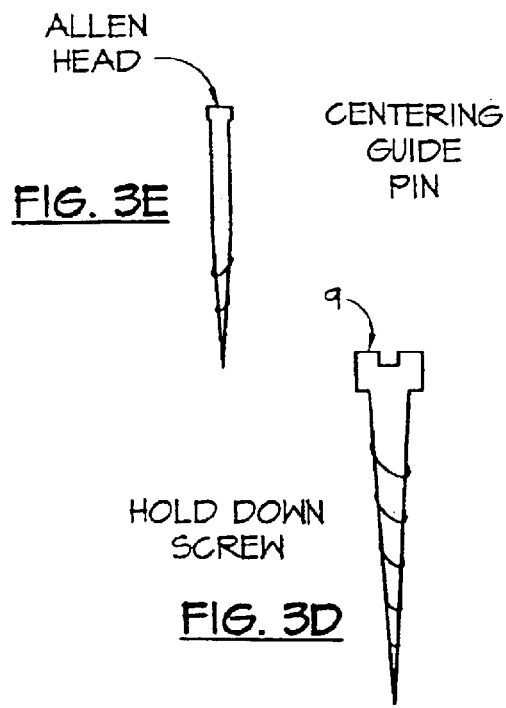
FIG. 3E
FIG. 3D
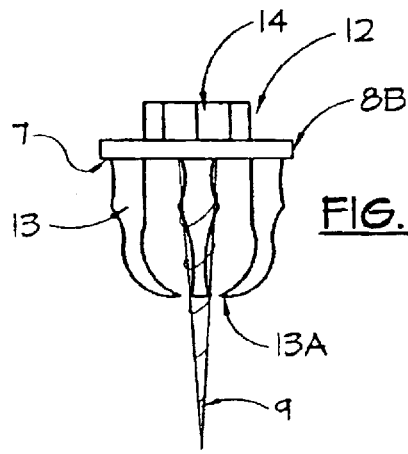
FIG. 3B
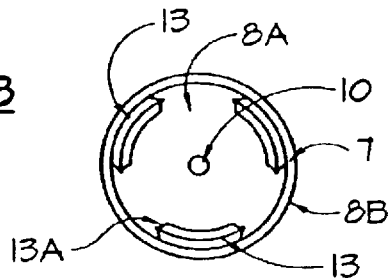
FIG. 3C
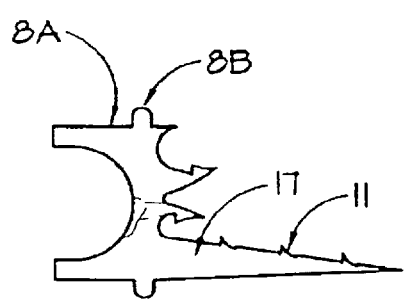
FIG. 6A
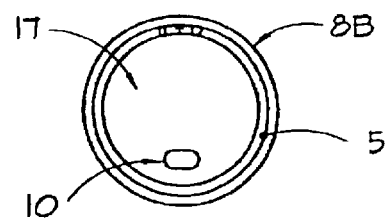
FIG. 6B

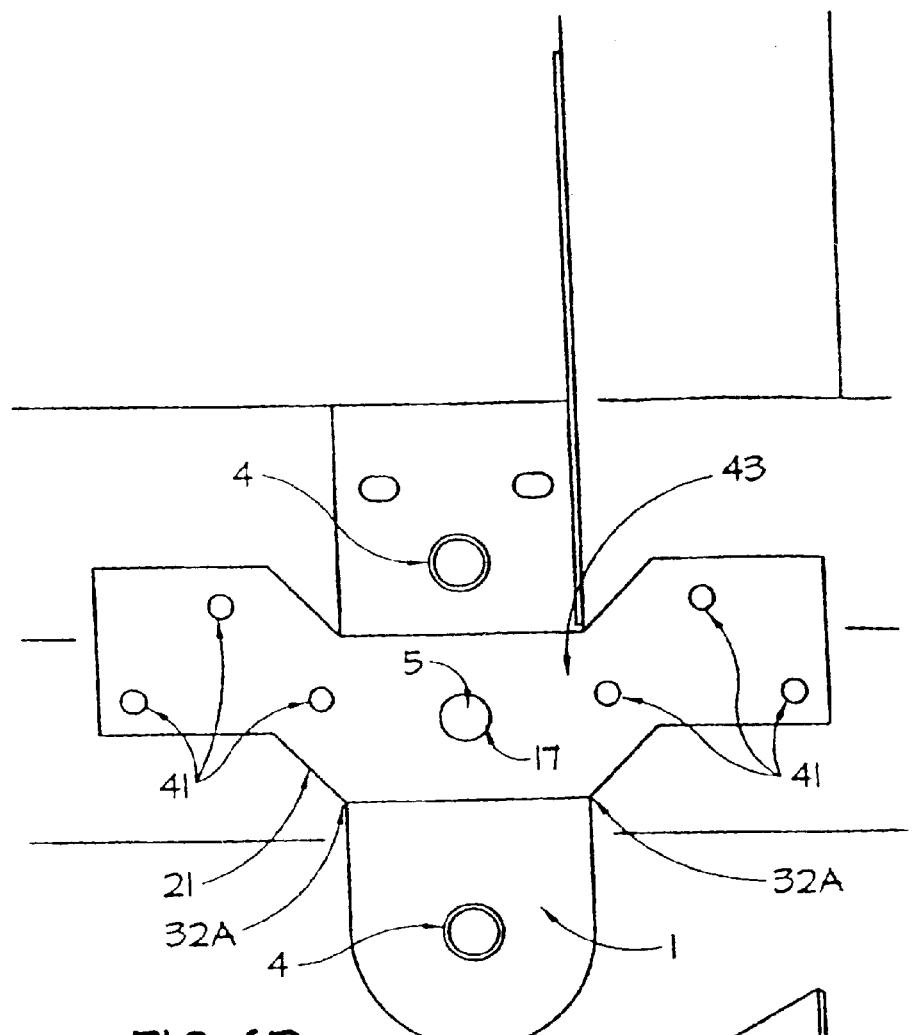
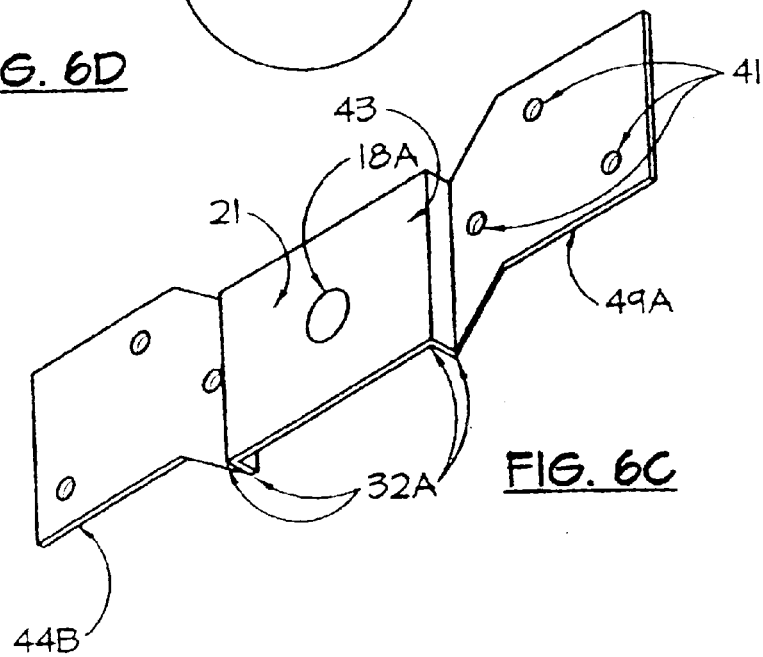

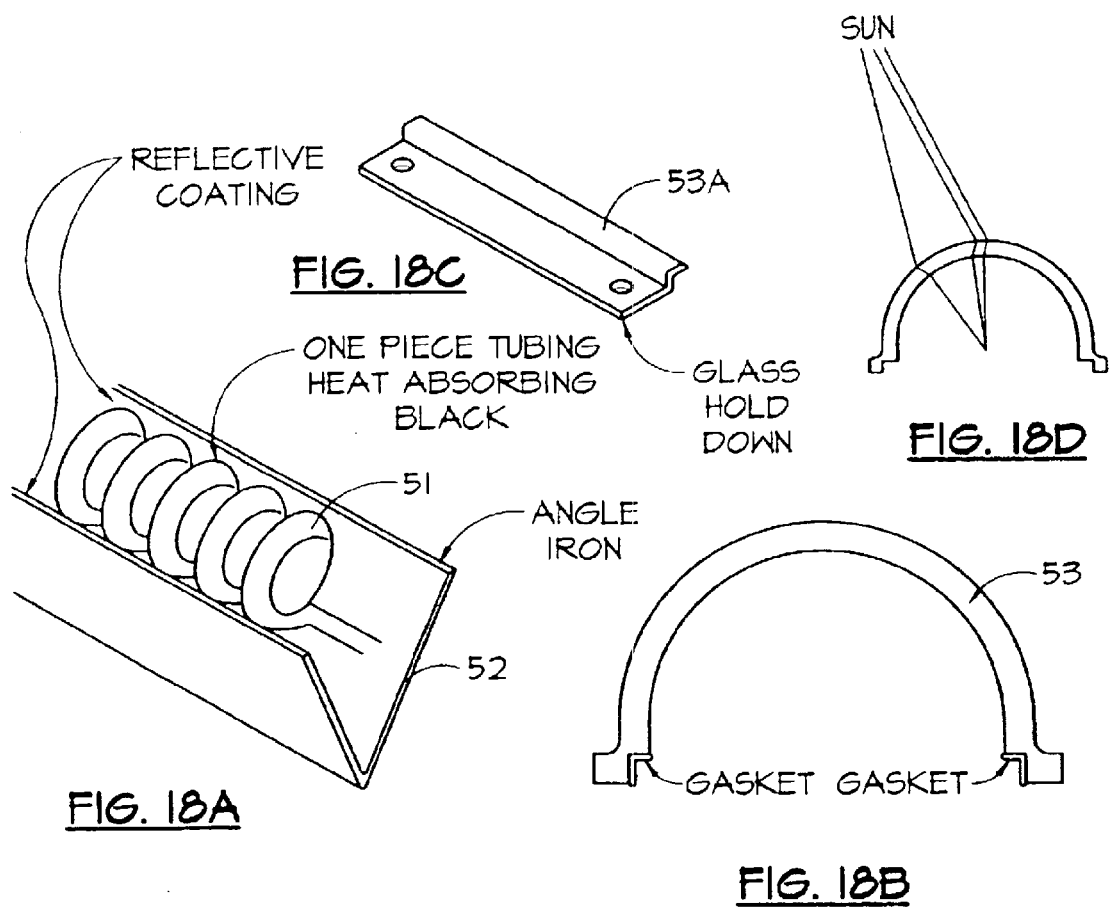

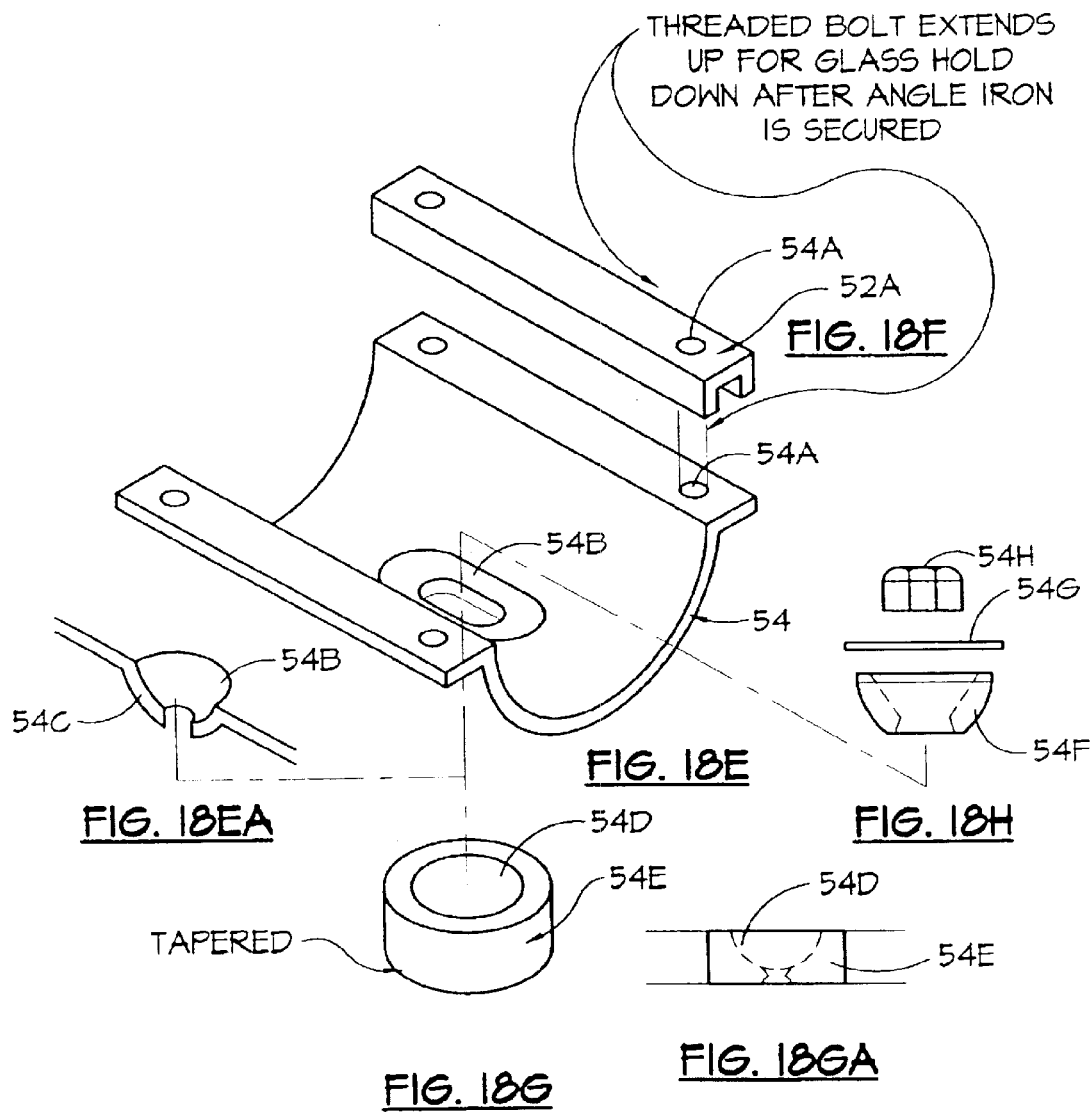

ADJUSTABLE PITCH LOCK

LOCKED

RETROFIT HURRICANE AND EARTHQUAKE PROTECTION

CROSS REFERENCES TO RELATED APPLICATIONS

This application is a Divisional of Ser. No. 09/131,871, file date Aug. 10, 1998 now U.S. Pat. No. 6,324,810, which is a CIP of U.S. Ser. No. 08/578,081 file date Dec. 26, 1995 which is a CIP of Ser. No. 08/191,852, file date Feb. 2, 1994 both of which are abandoned.

BACKGROUND

1. Field of Invention

This invention relates to innovative connectors and fasteners that make buildings stronger, and helps protect them from earthquakes, hurricanes, tornadoes, and strong winds.

2. Description of Prior Art

BACKGROUND

Recent studies of earthquake damage on wood-frame buildings indicate that the outside wall sheathing is the most important structural member in preventing destruction to a home. Sheathing that is tightly secured to a house, stiffens the vertical components against damaging deformations.

The initial failure location on buildings during hurricanes is at the roof to wall connection, or at the wall to floor connection. This invention uses the outside wall sheathing to help tie the roof and floor to the walls, and stiffens the wall to distribute wind loads to the roof framing and end walls.

Failure and loss of the roof sheathing is common during hurricanes, mainly because of inadequate fastening of the roof sheathing to the underlying structural members. The roof system provides stability to a house by supporting the tops of exterior and interior load-bearing walls.

Sheet metal joints perform better than nailed joints in high winds and during seismic activity. Strong connectors, secured by sturdy fasteners, will insure that the major structural members of a house are securely tied together. Rigid outside sheathing, securely fastened to the walls, strengthens the link between the horizontal and vertical components of a structure.

Earthquakes

Earthquake studies of a single-family building showed that failure was mainly due to the improper connection of wall studs to sole plates; the failures were attributed to nail withdrawal from the framing (Goers, 1976).

Tests of wall studs to sole plate connections showed that the studs were uplifted from the sole plate, and the nails which connected the bottom of the plywood sheathing to the sill were punched out of the sheathing (Kamiya et al., 1981).

The outside sheathing allows the naturally flexible wood wall studs to deform just enough to absorb the earthquake forces without cracking. When the outside sheathing is secured tightly to the studs, top plate, rafter, and sole plate, without becoming disconnected, it increases their load-bearing strength.

Steel connectors, between different components of a wood-frame buildings superstructure, provide continuity so that the building will move as a unit in response to seismic activity (Yanev, 1974). Outside sheathing helps transfer earthquake forces to the ground while greatly strengthening the resistance to lateral seismic motions (Yanev, 1974).

Hurricanes

In 1974, wind-study testing of a full-scale house showed that the initial failure location was at the roof to wall connection, or at the wall to floor connection (Tuomi and McCutcheon, 1974). The stiffness of the wall influences the distribution of wind loads to the roof framing and end walls (Polensek, 1976).

In 1990, tests were done on (prior art) rafter/top plate connectors (hurricane clips) that are installed on a house during construction; it was found that hurricane clips are sometimes three to five times stronger than conventional toe-nailing under uplift loads (Canfield, 1990). Retrofit of prior art hurricane clips is difficult or impossible on existing houses.

Studies of damage from Hurricanes Andrew and Iniki show that most of the wind damage to a gable end of a home was from the difference in pressure inside and outside the home. Almost all pictures of damaged wood or masonry buildings show the gable end blown away from the building. (FEMA reports FIA-22, FIA-23)

Pictures never show the gable end blown into the building. This is due to the Bernoulli Effects, where the pressure differential between wind blowing around and over a building, and high pressure air inside, blows out a wall or roof.

An airplane rises due to the pressure differential of faster air moving over a wing, compared to the high pressure of slower moving air under a wing. So too does the side walls blow out of a house due to the Bernoulli effects of wind blowing perpendicular to the wall. Gable ends blow out of a house, because of higher pressure in the house compared to the extremely low pressure on the leeward edge of the wind direction.

Once the side wall or gable end of a house is blown out, the rigidity of the roof and entire house is compromised due to wind getting into the house. Driven rain, along with the wind can damage everything in the house, along with damaging the structural integrity of the roof and walls of the house.

Loss of the roof sheathing was consistently observed after Hurricane Iniki and Hurricane Andrew. The primary cause of sheathing damage was inadequate nailing into the underlying structural members of the roof. There was evidence of missing, corroded, misapplied, and too few nails or staples attaching the roof sheathing to the rafters, purlins, or trusses.

Outside Sheathing

If an earth tremor is strong, the nails holding the outside wall sheathing may be inadequate in size or quantity. Many nails are driven into the edge of the sheathing where the wood can split and lose connection with the underlying studs.

If the outside sheathing detaches from the wall studs, the walls cannot transfer lateral forces or transverse loads and the building can rack and collapse. When the outside sheathing is sufficiently attached to the structural framing, the sheathing and structural framing function together.

A sturdy wall system absorbs, resists, and transfers forces imposed by wind and earth movements. Improperly secured sheathing may not function effectively in resisting transverse loads and lateral forces.

Previously, framers did not understand the structural importance of outside wall sheathing. Improper nail size, length, or type, along with an improper fastening schedule, could jeopardize the anchoring ability of the outside sheathing. Plywood can still be applied with power-driven staples.

Many times, the exterior sheathing is applied to the wall when it is constructed on the ground, then raised in place.

This helps keep the wall from racking when raised, but is heavier to lift and may be weaker than sheathing applied to a wall in place.

Part of my co-pending application, Ser. No. 08/191,852, filed on Feb. 2, 1994 ties the rafter to the outside sheathing and underlying top plate. This is one of the weakest failure points on a house during a hurricane.

This continuation-in-part application has unique connectors to tie together major structural members of a house using the important outside sheathing. These major structural members include the gable end rafter and joist, the sole plate and walls, and the corner post, rafter, and top plate. These unique connectors are held to the outside sheathing, and underlying or exposed structural members using unique fasteners, or nails, screws, and bolts.

Roof Sheathing

The stability of the walls is dependent on the roof for top lateral support. The roof sheathing can be composed of boards or plywood. It ties the rafters and roof trusses together, and prevents the roof from racking. The roof sheathing may have been applied carelessly in the past, as it was felt that the weight of the roof cladding would keep the roof on tight.

Previously, framers did not understand the structural importance of roof sheathing. Improper nail size, length, or type, along with an improper fastening schedule, could jeopardize the anchoring ability of the roof sheathing. Plywood may be applied with power-driven staples. In humid or salt-air climate, the nails or staples can corrode and lose holding power.

PRIOR ART

A number of connectors have been developed to tie together the roof rafter and the top plate, or wall stud and sole plate. Previous connectors were made to be used during construction of the structure and covered by the outside sheathing.

These connectors cannot be retrofitted to existing structures without extensive dismantling or damage to the inside wall board or outside sheathing. Without dismantling the walls, a homeowner can't tell if hurricane clips are correctly fastened to their house. Older homes usually don't have hurricane clips or any type of sheet metal connectors installed on their house to prevent racking, or movement between structural members.

Prior tie connectors are also limited to the number of roofing and structural members that can be tied together. Since prior connectors are made for installation on the frame-work of a building, they cannot tie the outside sheathing to a building. All previous connectors were designed to be covered over by the outside sheathing. Since they do not tie the outside sheathing to the underlying structural members of the house, they cannot prevent the house from racking in an earthquake or wind storm.

The roof lock in U.S. Pat. No. 1,452,599 to Hames, March 1922, and the dock bracket in U.S. Pat. No. D.290,223 to Westerheim, June 1987 did not tie the rafter to the top plate and outside sheathing. The hurricane tie in U.S. Pat. No. 4,714,372, December 1987, and snugging connector in U.S. Pat. No. 4,896,985, January 1990, both to Commins, can tie the rafter to the top plate in the skeleton structural framework of new construction. They can not be used as a retrofit on existing houses; they did not tie the sheathing to the top plate and rafter; they did not go around the frieze board; they did not tie into a stud or top plate directly underneath a rafter; and they did not tie together two 2×4's of the top plate.

The bearing connector in U.S. Pat. No. 5,109,646, May 1992, to Colonias et al. is used to carry roof loads, but can tie together a rafter, top plate, and two 2×4's of the top plate together in the skeleton structural framework of new construction. This connector can not be used as a retrofit on existing houses; it did not tie the sheathing to the top plate and rafter; it did not go around the frieze board; and it did not tie into a stud or top plate directly underneath a rafter.

The building construction ties in U.S. Pat. No. 2,300,113, to Faber, October 1942, can tie the rafter to the joist and wall stud in the skeleton structural framework of new construction. They can not be used as retrofit on existing houses; they did not tie the sheathing to the top plate and rafter; they did not tie the rafter and top plate together or go around the frieze board; and they did not tie together two 2×4's of the top plate.

The free gusset metal ledger hanger in U.S. Pat. No. 4,353,664, to Gilb, October 1982, is used to provide ledger support around the inside perimeter of buildings or at internal concrete or masonry walls. This connector can not be used as a retrofit on the outside of existing houses; it did not tie the sheathing to the top plate and rafter; it did not tie together a rafter and top plate; it did not go around the frieze board; it did not tie into a stud or top plate directly underneath a rafter; and it did not tie together two 2×4's of the top plate.

The wall tie in United Kingdom patent 2,096,664, to Durrant, October 1982, is used to strengthen mortar joints in brick walls. This connector can not be used as a retrofit on the outside of existing wood houses; it did not tie the sheathing to the top plate and rafter; it did not tie together a rafter and top plate; it did not go around the frieze board; it did not tie into a stud or top plate directly underneath a rafter; and it did not tie together two 2×4's of the top plate.

The connecting plate for wood members in Germany patent 238,822, to Sauer, March 1986, is used to connect planks, boards, or strips, using bending slots and nail holes. This connector, by its large bending slots, is a weak connector. Bending this connector weakens the metal, especially since most carpenters would hammer the connection to make it fit on planks and boards. This connector is useful for attaching together boards that intersect at odd angles, not equal to 90 or 45 degrees. This connector may be used as a retrofit on existing houses, but was intended for attaching beams and planks in the skeleton structural framework of new construction. It did not tie the sheathing to the top plate and rafter or go around the frieze board; it did not tie into a stud or top plate directly under a rafter; and it did not tie together two 2×4's of the top plate.

The metal connectors in Switzerland patent 214,358, April 1941 are used to connect wood and metal members together. The connectors can tie I-beams, angle iron, and wood boards to metal frames in skeleton structural framework of new construction. They can not be used as retrofit on existing houses; they did not tie the sheathing to the top plate and rafter; they did not tie the rafter and top plate together; they did not go around the frieze board or tie into a stud or top plate directly under a rafter; and they did not tie together two 2×4's of the top plate.

The apparatus and method for securing a building during high winds in U.S. Pat. No. 5,319,986 to Winger, June 1994, is used to secure several of the roof rafters to the ground by cables and anchors. This system is employed only when high winds are expected, as the cables must be extended and attached to the ground anchor manually. In a post-and-beam constructed house where the inside rafters are exposed, the cables and attaching hardware are exposed to view. Cables can kink, stretch, rust in place, and break. This system did not tie down the roof sheathing or roof shingles. This system will not work if the homeowner is not home to secure the anchoring cables. It cannot work in areas where tornadoes can occur without warning, especially if the home owner is sleeping or is seeking shelter in the basement or interior room. The system requires extensive and expensive carpentry work and expensive hardware.

The house anchor in U.S. Pat. No. 1,864,403, to Bradley, June 1932, uses cables and ground anchors to secure the roof to the ground. It did not tie together the rafter and ridge plate or tie them straight down to the ground; since the rafter and ridge plate are not secured together and tied to the ground on the gable end of the house, the house is vulnerable to winds on the side of the house that can push or pull and separate the gable end of the rafter plate to ridge plate connection. Cables can stretch and break. Parts of the house anchor include eye-bolts and cable guides which can pull out from wood when subjected to perpendicular pulling forces as from strong winds.

The exterior anchoring apparatus for surface sheets in U.S. Pat. No. 1,864,403, to Bradley, March 1967, uses metal rods and clamps to secure exterior sheathing to a roof. This system cannot be retrofit to an existing roof. It did not tie the sheathing securely to the rafter and ridge board.

OBJECTS AND ADVANTAGES

Accordingly, several objects and advantages of my invention are that it helps hold the gable and hip ends of a building from being blown in or out by hurricanes, tornadoes, and wind storms.

This invention helps prevent the outside sheathing of the gable and hip ends on existing buildings from detaching during an earthquake. It also allows some deflection in the joint without separating. The invention tightly holds the outside sheathing to the roof rafter, top plate, joist, and wall stud using unique, but simple and economical connectors and fasteners.

Objects of this invention are that it easily, quickly, and economically protects buildings from the destructive effects of earthquakes. It is a further object of this invention that it easily, quickly, and economically protects houses from the destructive winds of hurricanes. It is a still further object that the connectors and fasteners are strong, attractive, permanent, functional, uncomplicated, simple to manufacture, easy to install, and economical. Many of the embodiments can be made from a single sheet metal blank, without any welding.

Another objective is for the rafters or roof trusses to be secured together and locked to the wall and roof sheathing. The invention can be used as an accurate spacer for trusses and for attic ventilation. This invention can be used during construction and can be retrofit onto existing homes.

The installation procedure is simple so that a handy homeowner can install the connectors and fastener hardware. Except for expensive, custom-built homes, most homeowners had no input or knowledge on how strong their houses are built. Now homeowners can retrofit their homes by themselves or with a hired contractor. Installation of this invention will make a house more resistant to strong winds and seismic activity.

Since the invention is mostly on the outside of a house, it is unadorned, but can be covered with the homeowners choice of wood trim, veneer, gingerbread, other architectural facades, or can just be painted to match or contrast with the house.

Previous disasters showed that many nailed connections on destroyed or damaged homes were undersize, misinstalled, or completely missing. By being installed on the outside of a house, an inspector, homeowner, or insurance agent can see if there are any missing connectors and fasteners. Since the bushings are made of the correct size and material, no undersize or wrong material fasteners can be installed.

Masonry houses don't fare well during an earthquake because the house can't flex, it usually snaps instead. This invention allows the sheathing connection on a house to deflect or flex by using a bushing and bearing surface for low friction.

The outside sheathing is one of the most important structural members when a house is under stress of hurricane-force winds or seismic activity. This invention helps prevent the wood of the outside sheathing from splitting. It also holds the outside sheathing securely to the underlying structural members.

None of the prior art connectors hold on the outside sheathing, because they went on a house before the outside sheathing was installed. None of the previous connectors use a bushing and bearing surface to allow motion, and still hold the sheathing and underlying structural members together.

There are several embodiments of this invention in order to fit on as many different types of houses as possible. Several embodiments of this invention protect most types of wood-frame construction. Numerous houses, including brick and concrete-block, have the gable end constructed of wood. Several embodiments of this invention protect most types of masonry houses constructed with wood gables.

A further object is that this invention can be used on various size houses. A still further object is that the embodiments of this invention are retro-fit onto new and old homes made of wood or masonry. There may be insurance discounts for homeowners who have this invention installed.

These and other objectives of the invention are achieved by a system of simple and economical connectors and fasteners that allow a homeowner or contractor to quickly and easily protect the weakest parts of a building against earth tremors and high winds.

Advantages of each will be discussed in the description. Further objects and advantages of my invention will become apparent from a consideration of the drawings and ensuing description.

BRIEF DESCRIPTION OF THE DRAWINGS

FIG. 1F is a perspective view of a right-hand seismic clip for the corner of a house.

FIG. 1G is a flat-pattern layout of a right-hand seismic clip for the corner of a house.

FIG. 2A is a perspective view of a christmas tree bushing.

FIG. 2B is a bottom view of a christmas tree bushing.

FIG. 2C is a side view of a christmas tree bushing.

FIG. 2D is a side view of barbed leaders.

FIG. 2E is a top view of barbed leaders.

FIG. 2F is a front view of the oblong screw hole.

FIG. 2G is a cross-section of screws inserted through a christmas bushing into wall framing.

FIG. 3A is a perspective view of a spiral bushing.

FIG. 3B is a side view of a spiral bushing.

FIG. 3C is a bottom view of a spiral bushing.

FIG. 3D is a side view of a hold down screw.

FIG. 3E is a side view of centering guide pin.

FIG. 6A is a side view of a heavy-duty bushing.

FIG. 6B is a front view of a heavy-duty bushing.

FIG. 6C is a perspective view of a heavy-duty clamp.

FIG. 6D is a front view of a heavy-duty clamp, seismic clip, and heavy-duty bushing.

FIG. 10CA is a perspective view of a tooth.

FIG. 10DA is a cross section view of a banana clip.

FIG. 10DB is a top view of teeth.

FIG. 10DC is a bottom view of teeth.

FIG. 10DD is a side view of teeth.

FIG. 10DE is a cross section through teeth.

FIG. 10EA is a side view of teeth.

FIG. 18A is an angle iron and pipe for solar hot water.

FIG. 18B is a side view of a glass cover tube.

FIG. 18C is a perspective view of a glass hold down.

FIG. 18D shows the glass cover focal point.

FIG. 18E is a perspective view of a solar tube.

FIG. 18EA is a cross section of an eye.

FIG. 18F is a perspective view of an angle iron hold down.

FIG. 18G is a perspective view of a tapered washer.

FIG. 18GA is a cross section through a tapered washer.

FIG. 18H is a side view of a ball, washer, and nut.

Figure 1C:
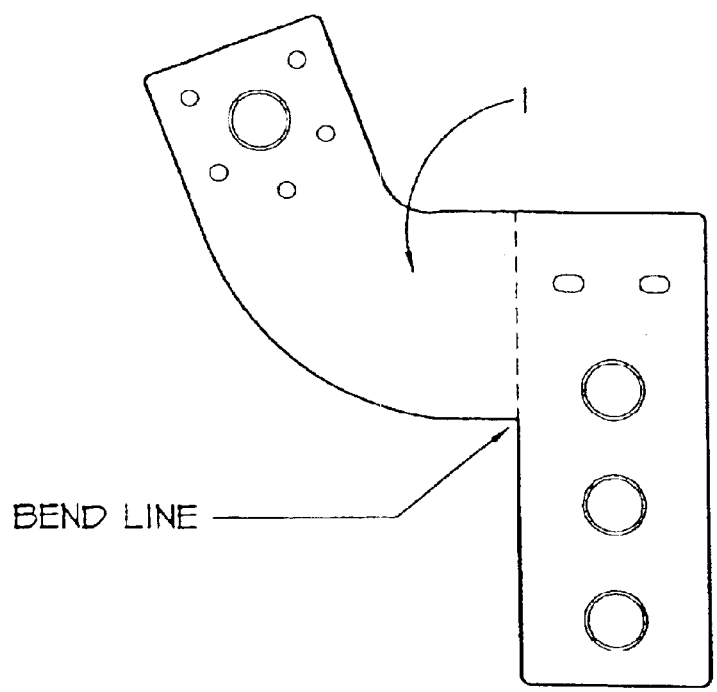
FIG. 1C is a flat-pattern layout of a left-hand seismic clip.

| Reference Numerals in Drawings | |
|---|---|
| 1 | Seismic clip |
| 1A | Corner seismic clip |
| 2 | Bottom web |
| 3A | Sharp flange |
| 3B | Smooth lip |
| 4 | Embossment hole |
| 5 | Extended head |
| 6 | Christmas tree bushing |
| 7 | Bearing surface |

-continued

| Reference Numerals in Drawings | |
|---|---|
| 8A | Cap |
| 8B | Outer radius |
| 9 | Screw |
| 9A | Centering guide pin |
| 10 | Screw hole |
| 11 | Barbed leaders |
| 12 | Spiral bushing |
| 13 | Gyre |
| 13A | Chisel face |
| 14 | Hex drive |
| 15 | Physical bushing |
| 16 | Tapered wedge bushing |
| 17 | Heavy duty bushing |
| 18 | Cylinder |
| 18A | Hole |
| 18B | Expansion slot |
| 18C | Excess hole |
| 19A | Top wedge |
| 19B | Bottom wedge |
| 19C | Upper truncated surface |
| 19D | Lower truncated surface |
| 20A | Bolt |
| 20B | Back |
| 20C | Threaded hole |
| 21 | Heavy-duty clamp |
| 22 | Tee connector |
| 23 | Banana clip |
| 24 | Mickey connector |
| 25 | Tomahawk retainer |
| 25A | Upper web |
| 25B | Bottom web |
| 26 | Embossment holes |
| 27A | Outside edge |
| 27B | Top edge |
| 28A | Crown web |
| 28B | Root web |
| 28C | Exterior edge |
| 28D | Summit edge |
| 28E | Trigger web |
| 28F | Rafter web |
| 29A | Zenith edge |
| 29B | Foot edge |
| 30 | Teeth |
| 31A | Pinnacle web |
| 31B | Tuber web |
| 32A | Right-angle bend |
| 32B | Dog leg |
| 33 | Corner clip |
| 33A | Slope |
| 33B | Muffle edge |
| 34 | Gable connector |
| 34A | Prime web |
| 34B | Rump web |
| 35 | Bolt slots |
| 36 | Roof plate |
| 36A | Roof overlay |
| 36B | Rubber pad |
| 37 | Carriage bolt holes |
| 37A | Carriage bolt |
| 37B | Nut |
| 38 | Metal facia board |
| 38A | Main slat |
| 38B | Roof tab |
| 39 | Strengthening ribs |
| 40 | Tabs |
| 41 | Nail holes |
| 42 | Metal frieze plate |
| 42A | Major slat |
| 42B | Ventilation rib |
| 42C | Top plate tab |
| 43 | Bridge |
| 44A | Right wing |
| 44B | Left wing |
| 45 | Slots |
| 46 | Ridge plate |
| 47 | Rafter tabs |
| 47A | Cutouts |

-continued

| Reference Numerals in Drawings | |
|---|---|
| 47B | Bend line |
| 48 | Truss support |
| 48A | Truss tab |
| 49 | Truss brace |
| 49A | Opening |
| 50 | Rasp holes |
| 50A | Crown |
| 50B | Chisel wedge |
| 51 | Pipe |
| 52 | Angle-iron member |
| 52A | Angle iron hold down |
| 53 | Glass cover tube |
| 53A | Glass hold down |
| 54 | Solar tube |
| 54A | Bolt hole |
| 54B | Eye slot |
| 54C | Cornea |
| 54D | Contact |
| 54E | Tapered washer |
| 54F | Ball |
| 54G | Washer |
| 54H | Nut |
| 55 | Roof anchor |
| 55A | Beam member |
| 55B | Roof member |
| 56A | Cut line |
| 56B | Ridge tab |
| 57 | Curved plate |
| 57A | Serrations |
| 57B | Bolt hole |
| 57C | Flat plate |
| 57D | Lip hole |
| 58 | Roof tab |
| 59 | Gable span |
| 59A | Inner radius |
| 59B | Curve |
| 59C | Outer radius |
| 60A | Roof link |
| 60B | Gable link |
| 61 | Latch mechanism |
| 62 | Center gable plate |
| 62A | Eave plat |
| 63 | Nail holes |

DESCRIPTION AND OPERATION

FIG. 1A

Figures 1A, 1B:
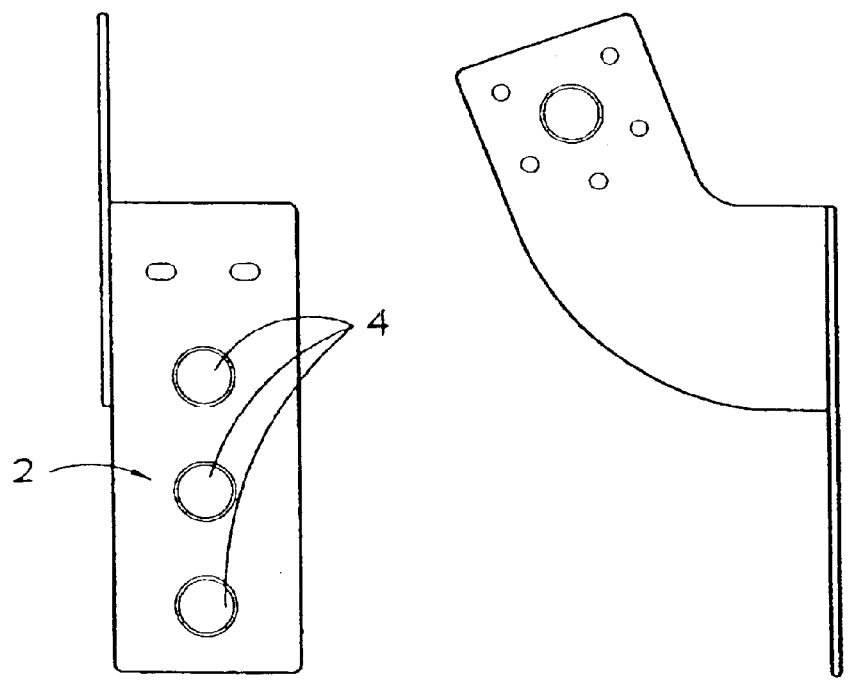
FIG. 1A is a front view of a seismic clip.
FIG. 1B is a side view of a seismic clip.

FIG. 1A shows a front view of a right-hand seismic clip 1 for wood-frame constructed homes. The upper part of the seismic clip 1 is attached to a house rafter. The bottom part is attached to the outside sheathing and underlying top plate by a right-angle bend and a radius that clears the frieze boards.

FIG. 1B

FIG. 1B shows a side view of a seismic clip. The upper part of this invention is discussed in previous patent application Ser. No. 08/191,852 on Feb. 2, 1994 by Thompson. The improvement discussed in this continuation-in-part is for the bottom web 2 of the clip and related embodiments.

Earthquake research has shown that the outside sheathing is one of the most important structures holding together a wood-framed building. The sheathing prevents the building from racking as long as the nails keep the sheathing tight to the walls.

Earth movements and hurricane-force winds can drive nails out of the sheathing, and the building will collapse if the sheathing falls off. The bottom part of the seismic clip 1 contains improvements that resist damaging effects from earth movements. FIG. 1A shows the approximate location of embossment holes 4 that are improvements over previous inventions.

FIG. 1C

FIG. 1C shows a flat pattern layout of a seismic clip 1. It is a left-hand one; a right-hand seismic clip 1 would be a mirror image with the right angle bend in the opposite direction.

FIG. 1D

Figure 1D:
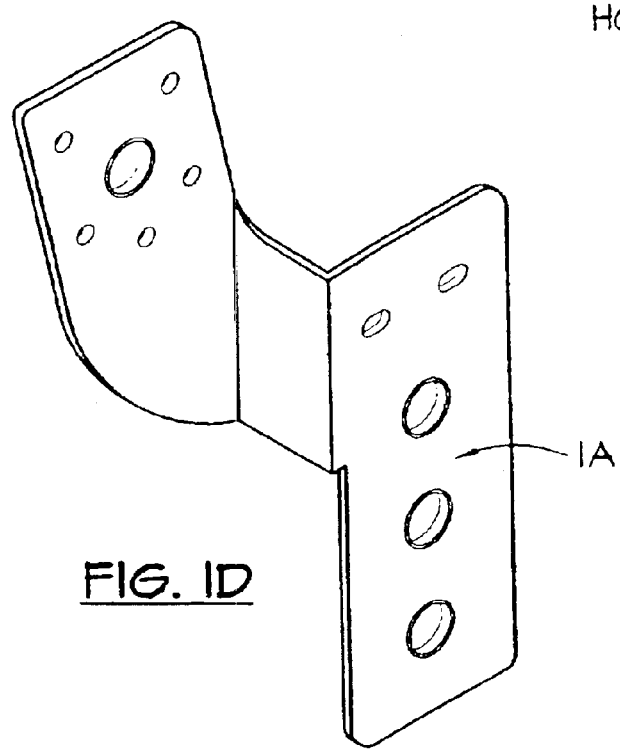
FIG. 1D is a perspective view of a left-hand seismic clip for the corner of a house.

FIG. 1D shows a perspective view of a left-hand corner seismic clip 1A. Double right angle bends allow this clip to clear outside sheathing and can be installed on the corner of a house.

FIG. 1E

Figure 1E:
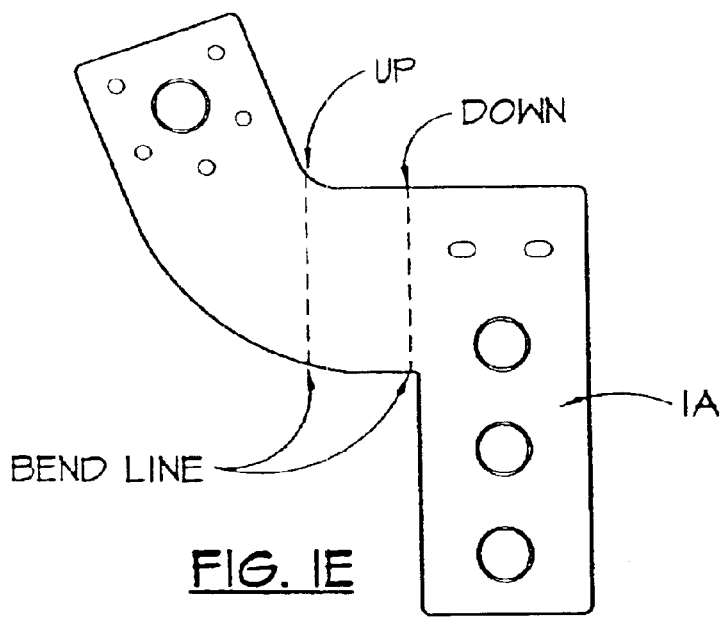
FIG. 1E is a flat-pattern layout of a left-hand seismic clip for the corner of a house.

FIG. 1E shows a flat pattern layout of a corner seismic clip 1A; dotted lines show where the right angle bends occur.

FIG. 1F

FIG. 1F shows a perspective view of a right-hand corner seismic clip 1A. Double right angle bends allow this clip to be installed on the corner of a house as shown on FIG. 23.

FIG. 1G

FIG. 1G shows a flat pattern layout of a corner seismic clip 1A. Double right angle bends allow this clip to be installed on the corner of a house.

FIG. 1H

Figures 1H, 1I, 1J:
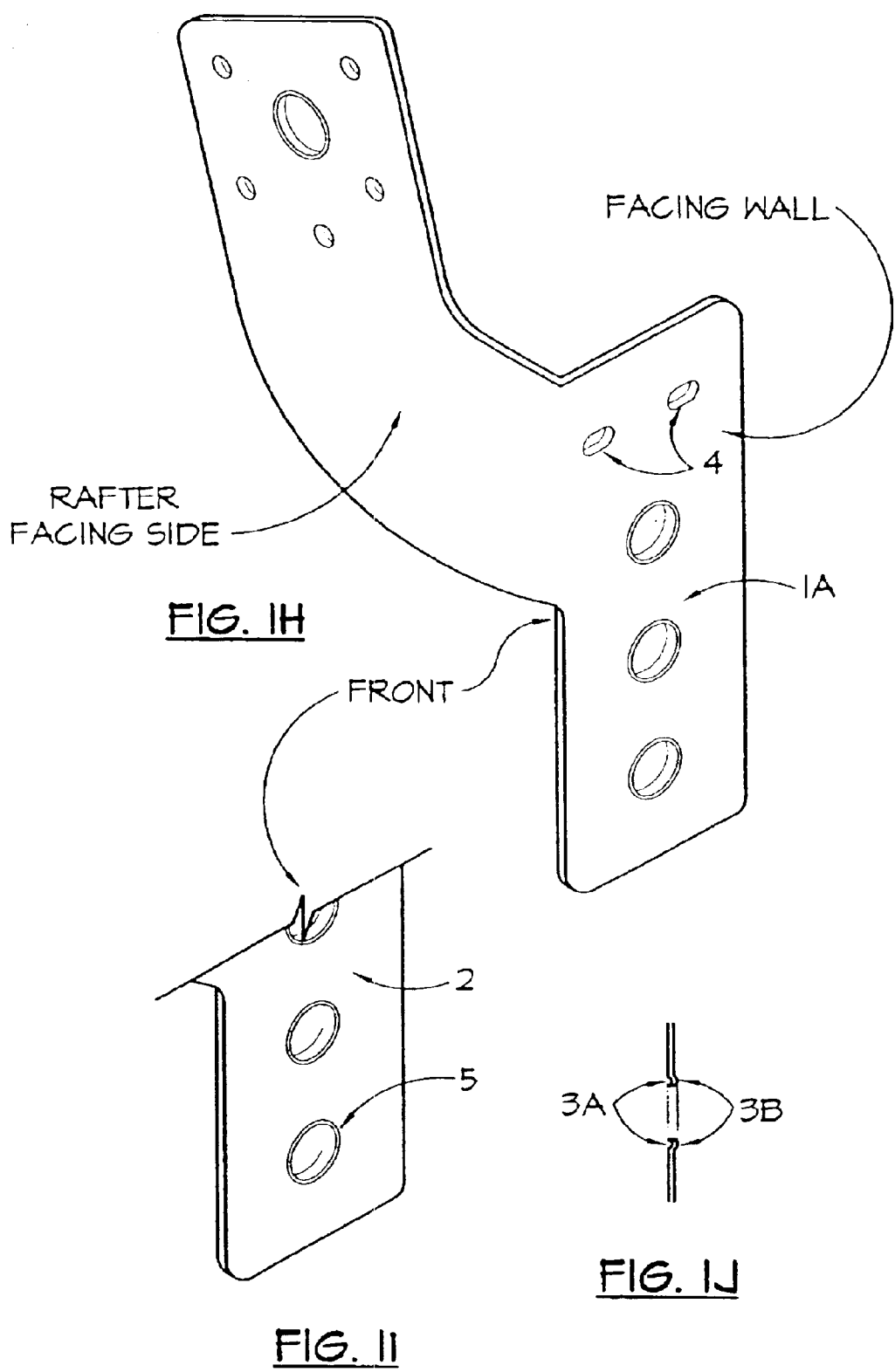
FIG. 1H is a rear perspective view of a right-hand seismic clip, for the corner of a house.
FIG. 1I is a perspective view of the bottom webs on a seismic clip.
FIG. 1J is a magnified cross-section view of the embossments.

FIG. 1H shows a perspective view of a right-hand seismic clip 1 as seen from the outside wall sheathing.

FIG. 1I

FIG. 1I shows a perspective view of the bottom web 2, which is the lower part of a seismic clip 1. This view shows the embossment holes 4. An embossment hole 4 is round shaped with a raised edge. When the bottom web 2 of the seismic clip 1 is attached to the outside sheathing, and an earth tremor shakes the building, the raised edge of the embossment hole 4 will allow deflection without breaking or becoming disconnected. This clip will hold the sheathing tightly to the building wall and roof, but will allow for deflection and transfer of forces using bushings 6, 12, 15, 16, or 17.

FIG. 1J

FIG. 1J shows a magnified cross-section or side view of the embossments on the bottom web 2 of a seismic clip 1. The left side of the bottom web 2 would be mounted against the outside sheathing of a wood-frame house, and bushings, or lag bolts with washers, would connect the bottom web to the outside sheathing and underlying top plate and wall stud.

The embossment holes 4 are shown as they would be manufactured, from the right side of the bottom web. The embossing process puts a slightly raised, smooth lip 3B around the embossment hole 4. Bushings or lag bolts would be inserted from this side and the outer radius 8B of a bushing 6, or washer from a lag bolt would ride on this raised lip.

The embossing process puts a smooth lip 3B on the outside and a slightly raised sharp flange 3A on the back part of the bottom web 2. The sharp edge of the flange 3A cuts into the outside sheathing when a fastener is installed, forming a tight connection.

This embossing process means less material is cut away from the embossment hole 4. It also produces more surface area at the sharp flange 3A for cutting into the sheathing on the left-hand side. The embossing process adds material around the smooth lip 3B of the embossment hole 4 and cuts friction between the smooth lip 3B and outer radius 8B of the bushings 6.

Lag bolts with washers could be used in the embossment holes 4, as the washer would bear on the smooth lip 3B, but the following embodiments of bushings would be improvements.

Installing the seismic clip 1 on a house will tie the outside sheathing to the rafter, top plate, and wall stud. This will help make a house more resistant to earth movements and strong winds.

The seismic clip 1 can be made from many materials, such as metal, plastic, ceramic, or combination of materials. The clip can be forged, molded, or injected, but stamped sheet metal is preferable as the quickest and most economical method for the process of making the clip and embossment holes 4 at the time of manufacture. Standard methods of tool and die manufacture can be used to stamp out and make the seismic clip 1 and form the embossment holes 4.

FIG. 2A

FIG. 2A shows a perspective view of a christmas tree bushing 6 for use on wood-frame houses. The bushing is inserted through embossment holes 4 and forced into the outside sheathing and underlying wall studs. The radius of the bushing is slightly smaller than the embossment holes 4 in order to fit easily. When inserted through an embossment hole 4, into the outside sheathing and underlying structural members, the barbed leaders 11 grip into the wood and will not dislodge during earthquakes or hurricanes.

The cap 8A of the Christmas tree bushing 6 is shaped like the primer end of a bullet cartridge, except the outer radius 8B of the cap 8A extends beyond the edge and the primer is a screw hole 10. The cap 8A allows different tools, such as a hammer, to force the bushing into the wall.

A screw 9 fits into the screw hole 10 after the christmas tree bushing is inserted and forced into the outside sheathing and underlying structural members. Screwing and tightening the screw 9 further expands the wood against the barbed leaders 11 forming a very tight connection against detaching forces.

FIG. 2B

FIG. 2B shows a bottom view of a christmas tree bushing 6. The barbed leaders 11 are show as they would be inserted through the embossment holes 4 and driven into the outside sheathing. The cap 8A includes the outer radius 8B. Underneath the outer radius 8B of the cap 8A is a bearing surface 7 that rides against the smooth lip 3A of the embossment holes 4 on the seismic clip 1. The screw 9, that is attached into the screw hole 10, has a relative thin shank with relatively thick thread that helps hold the bushing so it doesn't twist or pull out.

FIG. 2C

FIG. 2C shows a side view of a Christmas tree bushing 6. The bottom part of the outer radius 8A contains the bearing surface 7 along the outside of the bushing. The barbed leaders 11 are shown around an inside diameter inside of the bearing surface 7 and attached to the bottom of the cap 8A. The screw hole 10 is generally offset from the center of the cap 8A.

The Christmas tree bushing can be made from several materials including metal, plastic, ceramic, or combination of materials. The bushing can be molded, machined, cast, forged, or injected, but is preferably stamped from sheet metal using standard tool and die methods.

FIG. 2D

FIG. 2D shows a side view of the barbed leaders 11.

FIG. 2E

FIG. 2E shows a top view of the barbed leaders 11.

FIG. 2F

FIG. 2F shows the oblong shape of screw hole 10.

FIG. 2G

FIG. 2G shows in cross-section how screws 9 inserted through the oblong screw hole 10 can have preferred angles up into the top plate or down into the wall stud.

FIG. 3A

FIG. 3A shows a perspective view of a spiral bushing 12 for use on wood-frame houses. The cap 8A has an outer radius 8B similar in size and function to the Christmas tree bushing 6. In the approximate middle of the top of the cap is an attached hexagonal-shaped hex cap 14 similar in size and shape to the head of a common bolt. In the center is a screw hole 10.

The hex cap 14 can be turned by a wrench, but the preferred method of rotation is by a impact socket wrench. The wrench can also be a standard SAE or metric ratchet or air gun wrench. When the spiral bushing is inserted into embossment hole 4, turning the hex cap clockwise, and pushing in, will drive the gyre 13 into the wood of the outside sheathing and underlying structural members of the house.

The gyre 13 is shaped like a spiral with sharp ends, so that turning the hex cap 14 clockwise will drive the gyre 13 into the wood like a screw. The gyre 13 is superior to a screw because the sharp chisel face 13A of the spiral-shaped gyre cuts into the wood like chisels and wraps around the wood fibers, instead of cutting and pushing apart wood fibers as a screw would do.

The center of the hex cap 14 contains a screw hole 10. A screw 9 fits into the screw hole 10 after the spiral bushing is inserted into the outside sheathing. Tightening the screw 9 expands the wood against the gyre 13 forming a tight connection.

FIG. 3B

FIG. 3B shows a side view of a spiral bushing 12. The hex cap 14 and screw 9 is shown at the top of the cap 8A, and the bearing surface 7 is shown on the underside of the outer radius 8B. The gyre 13 are shown with their spiral shape and sharp chisel face 13A edges at the bottom.

FIG. 3C

FIG. 3C shows a bottom view of a spiral bushing 12. The spiral edges of the gyre 13 are seen from the bottom of the sharp chisel faces 13A. This shows how the sharp chisel faces 13A cleave and wrap around the wood fibers, when spun in a clockwise direction. The underside of the cap 8A, and the bearing surface 7 is shown on the underside of the outer radius 8B. The screw 9 extends through the screw hole 10 helping the bushing fasten against the outer sheathing and underlying structural members, by helping spread the wood fibers tightly against the gyre 13.

FIG. 3D

FIG. 3D shows a side view of a hold-down screw 9 with large head.

FIG. 3E

FIG. 3E shows a centering guide pin 9A, with allen head, which guides the spiral bushing through embossment holes 4. The allen head allows the centering guide pin 9A to be withdrawn after the spiral bushing is started, then a hold-down screw 9 can be installed in its place.

The spiral bushing can be made from several materials including metal, plastic, ceramic, or combination of materials. The bushing can be molded, machined, cast, forged, or injected, but is preferably stamped and formed from sheet metal using standard tool and die methods.

FIG. 4A

Figures 4A, 4C:
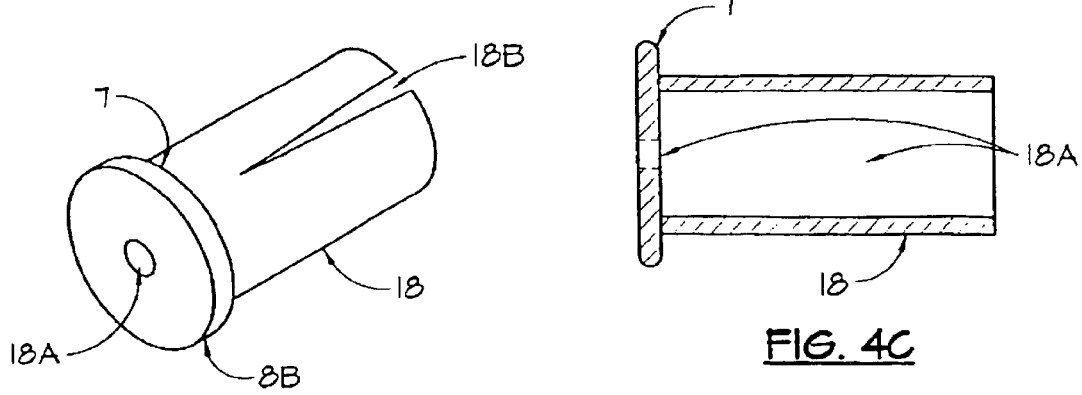
FIG. 4A is a perspective view of a physical bushing.
FIG. 4C is a cross-section through a physical bushing.

FIG. 4A shows a perspective view of a physical bushing 15 for use on masonry buildings. The cap 8A is similar to the christmas tree and spiral bushings except the top is bare. The outer radius 8B contains a bearing surface 7 on its underside for riding against the smooth lip 3B of an embossment hole 26 on a tomahawk clip 25, or other connector with embossments.

The top part of a tomahawk clip 25 is held in place against a rafter and the position of the embossment holes 26 are marked on the concrete-block or bricks. A carbide-tipped drill bit, used for drilling core holes in rock, and with a diameter of its sleeve similar to the diameter of the cylinder 18, is used to drill at the marked spots, into the masonry a distance approximately equal to the length of the cylinder 18.

Instead of a hole, the core drill forms a round sleeve with a similar diameter as the cylinder 18 of the bushing. When the sleeve is drilled, the core remains in the hole, still attached at the backside to the masonry.

The core of the brick or concrete-block provides additional support and strength, and extra surface area for the cylinder 18, when epoxy is injected into the drilled sleeve.

FIG. 4B

Figure 4B:
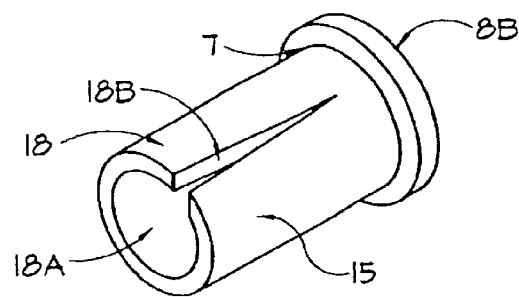
FIG. 4B is a perspective rear view of a physical bushing.

FIG. 4B shows a perspective drawing from the bottom end of a physical bushing. The cylinder 18 has a diameter slightly smaller than the embossment hole 26, so it can fit without any interference. The cylinder has a hole 18A at the bottom with an expansion slot 18B on its side.

The expansion slot 18B is triangular shaped and ends part way down the cylinder 18. The expansion slot 18B allows the end of the cylinder to be slightly flared to the outside. Inserting the cylinder 18 into the drilled hole slightly compresses this flared end, holding the cylinder 18 into the drilled hole.

Standard epoxy is inserted into the drilled sleeve before the physical bushing 15 is inserted. The expansion slot 18B helps hold the cylinder 18 in position while the epoxy sets and dries. Epoxy is squeezed into the hole 18A, helping form better adhesion. Excess epoxy is squeezed out the excess hole 18C. Once the epoxy dries, the physical bushing 15 holds the tomahawk clip 25 securely to the wall. The top part of the tomahawk clip is secured to a gable end by wood bushings or lag bolts and washers.

FIG. 4C

FIG. 4C shows a longitudinal cross-section through a physical bushing.

The physical bushing can be made from several materials including metal, plastic, ceramic, recycled metal, or combination of materials. The bushing can be molded, machined, cast, forged, or injected, but is preferably stamped from sheet metal using standard tool and die methods.

FIG. 5A

Figures 5A, 5B:
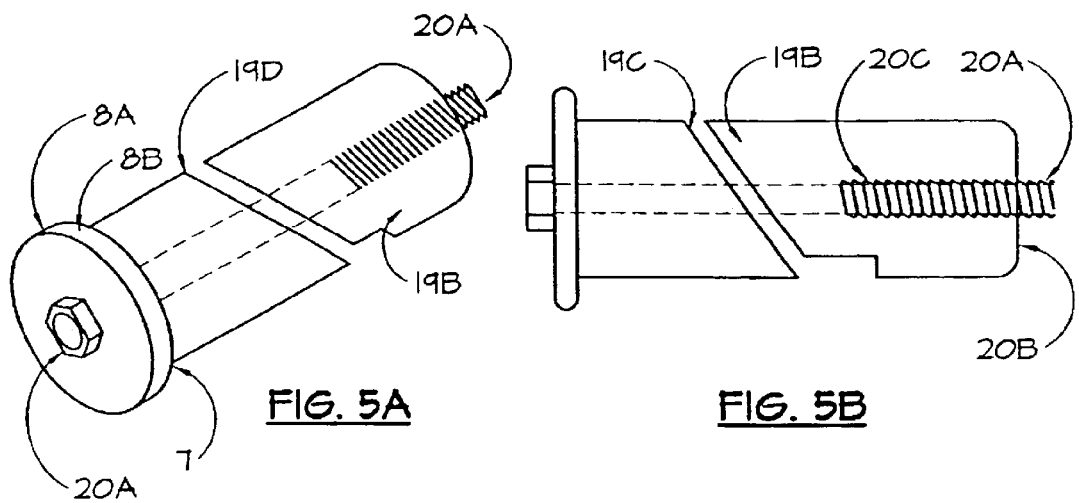
FIG. 5A is a perspective view of a tapered wedge bushing.
FIG. 5B is a cross section view of a tapered wedge bushing.

FIG. 5A shows a perspective view of a tapered wedge bushing 16 for use on masonry buildings. The cap 8A is similar to the christmas tree, spiral, and physical bushings except that a bolt 20A is located in a hole in the approximate center of the cap 8A. The bolt can turn freely and is screwed into a threaded hole 20C in the back 20B of the lower truncated cylinder. This bushing can be used for masonry buildings, where a core drill is not available, and a common carbide drill bit is available with a diameter similar to the diameter of the two truncated cylinders.

The tapered wedge bushing 16 is inserted through embossment holes 26 of a tomahawk clip 25 and into a drilled hole in the masonry, using a common carbide drill bit with a diameter similar to the diameter of the cylindrical end of the bushing.

The cylindrical end that is inserted into the drilled hole consists of two truncated cylinders. The top truncated cylinder has the cap 8A and bolt 20A attached and is referred to as the top wedge 19A. The lower truncated cylinder has the back 20B and is referred to as the lower wedge 19B.

FIG. 5B

FIG. 5B shows a side view of a tapered wedge bushing 16. On the left is the cap 8A containing the free-spinning bolt 20A. The outer radius 8B contains the bearing surface 7 that rides against the smooth lip 3B of embossment holes 26.

Right or below the bearing surface 7 are the truncated cylinders. The upper truncated surface 19C of the upper wedge 19A fits against the lower truncated surface 19D of the lower wedge 19B. This side view shows that the threaded hole 20C, for the free-spinning bolt 20A, is offset from the center of the back 20B.

When the bolt 20A is turned clockwise, it screws deeper into the threaded hole 20C in the back 20B, pulling the bottom wedge 19B close to the top wedge 19A. Once the upper truncated surface 19C contacts the lower truncated surface 19D, they slide against each other.

In this view, the bottom wedge 19B would be forced up and the top wedge 19A would be forced down. Further tightening of the bolt 20A forces the bottom wedge 19B and the top wedge 19A against the walls of the drilled hole. This secures the tapered wedge bushing 16 and tomahawk securely to the masonry of the house. Standard epoxy can be used in the hole to provide extra holding power, as the bushing would be tight against the hole as the epoxy hardens.

The tapered wedge bushing 16 can be made from several materials including metal, plastic, ceramic, recycled metal, or combination of materials. The bushing can be molded, machined, cast, forged, or injected, but the top wedge 19A is preferably stamped from sheet metal using standard tool and die methods, and the lower wedge 19B is preferably cast metal.

FIG. 6A

Post-and-beam houses are common in the tropics because they are very open and airy. Roof loads are transferred to heavy beams and posts made of thick timbers. In order to secure the corner of the house, one of the weakest parts of a house during a hurricane, and a focal point of stress during seismic activity, a heavy-duty clamp 21 and heavy-duty bushing 17 should be used to hold down a seismic clip.

FIG. 6A shows a side view of a heavy-duty bushing 17, which is basically a Christmas tree bushing with an extended head 5 and longer screw 9. The barbed leaders 11 are similar to those on a Christmas tree bushing 6, but the cap 8A is missing, and replaced with an extended head 5. The outer radius 8B and bearing surface 7 are in the same general location as on a Christmas tree bushing 6. The screw 9 is longer than one on a Christmas tree bushing 6 because the heavy-duty bushing 17 is longer.

FIG. 6B

FIG. 6B shows a front view of a heavy-duty bushing 17 with screw hole 10, outer radius 8B, and extended head 5.

The bushing is inserted into embossment holes just as the other bushings are utilized. The outer radius 8B and underlying bearing surface 7 contact the embossment hole 4 of the seismic clip 1, but the extended head 5 of the heavy-duty bushing 17 is utilized in combination with a seismic clip 1 and heavy-duty clamp 21. The heavy-duty bushing 17 fastens a seismic clip 1 to a rafter, outside sheathing, and underlying structural members by being forced into the sheathing and screwed tight. A heavy-duty clamp 21 is then put over the seismic clip 1 and extended head 5 of the heavy-duty bushing 17.

FIG. 6C

FIG. 6C shows a perspective view of a heavy-duty clamp 21 for timber-framed houses. One of the most important problem solving solutions of the heavy-duty clamp 21 is in securely tying the outside sheathing to the numerous underlying structural members of the house.

The heavy-duty clamp 21 has a bridge 43 in the center with a left wing 44B and right wing 44A attached at short, right-angle bends 32A. Both wings 44A and 44B contain nail holes 41. The bridge 43 contains a hole 18A.

FIG. 6D

FIG. 6D shows the heavy-duty clamp 21 installed over a seismic clip 1, which is held down by a heavy-duty bushing 17. The center bridge 43 has a height and width that is formed by the short, right-angle bends 32A. The height and width of the bridge 43 allows the heavy-duty clamp 21 to straddle a seismic clip 1.

The hole 18A on the bridge 43 is slightly larger than the extended head 5 of the heavy-duty bushing 17. This allows the heavy-duty clamp 21 to be placed over a seismic clip 1 that has been fastened to outside sheathing, and also over the extended head 5 of a heavy-duty bushing 17. Then screws or nails are driven through the nail holes 41 of the left and right wings 44A and 44B into the outside sheathing and into the underlying top plate or header beam.

When a heavy-duty clamp 21 is attached over the seismic clip 1, over a heavy-duty bushing 17, and into the sheathing, it helps make the house much more resistant to earthquakes and high winds. This combination also helps prevent double shear.

The heavy-duty clamp 21 and heavy-duty bushing 17 can be made from different materials including metal, plastic, ceramic, or combination of materials. The preferred method is stamped sheet metal using standard tool and die methods.

FIG. 7

Figure 7:
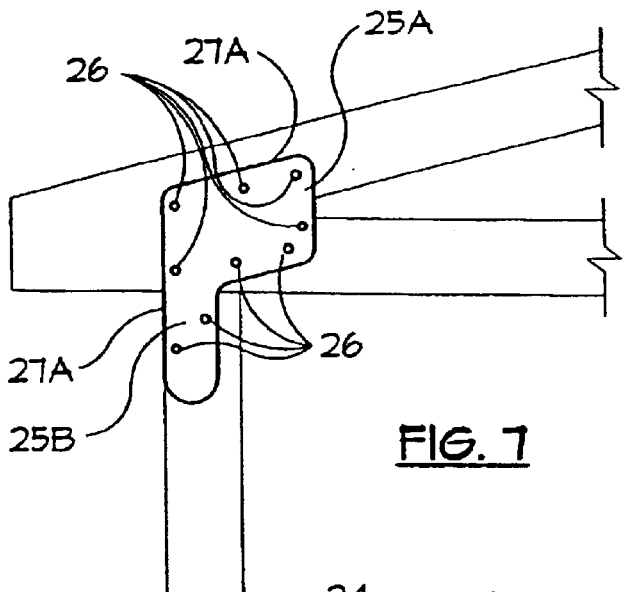
FIG. 7 is a front view of a tomahawk connector.

FIG. 7 shows a front view of a tomahawk connector 25. The preferred use would be installed on a wood-frame house with wood gable and roof. The most important problem-solving solutions of the tomahawk connector is in securely tieing the outside sheathing to the underlying structural members of the house, and keeping the gable end of a roof from being blown from a building. The tomahawk connector 25 consists of a mostly flat plate with a top web 25A and bottom web 25B with embossment holes 26.

On most wood-frame houses, the gable end is constructed of wood. During hurricanes, the gable end can be blown out of the building due to the high pressures inside a house compared to the low pressure of wind blowing over and around the building. During earthquakes, the gable end can be shaken out if not securely tied into the roof and other walls.

The tomahawk connector 25 shown in FIG. 7 is left-handed, and would be installed as shown on the left-side of a gable wall. The preferred type of wood house would be where the rafters were made on site. The tomahawk connector 25 is installed at the junction of the hip wall, gable sheathing, and roof line. The outside edge 27A of the tomahawk clip 25 is aligned with the outer edge of the building and the upper or top edge 27B is aligned with the roof. Once it is lined up, christmas tree or spiral bushings are used to fasten the connector to the house.

The embossment holes 26 of the upper web 25A are located over the outside sheathing and the underlying rafter, joist, or top plate, depending on if the building was constructed with rafters or roof trusses. A lag bolt and washer could be used, but a Christmas tree bushing or spiral bushing would be preferred to install the upper web 25A to the gable end.

On many concrete-block and brick houses, the gable end is constructed of wood. During hurricanes, the gable end can be blown out of the building due to the high pressures inside a house compared to the low pressure of wind blowing over and around the building. During earthquakes, different flexibility properties of wood and masonry make this area unstable.

On masonry houses with a wood gable end, the tomahawk connector 25 can be used to fasten the gable end to the roof and masonry walls. The tomahawk connector 25 is positioned so the top edge is against the roof and the outer edge is against the outer wall, as for a wood house. The embossment holes 26 are marked and drilled in the bricks for physical or tapered wedge bushings.

This alignment puts the embossment holes over the most important joints in the corner of a building. The bricks or concrete-blocks from two side walls are usually fastened together by the mason during construction. The embossment holes 26 of the bottom web 25B are located over these bricks and a physical bushing 15 or tapered wedge bushing 16 can be used to lock the bottom web 25B to the brick wall. Christmas tree 6 or spiral 12 bushings would be used to install the upper web 25A onto the outer sheathing of the gable end, and underlying structural members.

The right-hand tomahawk clip 25 would be a mirror image, and would fit on the right side of the gable end. The tomahawk clip 25 can be made from many materials, but the preferred method is stamped sheet metal using standard tool and die methods.

FIG. 8A

Figure 8A:
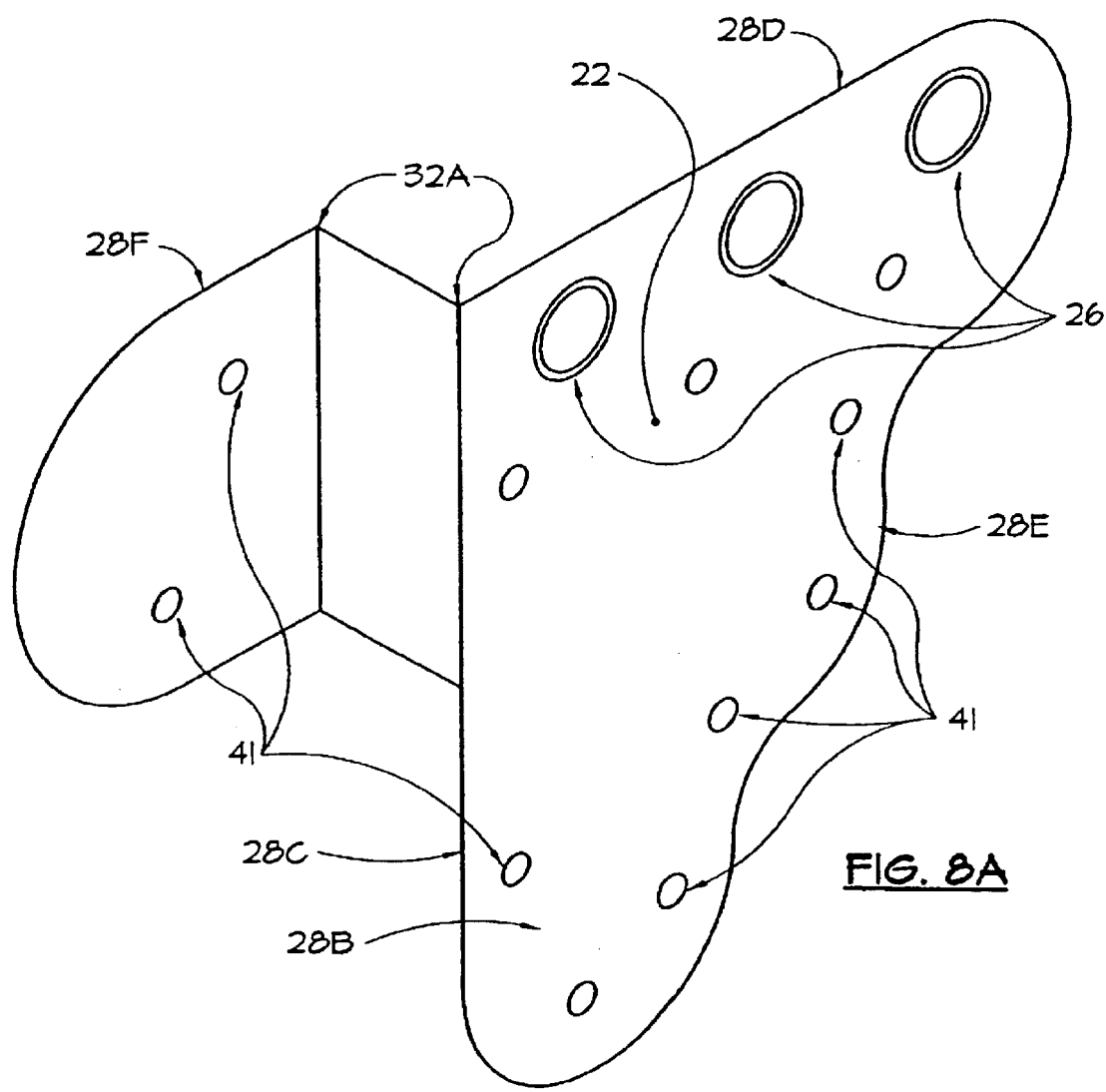
FIG. 8A is a is a perspective view of a tee retainer.

FIG. 8A is a perspective view of a tee connector 22 on the gable end of a wood-frame house. If the rafters were crafted on-site, the tee connector 22 secures the outside sheathing to the rafter, top plate, and wall stud. If the roof were built using trusses, the tee connector 22 secures the outside sheathing to the rafter or top chord, bottom chord, and wall stud.

Many houses have been constructed with pre-manufactured roof trusses. These roof members are very strong in compression due to the cross bracing and close tolerances in building methods at the factory. Many of these roofs support heavy clay tiles. However, the assembly and bracing at the home site are not well controlled, especially the attachment and bracing methods.

Many of the trusses are toe-nailed to the top plate and bracing was minimal or nonexistent. Any bracing was primarily to keep the trusses from tipping over. The stability of the trusses comes from the roof sheathing. Only a few nails keep the gable end roof truss from being blown out during a tornado and hurricane, or from being shaken out during an earthquake.

Factory-made trusses are a quick and economical way of making roofs for houses. They are strong in compressive loads, but they are weak in during wind forces opposing the gable end. The gable ends of truss roofs are primarily weak against pressure differentials of high pressure in the house compared to low outside pressure during hurricanes. Earthquakes can cause the gable end sheathing to fall out.

FIG. 8A is a front view of a tee connector 22. One of the most important problem solving solutions of this embodiment is in securely tieing the outside sheathing to the numerous structural members of the house.

The tee connector 22 consists of a mostly flat metal plate with a crown web 28A, root web 28B, and trigger web 28E. All webs contain embossment holes 26 and or nail holes 41. On a house with rafters constructed on site, the tee connector 22 is installed on the outside sheathing, at the junction of the underlying rafter, corner stud, and top plates from two walls.

The exterior edge 28C of the tee connector 22 is aligned approximately with the outer edge of the building, and the upper or summit edge 28D is aligned with the underside of the roof. Once it is lined up, spiral or Christmas tree bushings can attach the tee connector to the gable end, or the locations of the embossment holes 26 can be marked and drilled for lag bolts.

This alignment puts the embossment holes over the most important joints in the corner of a building. The rafter, corner stud, and top plates from two walls meet at this junction, and the outside sheathing covers each of these structural members.

The embossment holes 26 or nailholes 41 along the crown web 28A line up with the rafter, the embossment holes 26 or nailholes 41 along the root web 28B line up with the top plate and wall stud, and the embossment holes 26 or nailholes 41 of the trigger web 28E line up with the top plate. Right angle bends 32A allow the rafter web 28F to wrap around the corner. Securing the sheathing firmly to each member will make a house more resistant to hurricanes, tornadoes, and earthquakes.

FIG. 8B

Figure 8B:
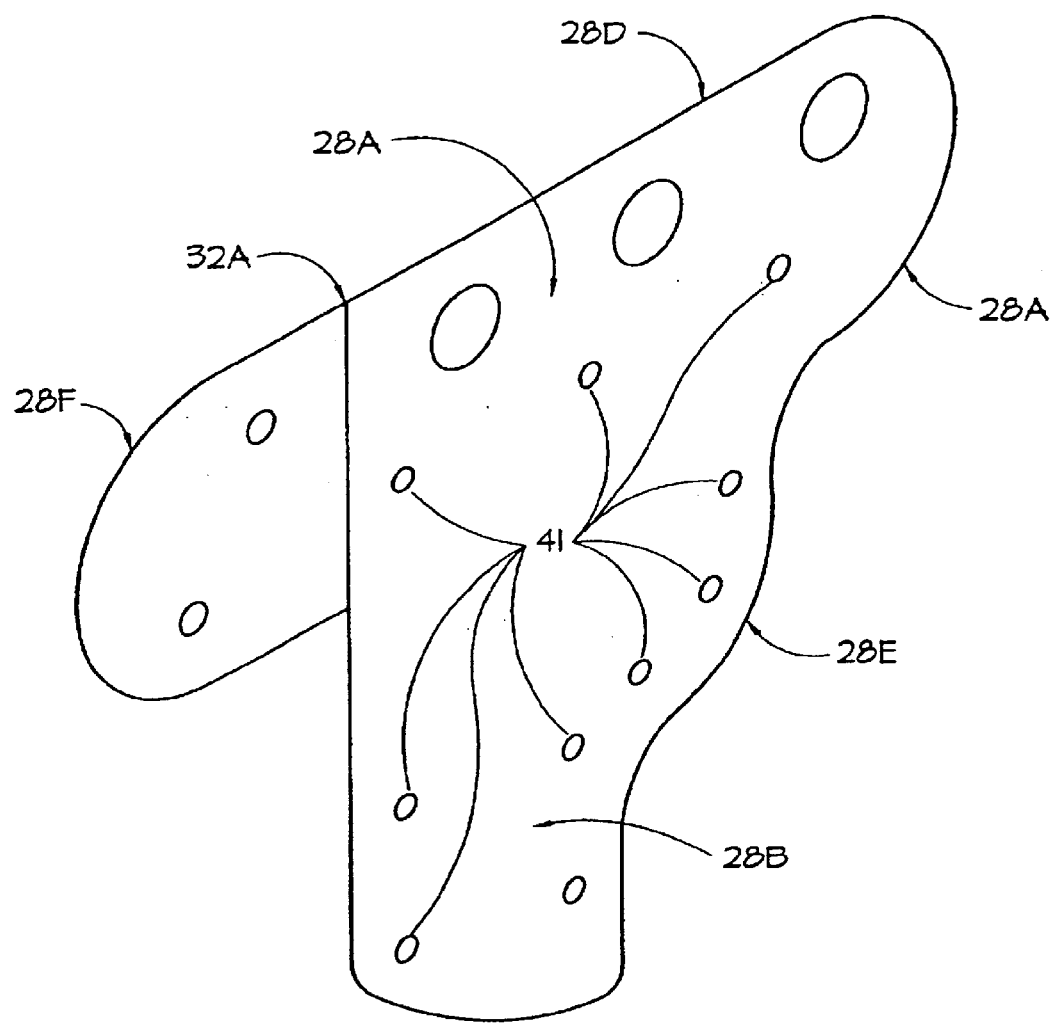
FIG. 8B is a front view of a tee retainer.

FIG. 8B is a front view of a tee connector. On houses constructed with roof trusses, the tee connector 22 is installed on the outside sheathing of a house, at the junction of the underlying rafter or top chord, corner stud, bottom chord, and top plates from two walls. The exterior edge 28C of the tee connector 22 is aligned approximately with the outer edge of the building, and the upper or summit edge 28B is aligned approximately with the roof. Spiral or christmas tree bushings 6 or 12, nails, screws or lag bolts can attach the tee connector 22 to the gable end.

This alignment puts the embossment holes over the most important joints in the corner of a roof-truss building. The embossment holes 26 along the crown web 28A line up with the rafter or top chord, the embossment holes 26 or nail holes 41 along the root web 28B line up with the top plate and wall stud, and the embossment holes 26 and nail holes 41 of the trigger web 28E line up with the bottom chord and top plate.

The rafter or top chord, corner stud, ceiling joist and top plates from two walls meet at the gable junction. The outside sheathing covers each of these structural members, and securing the sheathing firmly to each member will make a house more resistant to hurricanes, tornadoes, and earthquakes.

The most important problem solving solutions of this invention is in securely tieing the outside sheathing to the numerous underlying structural members of the house, and preventing the gable end from blowing out.

The tee connector 22 can be made from many materials, but the preferred method is stamped sheet metal using standard tool and die methods.

FIG. 9A

Figure 9A:
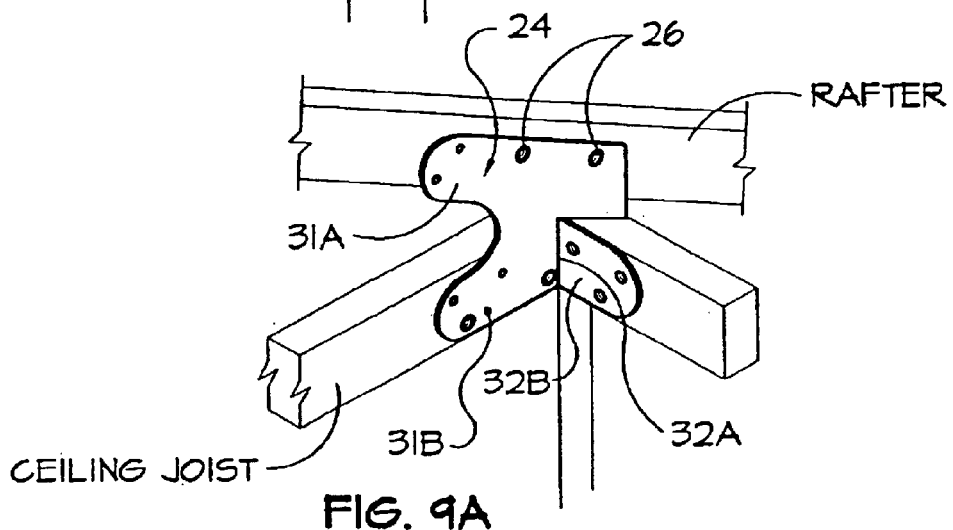
FIG. 9A is a front view of a mickey connector.

FIG. 9A is a front view of a mickey connector 24. This connector is designed for post-and-beam wood houses where the main wall beam extends out beyond the gable end.

The mickey connector 24 consists of a mostly flat metal plate with two webs, that is preferably made of stamped sheet metal. The pinnacle web 31A and tuber web 31B contain embossment holes 26, and the tuber web 31B contains a right-angle bend 32A and dog leg 32B.

The mickey connector 24 is installed on the outside sheathing of the gable end of a house, at the junction of the underlying rafter and ceiling joist, and the exposed wall beam. The mickey connector 24 is aligned so that the pinnacle web 31A is flush against the roof line, and the dog leg 32B is against the wall beam sticking out of the house.

When the mickey connector 24 is aligned like so, and fastened with bushings or lag bolts, the pinnacle web 31A and tuber web 31B fastens the outside sheathing to the underlying rafter and ceiling joist respectively. The dog leg 32B is fastened to the exposed wall beam. This connection ties the hip wall securely to the gable end and helps prevent the gable end from being blown in or out by strong winds.

The dog leg 32B connected to the exposed wall beam has its fasteners connected perpendicular to the wall beam. In a strong wind storm, the fasteners would have to be sheared in order for the gable end to be blown out of a house.

FIG. 9B

Figure 9B:
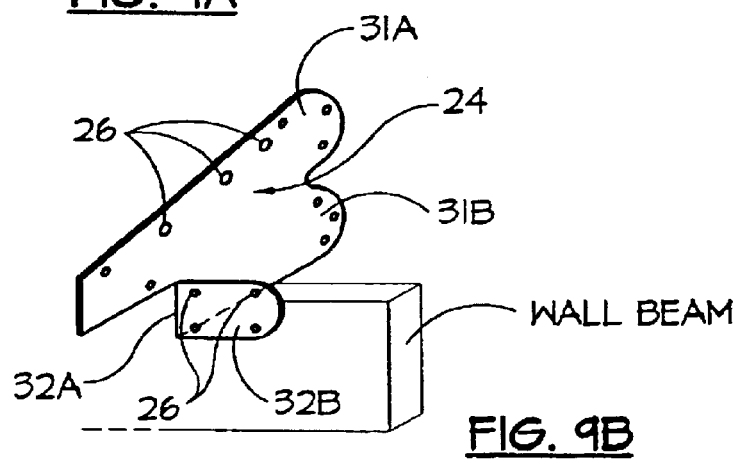
FIG. 9B is a side view of a mickey connector.

FIG. 9B is a side view of a mickey connector showing the right angle bend 32A and dog leg 32B. The dog leg 32B is attached to the exposed wall beam through nail holes 63, while the pinnacle web 31A and tuber web 31B attach to the gable end through nail holes 63 and or embossment holes 26. This connector ties the gable end and the underlying structural members to the hip wall of a house. This keeps the gable end of a house from being blown out or disconnected, and helps transfer and absorb forces from a hurricane or seismic activity.

FIG. 10A

Figure 10D:
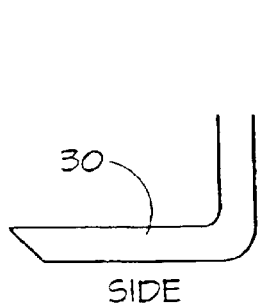
FIG. 10D is a front view of another embodiment of a banana clip.
Figure 10A:
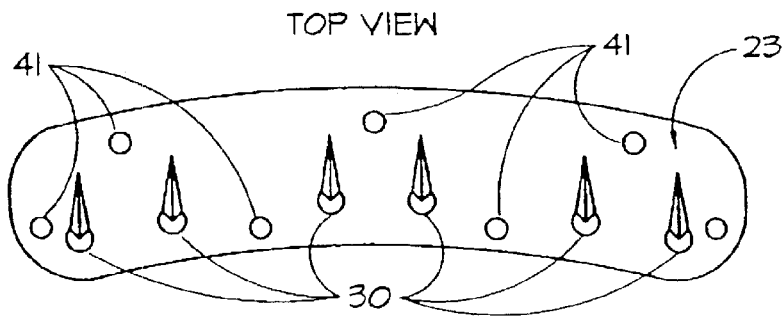
FIG. 10A is a front view of a banana clip.
Figure 10D:
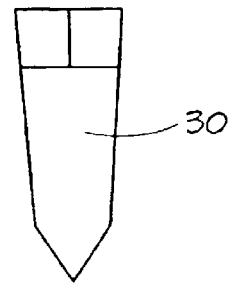

FIG. 10A shows a front view of a banana clip 23. This connector is attached to the outside sheathing and underlying structural members of the bottom part of a wall. One of the most important problem-solving solutions of this embodiment is in securely tieing the outside sheathing to the structural members of the wall and floor, including the wall stud and sill plate.

The banana clip 23 is banana-shaped so that water will run off the zenith edge 29A and roll off the foot edge 29B. By being long and wide, the surface area prevents the outer sheathing from splitting, and prevents the wall from racking.

On a stud-wall constructed house, the banana clip 23 is installed on the outside sheathing of a house at the junction where the underlying wall stud S and sole plate SP are joined together. A stud finder can be used to find and mark the wall stud locations and sole plate on the outside sheathing. The banana clip is installed so that the mid point of the long dimension is over the middle of the wall stud and the end points of the long dimension are over the middle of the sole plate.

This alignment puts the embossment holes 26 over the most important link in stud-wall construction. The wall stud and sole plate meet at this junction, and are usually toe-nailed, which is a weak connection. Christmas tree 6, spiral bushings 12, nails, or lag bolts can attach the banana clip 23 to the outer sheathing and underlying wall stud S and sole plate SP.

On some stud-wall, and many post-and-beam constructed houses, the studs may rest on a sill plate, or the posts may not be attached to a sole plate. In this case, the banana clip 26 is installed on the outer sheathing, where the post rests on the sill. This would tie the outside sheathing to the post and sill plate. It would prevent the bottom edge of the sheathing from splitting, pulling away from the wall, and prevent the wall from racking.

FIG. 10B

Figure 10B:
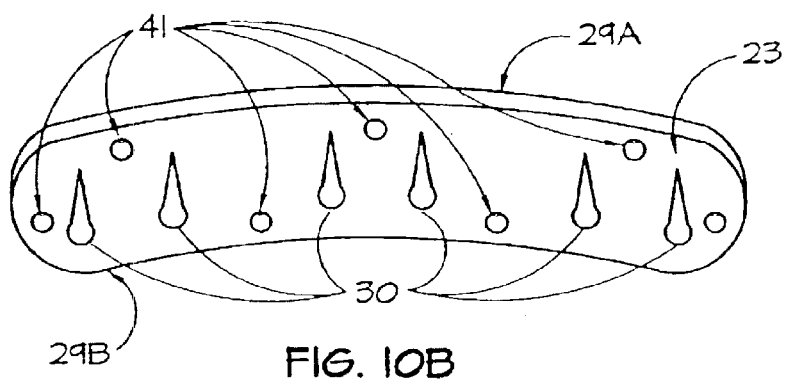
FIG. 10B is the back view of a banana clip.
Figure 10D:
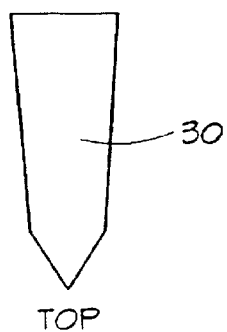

FIG. 10B shows the back view of a banana clip 23. Attached to the back of the banana clip 23 are teeth 30, and the zenith edge 29A that grip the outside sheathing. During a hurricane the wall wants to lift and blow out; during an earthquake the wall wants to rack or move parallel to its length.

When the back of a banana clip 23 is attached to the outside sheathing and underlying structural members, the teeth 30 prevent upward and side to side movement of the outside sheathing because of the shape of the teeth 30 and the curve of the banana clip 23.

FIG. 10C

Figure 10C:
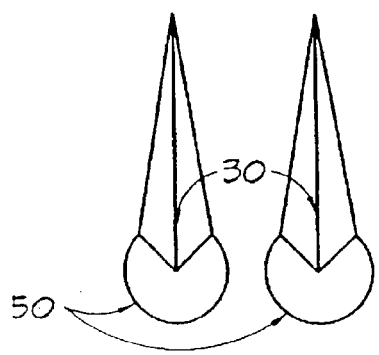
FIG. 10C is a magnified view of banana clip teeth.
Figure 10D:
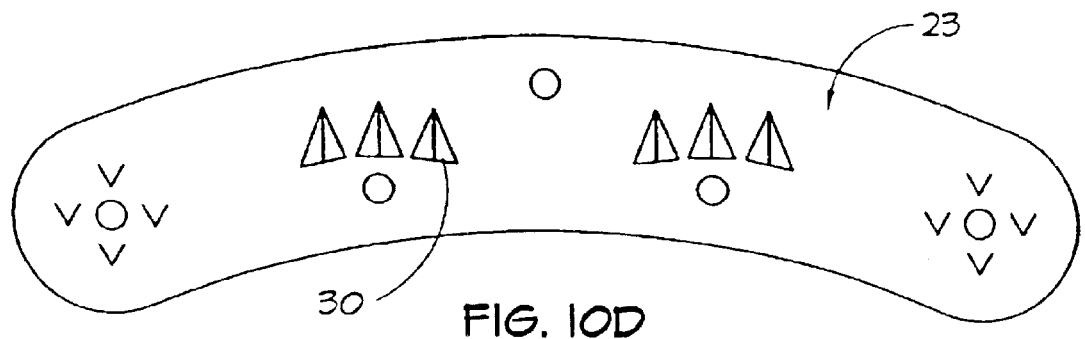
Figures 10C, 10D:
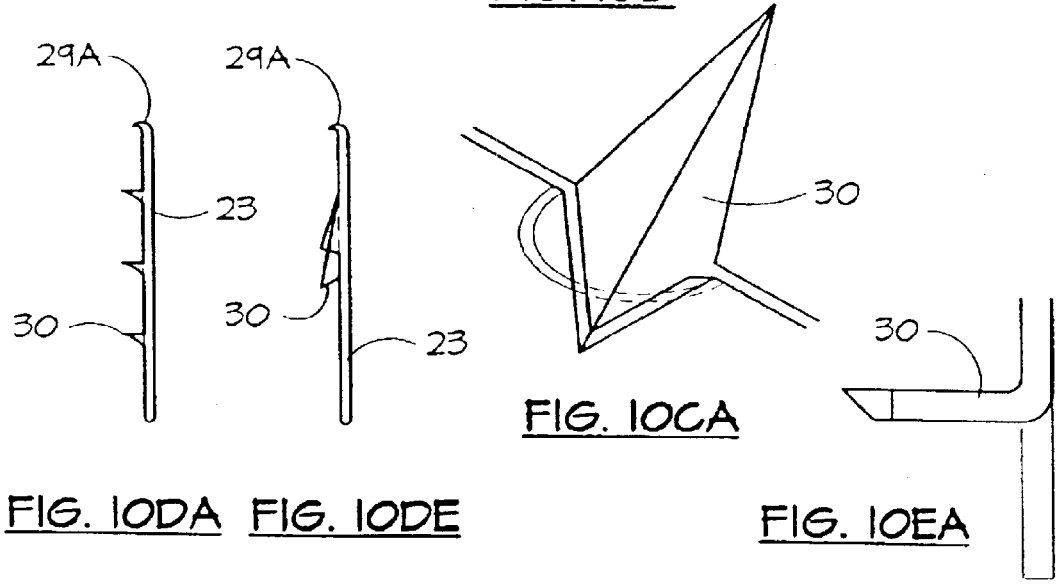

FIG. 10C shows a magnified view of two teeth 30 on the back of a banana clip 23. The teeth 30 are punched from the viewers side so the teeth 30 would angle out the back of the paper and dig into the sheathing. The teeth 30 are angled down and slightly sideways to form rasp holes 50. When these teeth bite into the outside sheathing, they prevent uplifting or racking motions to a wall.

FIG. 10CA

FIG. 10CA shows a perspective view of a tooth 30. The rasp hole 50 is drawn lightly to show the sharp edge of a tooth 30. These teeth look like a cheese grater, but they can have other shapes.

FIG. 10D–10DE

FIG. 10D–10DE shows a side, bottom, and top view of how different teeth 30 can be punched into a banana clip 23 or other clips that attach onto the outside sheathing, using various common methods of sheet metal forming.

FIG. 10D

FIG. 10D shows a front view of another embodiment of a banana clip 23 with unique teeth 30 formed by different sheet metal forming.

FIG. 10DA

FIG. 10DA shows a side view of another embodiment of a banana clip 23 with teeth 30 formed in a different manor of sheet metal forming. The front of the banana clip 23 is to the right, and the zenith edge 29A is on the top. These teeth 30 are on the left and right edge of the banana clip 23.

FIG. 10DB

FIG. 10DB shows a top view of teeth 30 from FIG. 10DA formed in a different manor of sheet metal forming.

FIG. 10DC

FIG. 10DC shows a bottom view of teeth 30 from FIG. 10DA formed in a different manor of sheet metal forming.

FIG. 10DD

FIG. 10DD shows a side view of teeth 30 from FIG. 10DA formed in a different manor of sheet metal forming.

FIG. 10DE

FIG. 10DE shows a side view of another embodiment of teeth 30 formed in a different manor of sheet metal forming, without forming rasp holes 50. These teeth 30 are the six teeth in the middle of the banana clip 23 in FIG. 10D. The zenith edge 29A is at the top and the front side is to the right.

FIG. 10E

Figure 10E:
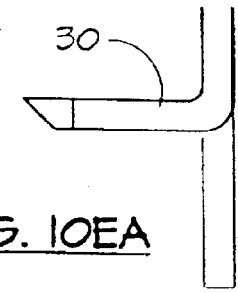
FIG. 10E is a back view of another embodiment of a banana clip.
Figure 10E:
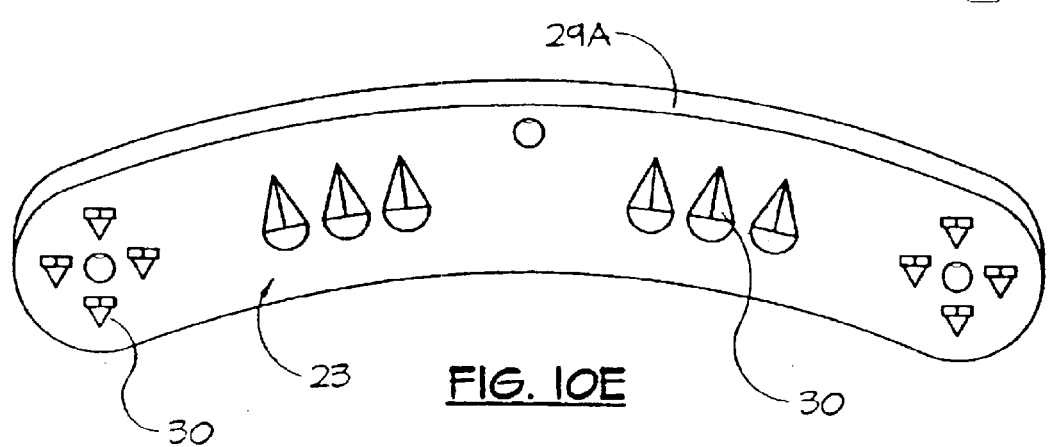

FIG. 10E shows a back view of banana clip 23 with the zenith edge 29A at the top, and teeth 30 along the back.

FIG. 10EA

FIG. 10EA shows a side view of the teeth 30, at the left and right ends of the banana clip 23, bent out.

By securing the banana clip 23 to the outside sheathing and underlying wall stud and sole plate, through the embossment holes, the connection is made secure. Depending on how the house was constructed, the outside sheathing covers the wall studs, sole plate, header, and sill plate. Securing the sheathing firmly to each member will make a house more resistant to hurricanes, tornadoes, and earthquakes.

The banana clip can be made of many different materials, but the preferred method is stamped sheet metal.

FIG. 11A

Figure 11A:
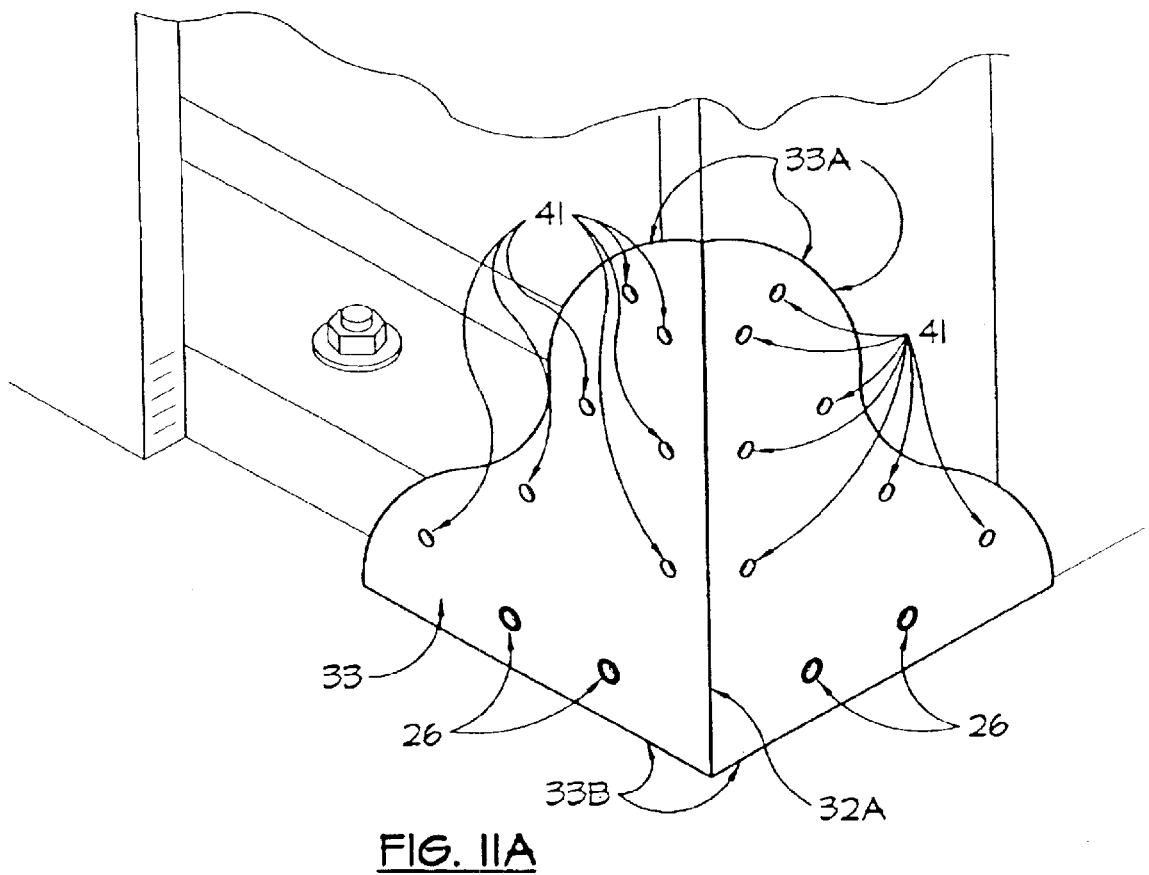
FIG. 11A is a perspective view of a corner clip.

FIG. 11A is a perspective view of a corner clip 33. This connector is attached to the outside sheathing and underlying structural members at the corner of a wall using embossment holes 26 and nail holes 41. One of the most important problem solving solutions of this embodiment is in securely tieing the outside sheathing to the corner post and structural members of the wall, and tieing the two walls together.

On some types of houses, the end column or corner post may be missing from the wall. Some houses may have a window in the corner. During seismic or high wind loads, the corner post may not have enough lateral-load transfer capacity to absorb or transfer the pressure force to other walls.

The corner clip 33 can be located on the top (near the roof), in the middle, and bottom (near the floor), of a corner in order to tie the outside sheathing of both walls together. This will stiffen the walls and help them transfer and absorb lateral forces.

FIG. 11A shows the corner clip 33 at the bottom of a corner, securing the outside sheathing to the corner post and sill plate from both intersecting walls. If the corner clip 33 were attached to the upper part of a corner, it would tie the walls together and the sheathing to the underlying top plate and corner post.

The corner clip 33 has a right angle bend 32A along the tallest edge. This enables the corner clip 33 to wrap around a corner and be fastened to the outside sheathing from both walls.

Along the slope 33A, the corner clip 33 is shaped like a playground slide in order to shed water easily. This shape is also architecturally pleasing and adds strength to the clip. By being L-shaped, the corner clip 33 has embossment holes 26 along the muffle edge 33B and nail holes 41 for attachment along the outside sheathing and to the underlying structural members. The corner clip 33 also prevents the outer sheathing from splitting and has more surface ea o prevent the wall from racking.

FIG. 11B

Figure 11B:
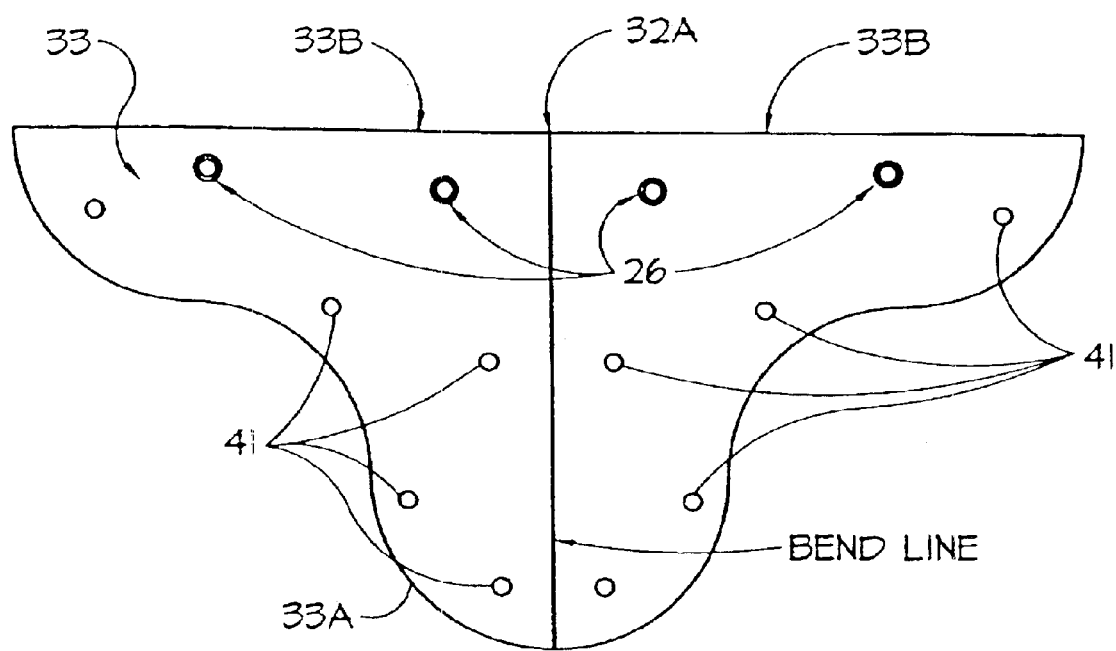
FIG. 11B is a flat-pattern layout of a corner clip.

FIG. 11B shows a flat-pattern lay out for a corner clip 33. The corner clip would preferably be formed from stamped sheet metal, but can be formed from other materials and other methods.

FIG. 12A

Figure 12A:
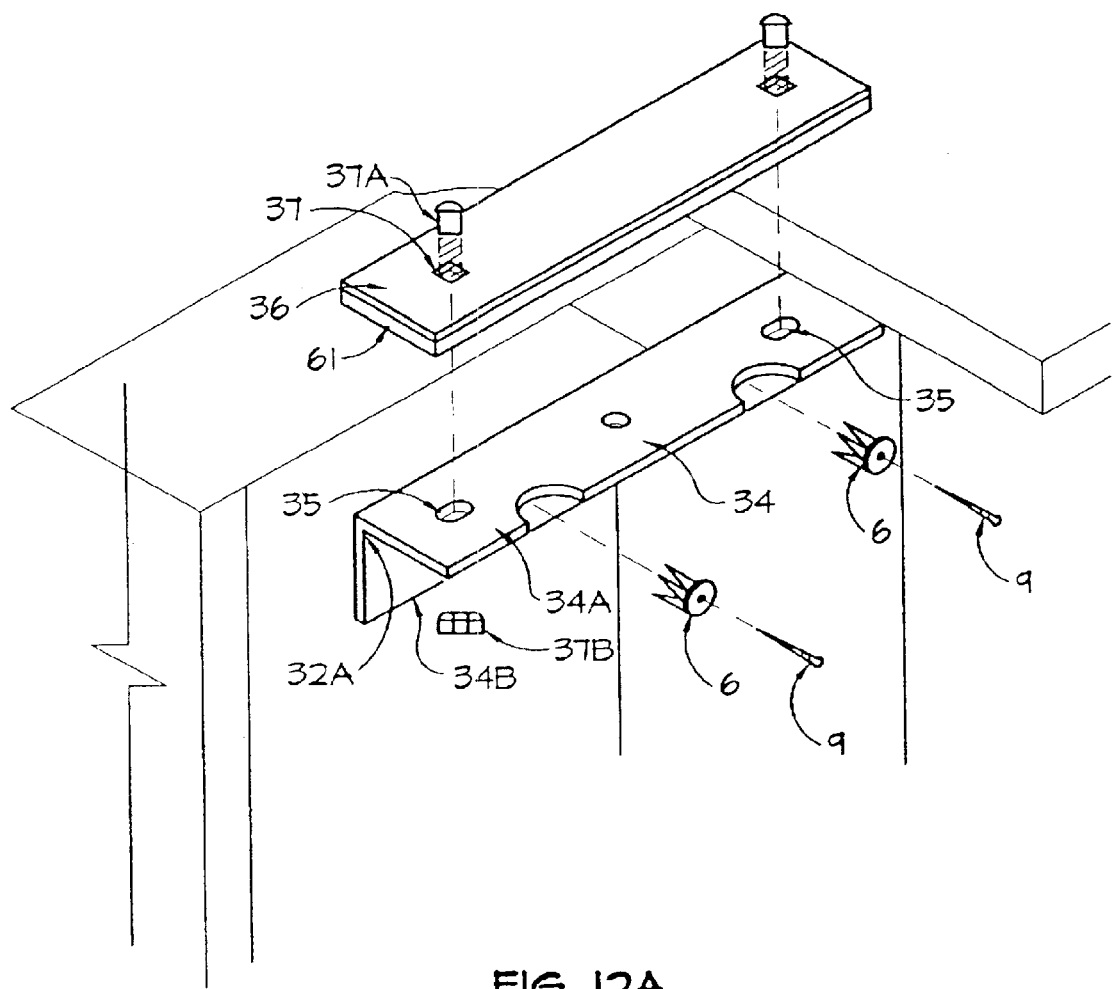
FIG. 12A is a perspective view of a gable connector and roof plate.

FIG. 12A shows a perspective view of a gable connector 34, and roof plate 36, as it would be installed on the outside of a wood frame house. The gable connector 34 looks like an angle-iron member with a prime web 34A and rump web 34B, joined by a right-angle bend 32A.

The rump web 34B contains embossment holes 26 near the ends. Christmas tree bushings 6, spiral bushings 12, or lag bolts would be used to attach the rump web 34B to the outside sheathing of a gable end and the underlying rafter. The gable connector 34 is installed under the eaves, with the rump web 34B against the gable wall and the prime web 34A against the bottom of the overhanging roof.

The prime web 34A has bolt slots 35 at either end that can accommodate a carriage bolt 37A. The gable connector 34 is held against the gable wall and the bottom of the roof. Holes are marked on the bottom of the roof, in line with the bolt slots 35, and then drilled with a common drill bit. The rump web 34B is attached to the gable wall with christmas tree bushings 6 and screws 9 or lag bolts.

FIG. 12B

Figure 12C:
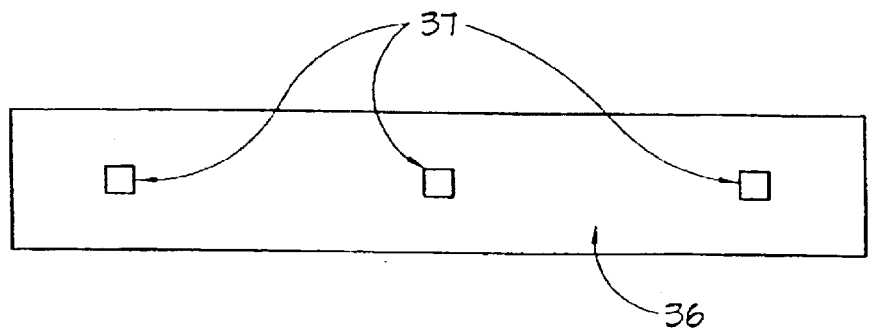
FIG. 12C is a top view of a roof plate.
Figure 12B:
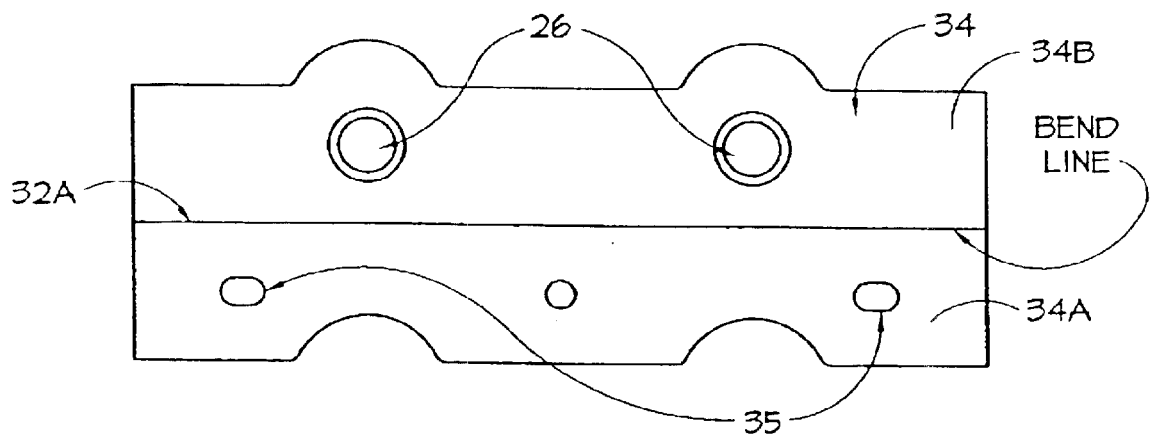
FIG. 12B is flat-pattern layout of a gable connector.

FIG. 12B shows a flat pattern layout for a gable connector 34. It can be formed from different materials and using different methods, but the preferred method is stamped sheet metal using standard tool and die methods.

FIG. 12C

FIG. 12C shows a top view and a flat pattern layout of a roof plate 36. The roof plate 36 is mostly rectangular with square carriage bolt holes 37 the same distance apart as the bolt slots 35 on the prime web 34A. From the top of the roof, as shown in FIG. 12A, carriage bolts 37A are inserted through square carriage bolt holes 37 in the roof plate 36, which is placed over the pre-drilled holes. The carriage bolts 37A go through the roof plate 36, and rubber gasket 61, through the roof cladding, through the roof sheathing, into the bolt slots 35 of the prime web 34A on the gable connector 34 and screwed tight with nuts 37B from below.

A standard rubber washer can be used around the carriage bolt 37A on top of the roof, in order to prevent rain from entering the hole. As shown on FIG. 12A, a rubber or neoprene pad. 61 can be used under the roof plate 36 in order to make the connection water tight and absorb forces from seismic or strong winds.

The carriage bolt 37A and square carriage bolt hole 37 allows one person to install and lock the screw from the bottom of the roof, without anyone holding the carriage bolt 37A from the top of the roof. The bolt slot 35 has slight side play so that the hole drilled through the roof can be slightly off.

When the carriage bolt 37A is tightened using the nut 37B on the prime web 34A, the roof plate 36 is secured against the roof cladding. The underlying roof sheathing is now secured against the top of the gable end rafter. The roof plate can be covered with shingles or tar, but since it is outside the house proper, it can not leak to the inside of the house.

Underneath the roof, the outside sheathing of the gable end is secured to the underlying structural member, including the gable end rafter, by the rump web 34B.

Installing a gable connector 34 and roof plate 36 on the gable end of a house ties together the roof sheathing, gable end outside sheathing, and gable end rafter. These connectors prevent the roof from being lifted up at the weak gable end, even if there is a long lookout. The connectors also help prevent the gable end wall from being separated from the roof, a very weak attachment on existing houses, according to pictures of damage from Hurricane Andrew. These connectors also help keep the roof sheathing attached to the roof at the gable end, which was another weak point during Hurricane Andrew.

The gable connector 34 and roof plate 36 can be made from many materials, but the preferred method is stamped sheet metal using standard tool and die methods.

FIG. 13

The tail part of a rafter, that hangs over the top plate, and extends beyond the wall is called the overhang. Sometimes, carpenters will attach a thin board on the ends of the rafter as an architectural member to finish off the sawn ends of the rafter or the tail cut. This cut may not be exactly even on each rafter and may or may not be covered by a thin facia board which provides little or no structural integrity.

For new construction, roof trusses are made in jigs at the factory so the tail cuts should be equal and even. Many may have facia boards attached to the tail cut, but the thin boards provide little or no structural integrity to the roof.

Figure 13:
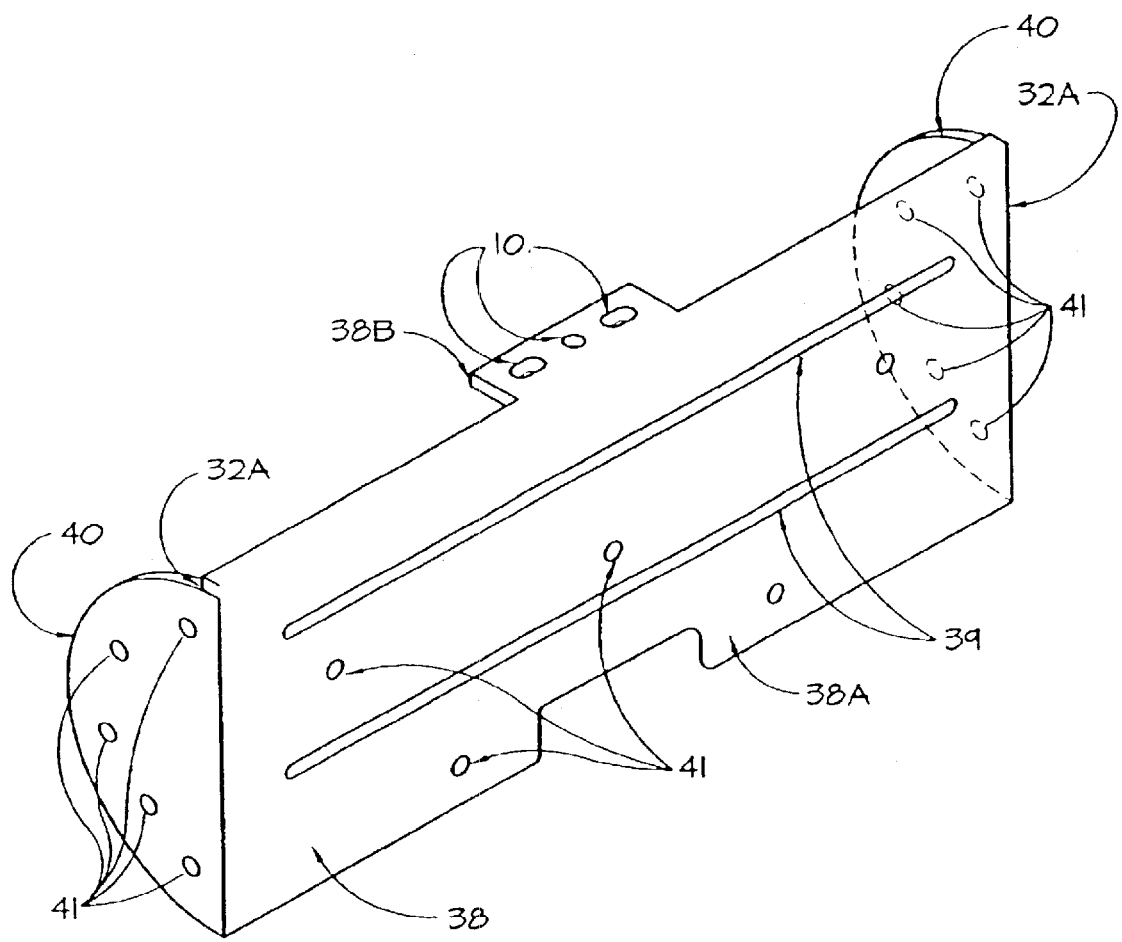
FIG. 13 is a perspective view of a facia board connector.

FIG. 13 shows a perspective view of a metal facia plate 38 tying together two rafters. The length is approximately equal to the distance between standard construction methods of rafter placement (usually 16 or 24 inches-on-center). The height of the metal facia plate 38 is approximately equal to standard lumber measurements. The length and height could be modified to be any combination of standard lumber dimensions or larger timber-frame construction, glue-lam, or plywood I-beam dimensions.

The metal facia plate 38 is installed to the rafters by tabs 40 that contain nail holes 41. The tabs 40 are bent approximately at right angles bends 32A to the main slat 38A. The main slat 38A contains strengthening ribs 39 that help resist bending and twisting. The roof tab 38B has screw holes 10, that can be used to attach the metal facia plate 38 to the roof sheathing.

A metal facia plate 38 can be installed on a house as it is being constructed, and can be installed as a retrofit on existing houses. The metal facia plate 38 ties the ends of the rafters securely together as one unit. It also helps prevent the rafter or roof truss from twisting or racking during installation, and prevents the rafter overhang from moving during wind storms. If a rafter overhang twists or lifts, it can cause separation of the roof from the wall and separation of the roof sheathing from the roof.

FIG. 14A

Frieze boards are installed on a house to prevent the introduction of insects and vermin into a house between the rafters, wall, and roof. Usually thin strips of boards are cut to size and toe-nailed between each rafter. The board is thin, and provides little structural integrity to the roof or wall, because toenailing is a weak means of attachment.

Figure 14A:
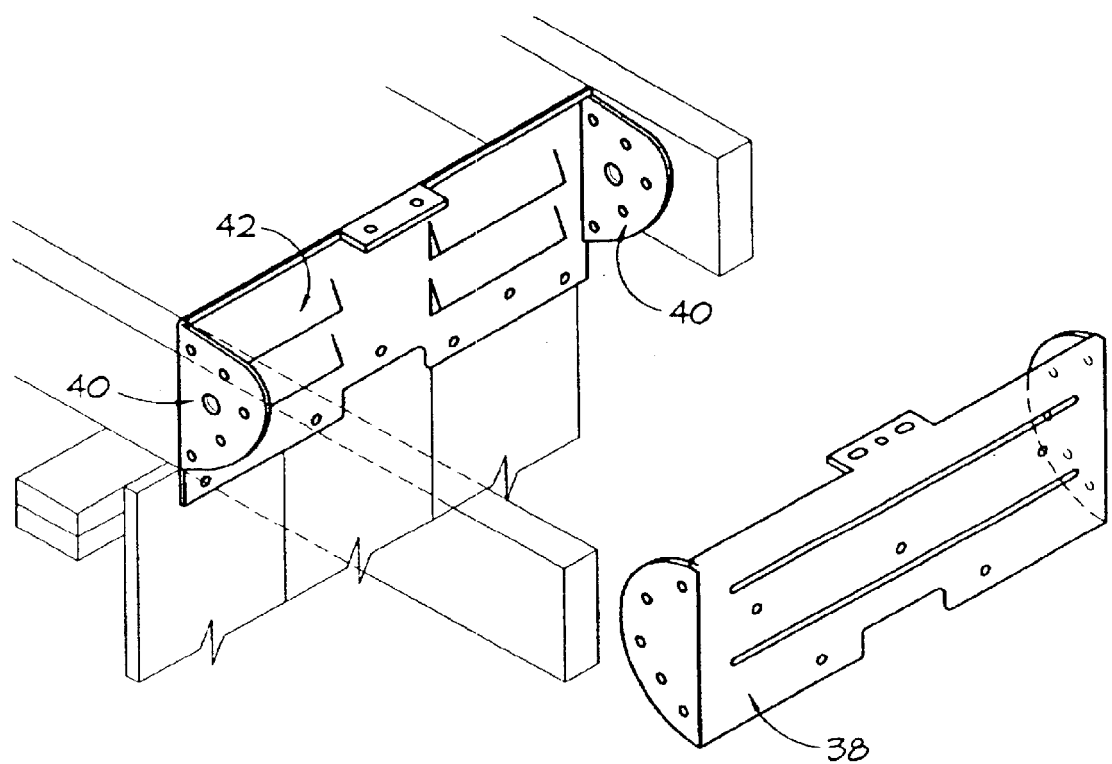
FIG. 14A is a perspective view of a frieze board connector and facia board connector installed on a rafter.

FIG. 14A shows a metal frieze plate 42 installed on a wood house between two rafters at the junction of the wall. The length is approximately equal to the distance between standard construction methods of rafter placement (usually 16 or 24 inches-on-center). The height of the metal frieze plate 42 is approximately equal to standard lumber measurements. The length and height could be modified to be any combination of standard lumber dimensions or larger timber-frame construction, glue-lam, or plywood I-beam dimensions.

This makes measuring for rafter placement unnecessary after the first rafter is installed on a house because the metal frieze plate 42 is standard construction dimensions and would make rafter placement very accurate on new construction. The metal frieze plate 42 has standard construction dimensions so that wooden frieze boards don't have to be cut, sometimes inaccurately.

The metal frieze plate 42 has ventilation ribs 42B on the major slat 42A. The ventilation ribs 42B add strength and provide ventilation to the attic or crawl space above the ceiling, by allowing air exchanges. In case of a hurricane, the ventilation ribs 42B allow the high pressure inside a house to equalize with low pressure air blowing along the side wall of a house, as occurs in the Bernoulli Effects.

FIG. 14A shows the attachment of a metal frieze plate 42 to the rafters by means of tabs 40, bent at right angle bends 32A. The tabs 40 have nail holes 41 and embossment holes 26 to make the rafter attachment very secure. The bottom part (below dashed line) of the major slat 42A (above dashed line) contains an extension called a top plate tab 42C. The top plate tab 42C has nail holes 41 for attachment to the outside sheathing and underlying top plate.

The rafters in this drawing are 2×6's, 16 inches-on center. The dimensions of the metal frieze plate 42 would let the carpenter constructing the house install the adjacent rafter board without measuring. Attachment of each metal frieze plate 42 would insure that each rafter is exactly equal distance from the previous one.

A metal frieze plate 42 can be installed as a connector during construction of a house, or can be installed as a retrofit on existing houses. When a house is being constructed, a metal frieze plate 42 can be used to accurately space the distance between rafters or roof trusses. The metal frieze plate 42 can also be used anywhere along the vertical length of a rafter or truss, not just at the outside wall. It can also tie together the rafter, top plate, outside sheathing, and roof sheathing.

As a retrofit, houses built with soffit boards usually have no structural connection between the rafter and outside sheathing. The connection between the rafter, top plate, and roof sheathing is weak due to toe-nailing or staples.

The soffit is a non-structural covering between the wall and overhang of the rafter. By removing the soffit, a metal frieze plate 42 can be used to securely tie the rafter, top plate, outside sheathing, and roof sheathing together.

The metal frieze plate 42 performs more functions than prior art hurricane clips for new construction. It is stronger, it ties together more structural members, it speeds assembly of a house, and it can be installed on new construction or as a retrofit.

FIG. 14B

Figure 14B:
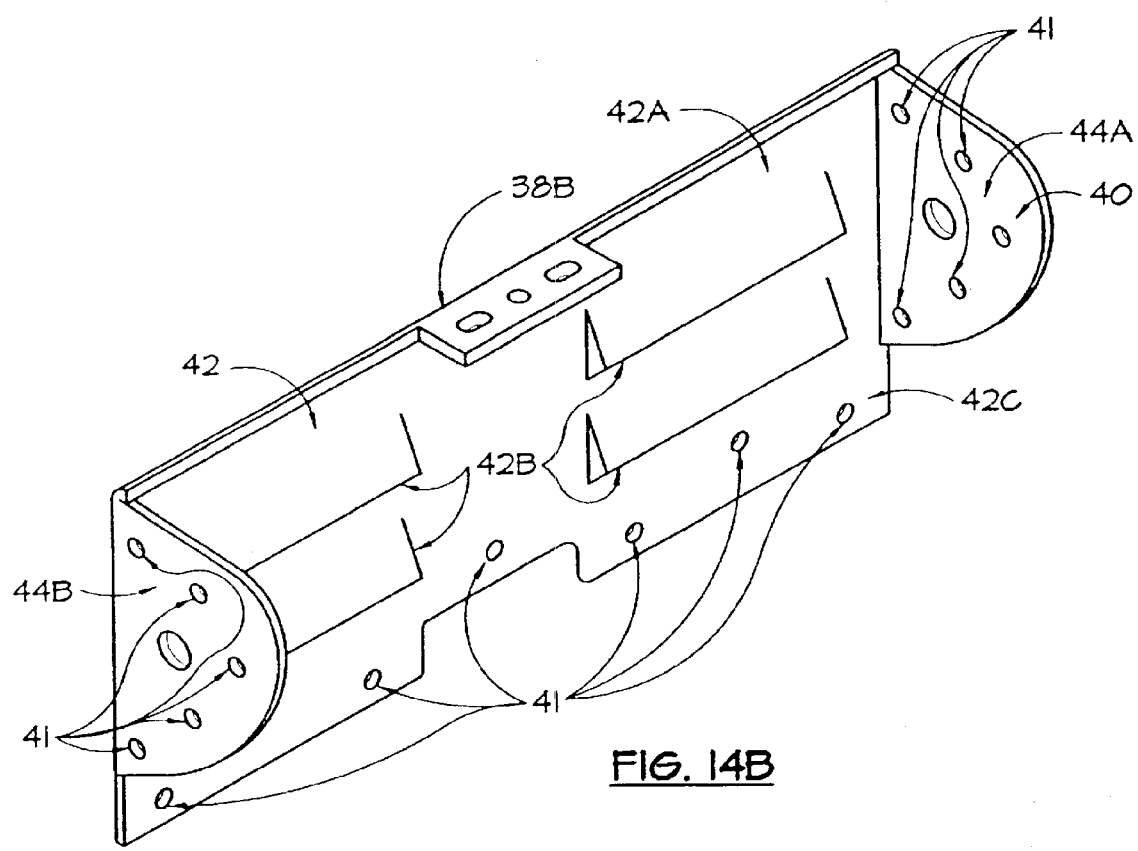
FIG. 14B is a perspective view of a frieze board connector

FIG. 14B shows a perspective view of a metal frieze plate 42 with the tabs 40 bent forward at a right angle forming a right wing 44A and left wing 44B. The tabs 40 can also be bent backwards at a right angle so that they will not be visible on new construction. The metal frieze plate 42 can also be used to space rafters near the roof beam, or to space roof trusses near the roof peak. When metal frieze boards are installed near the roof peak, they provide great stability to the rafters or roof trusses, and protect against racking or tipping of the trusses.

If there is an attic that is going to be used for living space, a metal frieze plate 42 can provide stability to the rafters and provide ventilation from the soffit area up to the roof peak and along a ridge vent, using cardboard or other nonflammable tubes or boards.

FIG. 14C

Figure 14C:
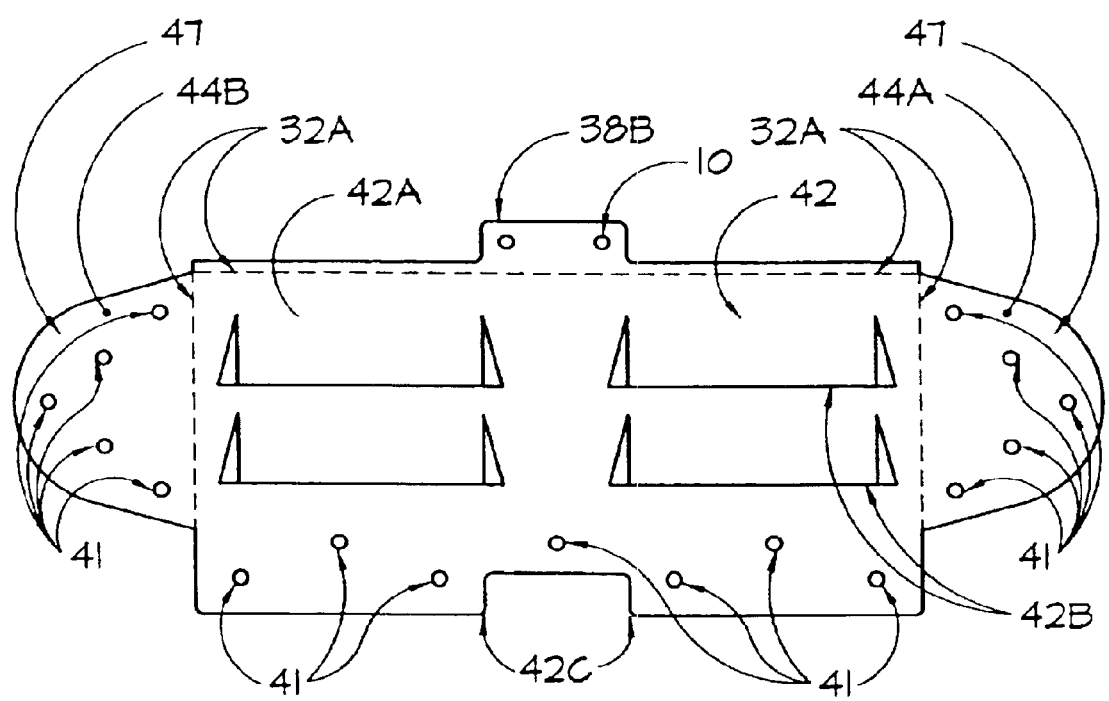
FIG. 14C is a flat-pattern layout of a metal frieze board.

FIG. 14C shows a flat pattern layout for a frieze plate 42 prior to bending. Stamped sheet metal is the preferred method for making this embodiment. The same tool and die can be used to make a metal facia plate 38; the top plate tab 42C can be bent at a right angle to make a box-section with the right wing 44A, left wing 44B, and roof tab 38B. This can provide strength against twisting and can provide support for a wood facia board to cover the metal facia plates 38.

FIG. 15A

Figure 15A:
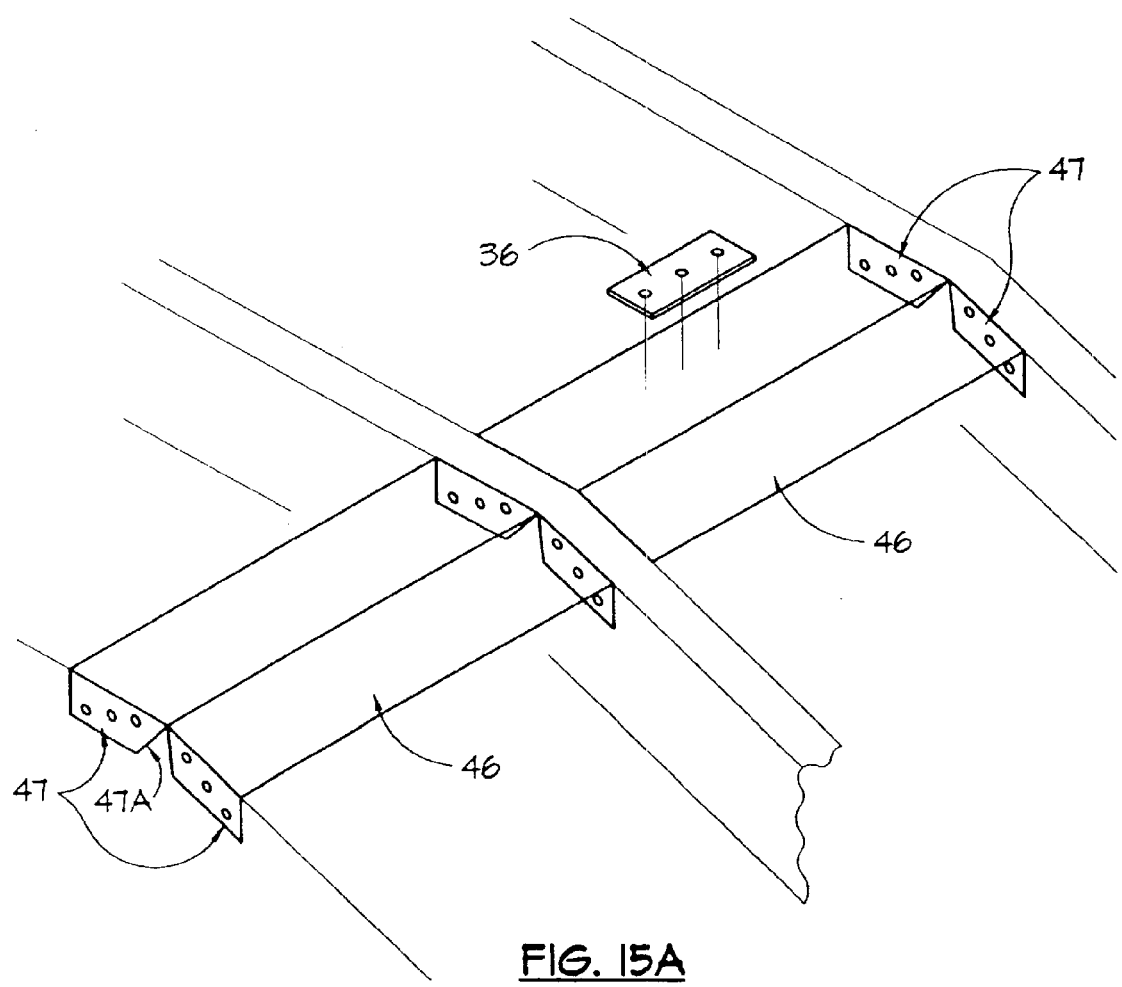
FIG. 15A is a ridge plate installed between roof trusses.

FIG. 15A shows a ridge plate 46 installed between roof trusses. The ridge plate 46 contains rafter tabs 47 that are bent down at approximately right angle bends 32A. A bend line 47B and cutouts 47A allow the ridge plate 46 to be bent to fit any slope of roof. The ridge plate 46 can be attached to the roof trusses during construction, or as a retrofit to existing buildings.

The roof trusses are very strong in compression, but are weak in side or lateral loads until the roof sheathing is applied. When a house is being constructed there may be a long delay from when the trusses are installed until the roof sheathing is applied. Most roof sheathing is still applied with staples, which are weak.

The ridge plate 46 has a preferred location at or near the ridge of the roof. The length is standard construction distance between rafters. It can be installed right-side up or upside-down, as long as nails or screws can be driven through the rafter tabs 47 into the rafters or top chords. Since the length of the ridge plate 46 is standard, carpenters can install the truss quickly and safely, because most distance measurements between the rafters or trusses is eliminated. When the ridge plate 46 is fastened to the previous truss, there is less chance of the truss being blown over on top of the carpenter or other workers.

When the ridge plate 46 is installed as a retrofit from below the roof, a roof plate 36 could be used to tie the roof sheathing securely to the ridge plate 46. The ridge plate 46 can be installed below the ridge line of a house and can be used with the other embodiments of this invention including a metal facia plate 38 and metal frieze plate 42.

FIG. 15B

Figure 15B:
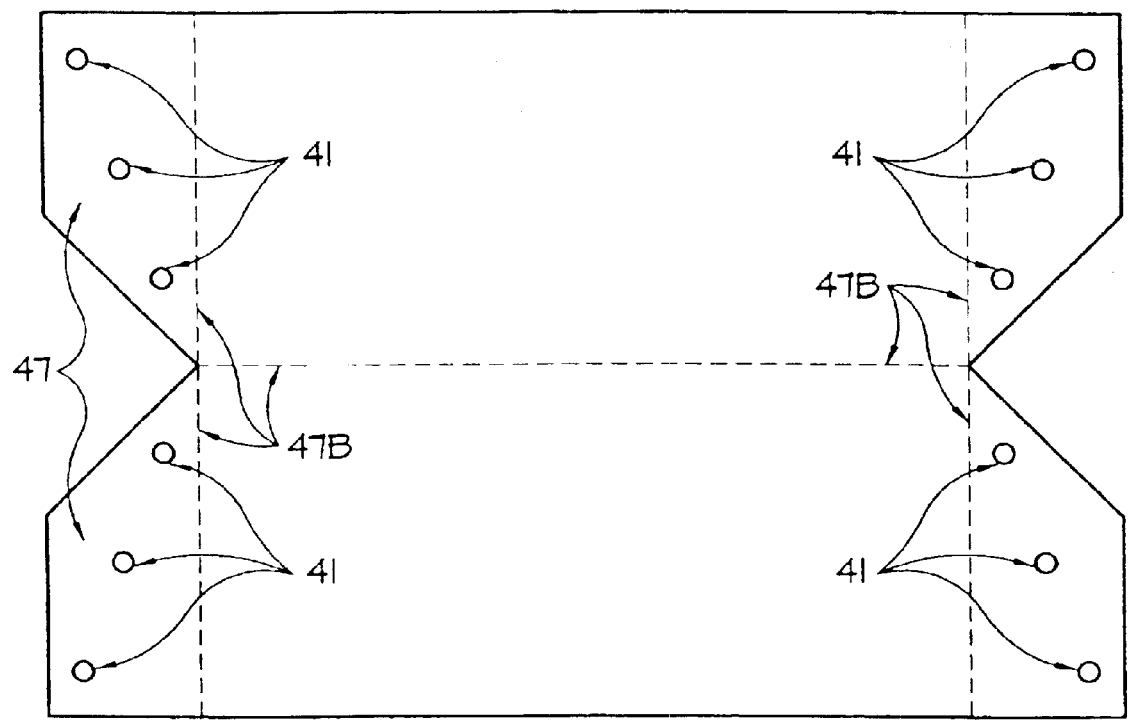
FIG. 15B is a flat-pattern layout for a ridge plate.

FIG. 15B shows a flat-pattern layout for a ridge plate 46 showing the bend line 47B, right-angle bend 32A, rafter tabs 47, cutouts 47A, and nail holes 41. The ridge plate 46 can be made from many materials and by many methods, but the preferred method is stamped sheet metal using standard tool and die methods.

FIG. 16A

Figure 16A:
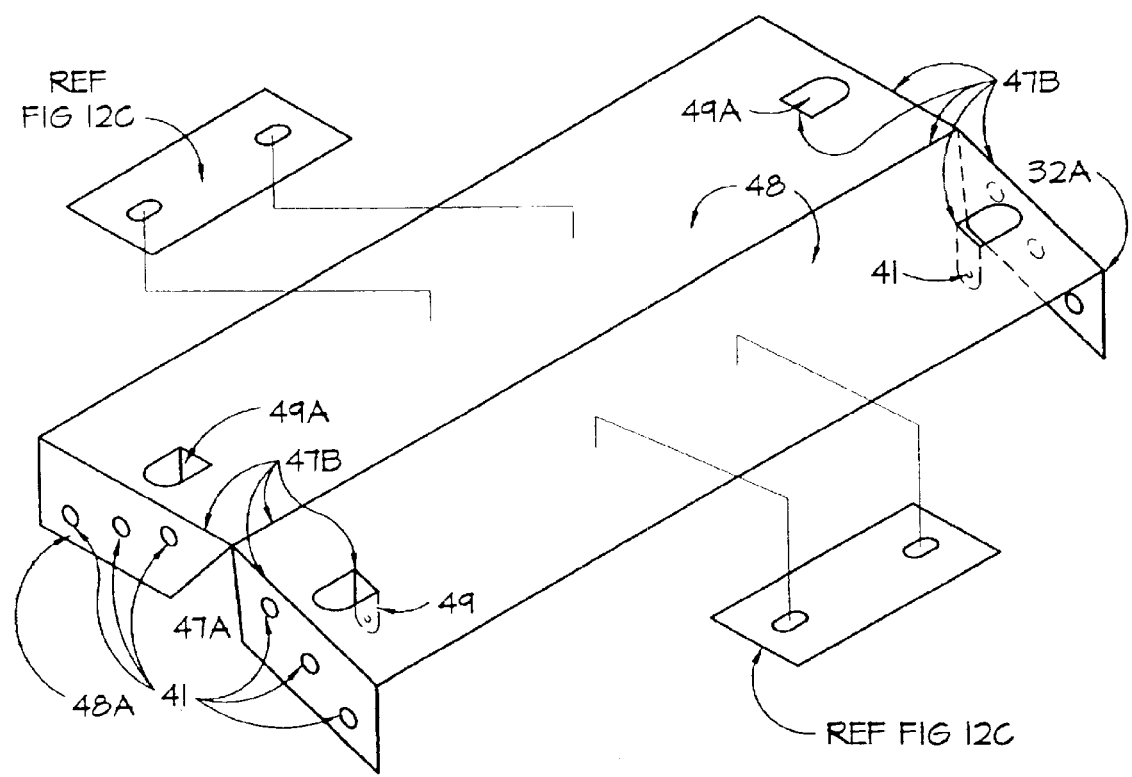
FIG. 16A is a truss support installed on the top chord.

FIG. 16A shows a truss support 48 installed on the top chord of a roof truss. The truss support 48 fits over the top chord of two trusses, tying them together tightly. To tie all the roof trusses together the truss supports 48 would be staggered, with the next truss joined above or below the preceding one. Staggering the truss supports 48 allows them to be attached easily, and provides more strength.

The truss support consists of a long dimension of approximately standard construction width between trusses, plus the thickness or width of two trusses. At either end of this length are two right-angle bends 32A which form truss tabs 48A with nail holes 41. Along the approximate middle of the long dimension is a bend line 47B.

About the width of a truss member from the right-angle bend 32A is a small punched-out opening 49A. The opening 49A is formed when a small right-angle bend 32A is punched from above. The small right-angle bend 32A forms a truss brace 49 with a nail hole 41.

When constructing a building with roof trusses, the trusses are lifted into position and a truss support 48 is placed over two adjoining trusses. The inside dimension between the two truss braces 49 is the standard distance between trusses as used throughout the construction industry. When the truss support 48 is placed over two roof trusses, they can be nailed or screwed from underneath. The distance between trusses will be very accurately spaced by the truss support 48.

Measuring the distance between trusses is now superfluous, plus the safety is greatly increased as the trusses can not separate from each other. When the trusses are securely tied to each other by truss supports 48, the roof is much stronger. Roof sheathing can be applied over the truss supports 48 and nailed to the roof truss through the opening 49A. Truss supports 48 can be installed on the wall studs, and on either side of a roof, and along other roofing members including rafters and roof joists. Roof plates 36 can secure the roof similar to FIG. 15A.

FIG. 16B

Figure 16B:
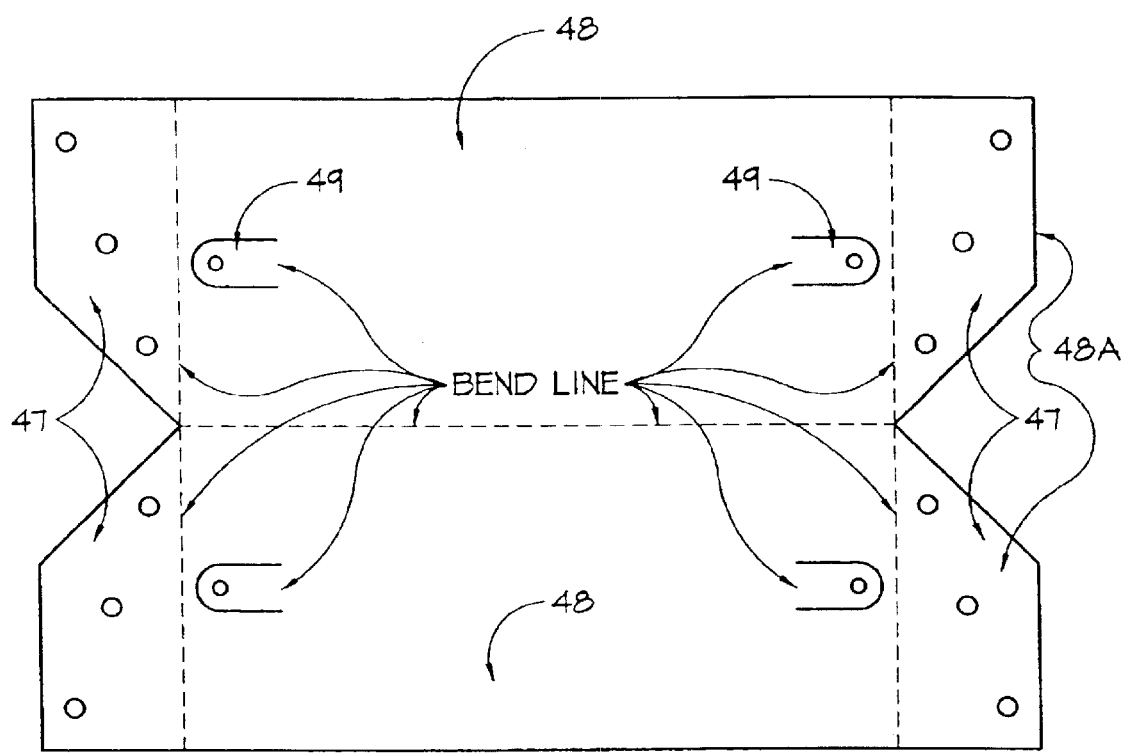
FIG. 16B is a flat-pattern layout for a truss support.

FIG. 16B shows a flat-pattern layout for a truss support 48 showing the bend line 47B, large right-angle bend 32A, truss tabs 48A, cutouts 47A, small right-angle bends 32A, truss braces 49, openings 49A, and nail holes 41. The truss support 48 can be made from many materials and by many methods, but the preferred method is stamped sheet metal using standard tool and die methods.

FIG. 17A

Figure 17A:
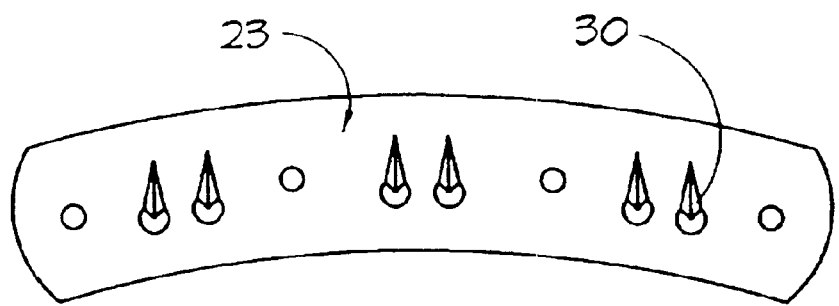
FIG. 17A is a front view of a banana clip with rasp holes.

FIG. 17A shows a front view of a different embodiment of a banana clip 23. The banana clip 23 has a different arc and is of different dimension than that in FIG. 10A. The teeth 30 are spaced differently and the nailholes 41 are spaced differently.

FIG. 17B

Figure 17B:
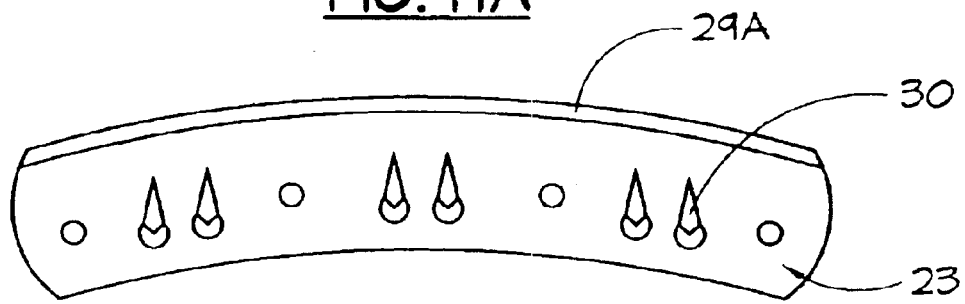
FIG. 17B is a back view of a banana clip with rasp holes.

FIG. 17B shows a back view of the banana clip 30 shown in FIG. 17A. The teeth 30 are stamped to the back as is the zenith edge 29A.

FIG. 17C

Figure 17C:
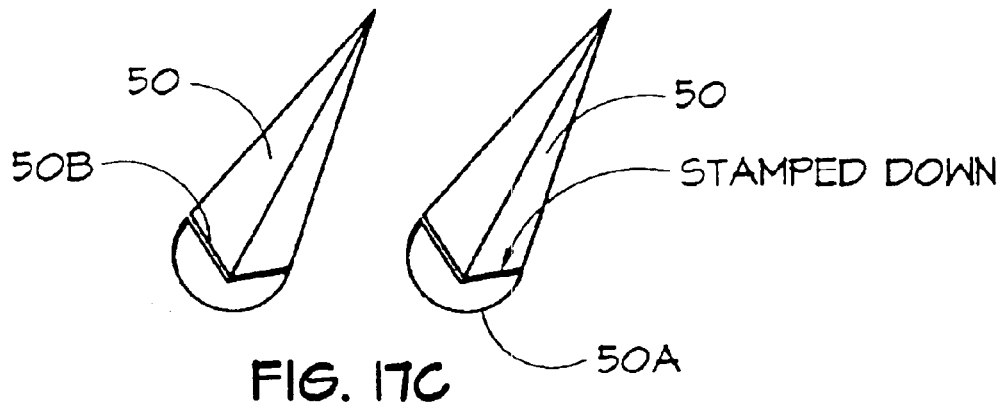
FIG. 17C is a top view of rasp holes.

FIG. 17C shows a top view of two rasp holes 50. The rasp hole 50 helps prevent cross-grain bearing failure of wood. The rasp hole 50 consists of a crown 50A and chisel wedge 50B. Rasp holes 50 can be stamped into metal during the forming process. The chisel wedge 50B, formed by the crown 50A, would dig into wood to prevent cross-grain failure.

FIG. 17D

Figure 17D:
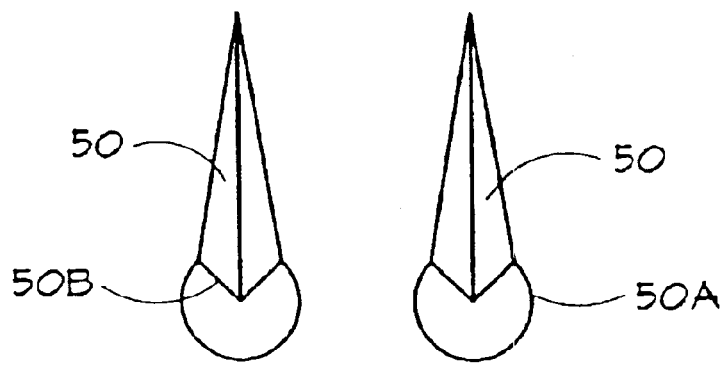
FIG. 17D is a front view of rasp holes.

FIG. 17D shows the forming process for making rasp holes 50, crown 50A, and chisel wedge 50B during the stamping of teeth 30 by tool and die methods. The rasp hole 50 would work royal with a banana clip 23 or other connectors that hold down the outside sheathing.

Outside sheathing splits very easily, and rasp holes 50 may help prevent this splitting.

FIG. 18A–H

FIG. 18A–H shows an improvement for the pipe that holds down a roof. Part of this invention is discussed in previous patent application Ser. No. 08/191,852 on Feb. 2, 1994 by Thompson. The improvement discussed in this continuation-in-part is for heating hot water in the pipe by solar energy collection in a solar tube 54.

FIG. 18A shows a pipe 51 resting on an angle-iron member 52, and is covered with a glass cover tube 53 from FIG. 18B, and held down with a glass hold down 53A from FIG. 18C. The pipe 51 is still held fast to the roof, at places in between the solar tubes 54, by a roof fastener, discussed in my previous patent application.

FIG. 18A

FIG. 18A shows a standard angle-iron member 52 which supports the one-piece heat absorbing black tubing pipe 51 and provides insulation and heat from a reflective coating. The dead air space between the glass cover tube 53 and pipe 51 also provides insulation. Insulation can be used to block the ends of the solar tubes 54.

FIG. 18B

FIG. 18B shows a glass cover tube 53. The glass cover tube 53 fits over the angle iron member 52, after the angle iron member 52 is secured with an angle iron hold down 52A to the solar tube 54. The glass cover tube 53 is sealed to the angle iron hold down 52A by a gasket 36B.

FIG. 18C

FIG. 18C shows a glass hold down 53A that would secure the glass cover tube 53 to the angle iron member 52 and angle iron hold down 52A. A threaded bolt extends through bolt holes 54A on the solar tube 54, angle iron hold down 52A, and glass hold down 53A to hold them together.

FIG. 18D

FIG. 18D shows how the suns rays refract into the pipe 51 according to Snell's Law. FIG. 18D shows how light beams from the sun would refract when striking the glass cover tube 53 and be directed into the focal point of the pipe 51. So no matter what the sun's angle, all the sun's rays would concentrate at the focal point, which would be at the pipe 51.

FIG. 18E

FIG. 18E shows a perspective view of a solar tube 54. The tube is curved to hold the angle iron 52 and pipe 51. The solar tube has bolt holes 54A spaced similar to the bolt holes 41 on a angle iron hold down 52A and glass hold down 53A. The solar tube 54 has an eye slot 54B so that the solar tube can pivot in any direction.

FIG. 18EA

FIG. 18EA shows a detailed cross-section of an eye slot 54B. The eye slot 54B is punched down forming an eyeball shape. The cornea 54C fits into the contact 54D of a tapered washer 54E. The eye slot 54B is shaped to accommodate a ball 54F.

FIG. 18F

FIG. 18F shows a perspective view of an angle iron hold down 52A. The angle iron shape of the angle iron hold down 52A is used to hold down the angle iron member 52 using bolts through the bolt holes 54A.

FIG. 18G

FIG. 18G shows a perspective view of a tapered washer 54E. The contact 54D can be seen in the top part of the tapered washer 54E.

FIG. 18GA

FIG. 18GA shows a cross-section through a tapered washer 54E.

FIG. 18H

FIG. 18H shows a side view of a ball 54F, washer 54G and nut 54H. The nut 54H, washer 54G, ball 54F, tapered washer 54E, threaded rod (not shown), and rafter hold down (not shown) are from my co-pending application Ser. No. 08/191, 852, filed on Feb. 2, 1994.

The threaded rod from the rafter hold down would be extended up through the roof. On top of the threaded rod would be, in the order shown, tapered washer 54E, solar tube 54, ball 54F, washer, 45G, and nut 54H. As in my pending application, the tapered washer 54E and ball 54G allow the solar tube 54 to pivot and adapt to any slope roof. The tapered washer 54E and ball 54G also allow the solar tube 54 to fit a sloped roof and capable to pivot to get maximum solar gain.

The pipe 51 can be made from metal and painted black to help absorb more heat energy. The angle-iron member 52 can be made from many materials, especially materials that provide some insulation, or can be of metal. The glass cover tube 53 can be a normal glass tube that is cut in half lengthwise and given a flare and gasket as shown in FIG. 18B.

The solar tube 54 would hold down roofs and provide hot water to a home for free. Getting two uses from one product is a vast improvement over prior art. Most, if not all of the embodiments in this invention can be stamped from a single sheet of metal without any welding. This helps make the products affordable to everyone who wants to improve their home.

FIG. 19A

Figure 19A:
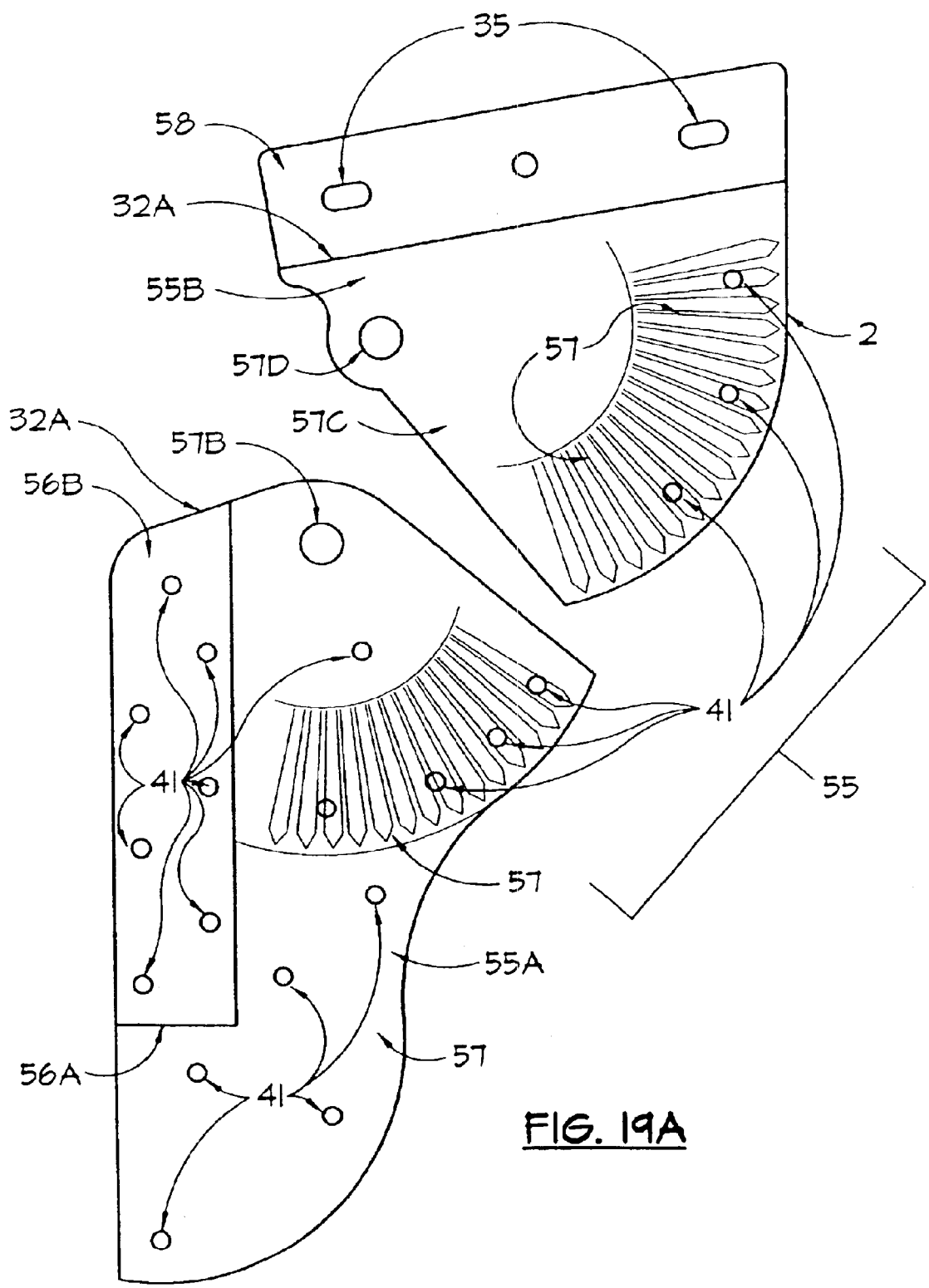
FIG. 19A is a flat-pattern layout for a roof anchor.

FIG. 19A shows a flat-pattern layout for a roof anchor 55, for use on holding together a plank-and-beam constructed house. The roof anchor 55 consists of two pieces, in order to fit on houses with any roof slope. The beam member 55A is attached to the ridge beam of a house, and the roof member 55B is attached to the underside of the roof sheathing.

The beam member 55A consists of large curved plate 57, with nail holes 41 for attachment onto the outside sheathing and underlying post and rafter. On the curved end of the curved plate 57 is a large radius of serrations 57A that are shaped like notches or saw-like teeth. The center point of the radius for the serrations 57A is at the bolt hole 57B.

A cut line 56A on the straight edge allows the ridge tab 56B to be bent out, at a right angle, along the right-angle bend 32A line. The ridge tab has nail holes 41 for attachment to the ridge beam that sticks out from the house. On houses without a ridge beam the ridge tab 56B would not be bent.

The roof member 55B consists of a flat plate 57C with nail holes 41 and similar serrations 57A as on the beam member 55A. The center point of the radius for the serrations 57A is at the lip hole 57D and the length of the radius is similar to the length of the radius on the beam member 55A. The diameter of the lip hole 57D is slightly smaller than the bolt hole 57B on the beam member 55A. The lip hole 57D is stamped with a slight lip to the rear of the flat plate 57C. The lip on the lip hole 57D is of such dimension that it just fits into the bolt hole 57B of the beam member.

When the roof member 55B is placed on top of the beam member 55A, and the lip hole 57D is on top of the bolt hole 57B, the lip of the lip hole 57D will fit into the bolt hole 57B. The lip hole 57D and bolt hole 57B will now form a pivot hole. The roof member 55B could rotate on an arc from this pivot hole, except for the serrations 57A. The serrations 57A of the roof member 55B and the beam member 55A now line up and mesh together preventing movement along the arc.

The top part of the roof member 55B has a right-angle bend 32A, that is bent toward the viewer at a right angle, that forms a roof tab 58. The roof tab 58 has bolt slots 35 that are equal in size and placement to bolt slots on a gable connector 34.

FIG. 19B

Figure 19B:
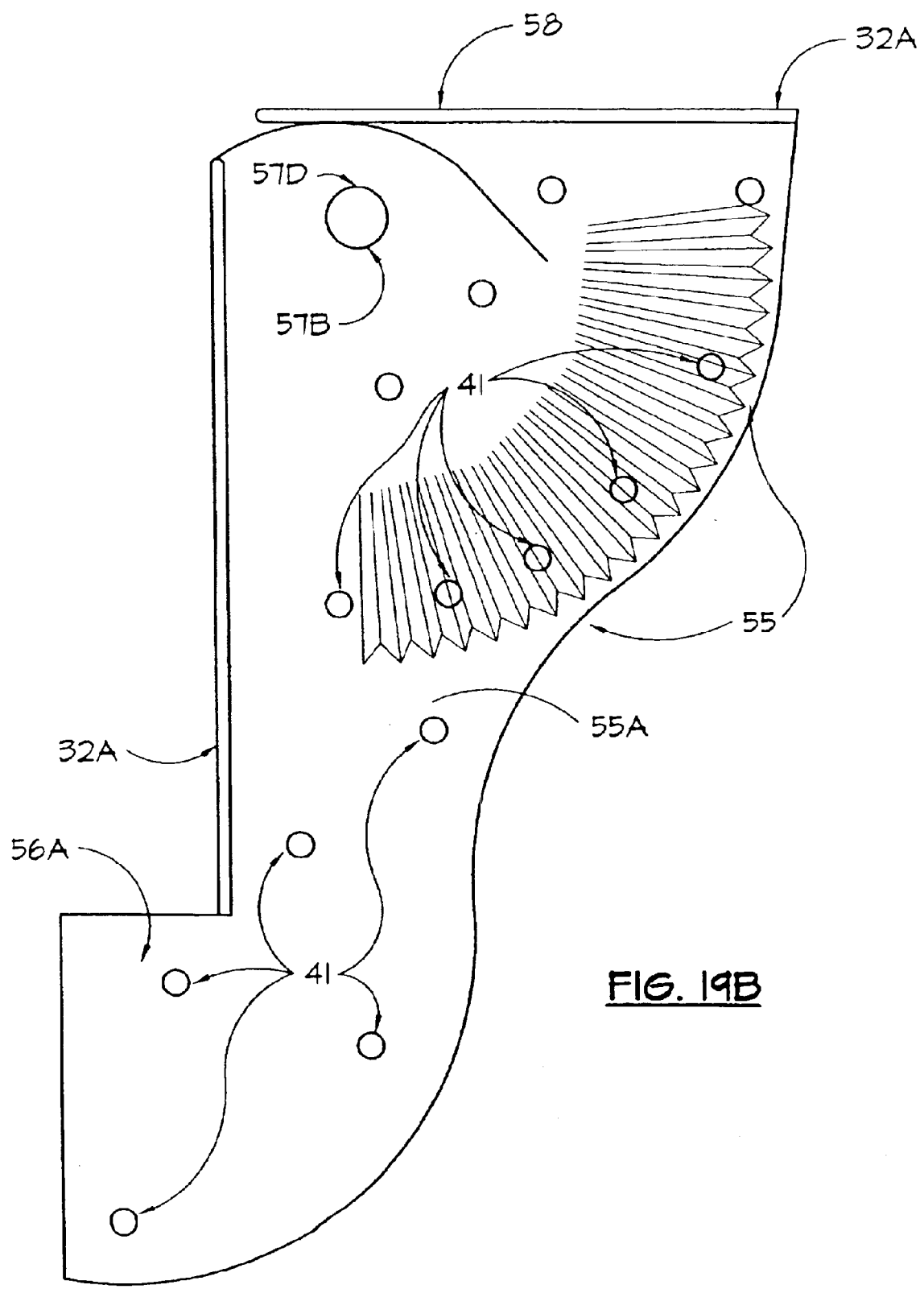
FIG. 19B is a front view of a roof anchor.

FIG. 19B shows a front view of a roof anchor 55. The roof member 55B and the beam member 55A are linked together at the pivot point of the bolt hole 57B and lip hole 57D. The ridge tab 56B is placed against a ridge beam on the outside of a house and slid upwards until the roof tab 58 is flush against the underside of a house roof.

In order to adjust the roof tab 58 to any roof slope, the roof member 55B is lifted slightly so that its serrations 57A are not interlocked with the serrations 57A of the beam member. Then the roof member 55B is rotated around the pivot point until the roof tab 58 is flush against the underside of a roof. Then the entire roof anchor 55 can be tightly fastened to the house.

Nails, screws, and bolts can be used to fasten the roof anchor 55 to a house. The preferred order of attachment is: first the ridge tab 56B is fastened to the ridge beam, then the beam member 55A is fastened to the outside sheathing and underlying rafter and post, then the roof member 55B is fastened to the beam member 55A and underlying rafter.

When a roof anchor 55 is connected under a roof, holes can be drilled up through the roof and a roof plate 36 can be attached from the roof using carriage bolts 37A and nuts 37B into the bolt slots 35 on the roof tab 58. This will tie the outside sheathing, ridge beam, rafter, post, roof sheathing, and roofing material together, and prevents the gable end from being blown out by a hurricane.

FIG. 19C

Figure 19C:
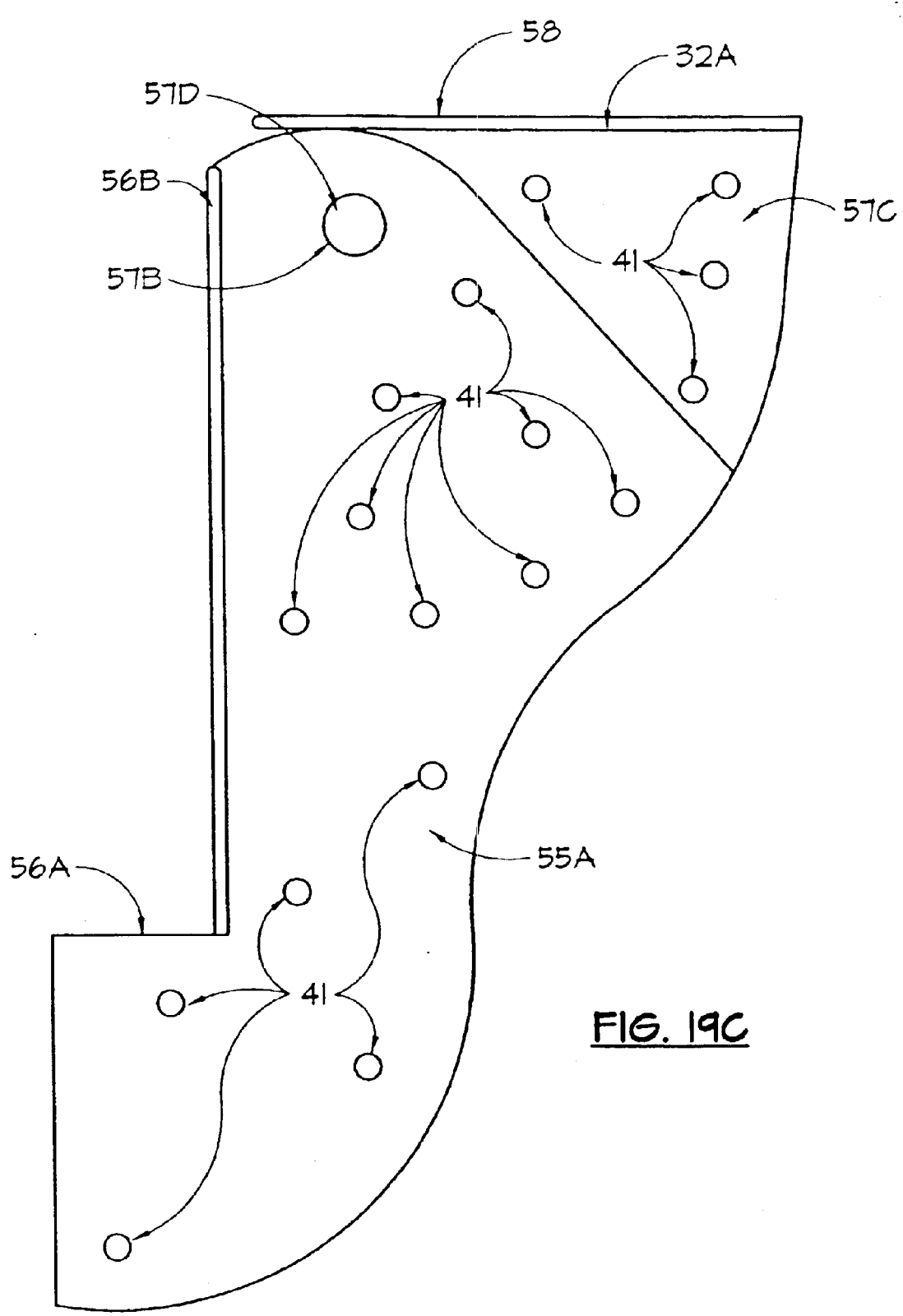
FIG. 19C is a front view of a roof anchor without serrations.

FIG. 19C shows a front view of a two-piece roof anchor 55 without serrations 57A. This roof anchor 55 operates the same as in FIG. 19B, but there are no serrations 57A. Nails or screws would keep the roof anchor 55 to the gable sheathing.

FIG. 19D

Figure 19D:
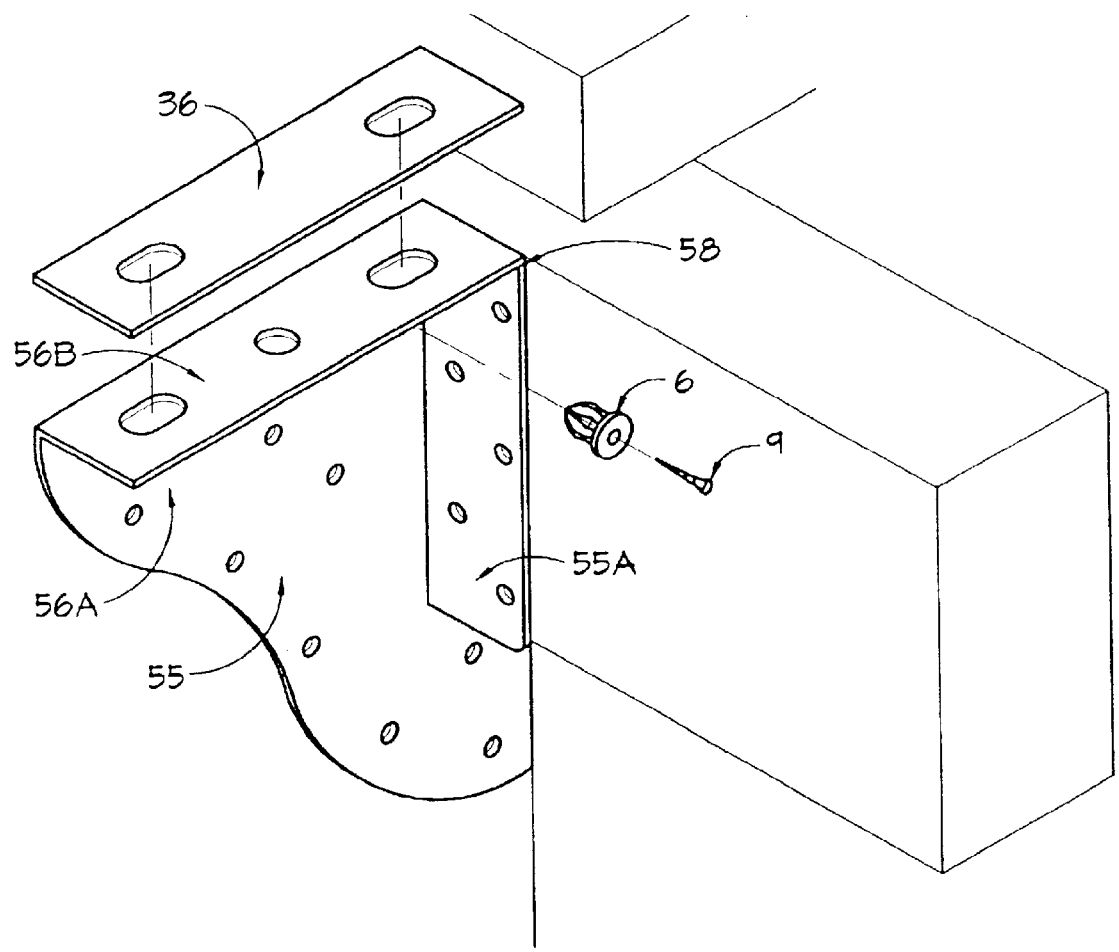
FIG. 19D is a perspective view of a one-piece roof anchor.

FIG. 19D shows a perspective view of a one-piece roof anchor 55 attached to the gable end sheathing at 55A, by a bushing 6 and screw 9, to the projecting beam at 56B, and to the roof by a roof plate 36. The roof anchor can be formed from a single piece of sheet metal with the roof tab 58 stamped at any angle.

The roof anchor 55 can be made from many materials, but the preferred method is stamped sheet metal using standard tool and die methods. The roof anchors 55 in FIGS. 19A and 19C are for the left side of a ridge beam, where the ridge beam or longitudinal beam sticks out from the gable end of a house. A right side roof anchor 55, as in FIG. 19D, would be a mirror image of this one.

FIG. 20A

Figure 20A:
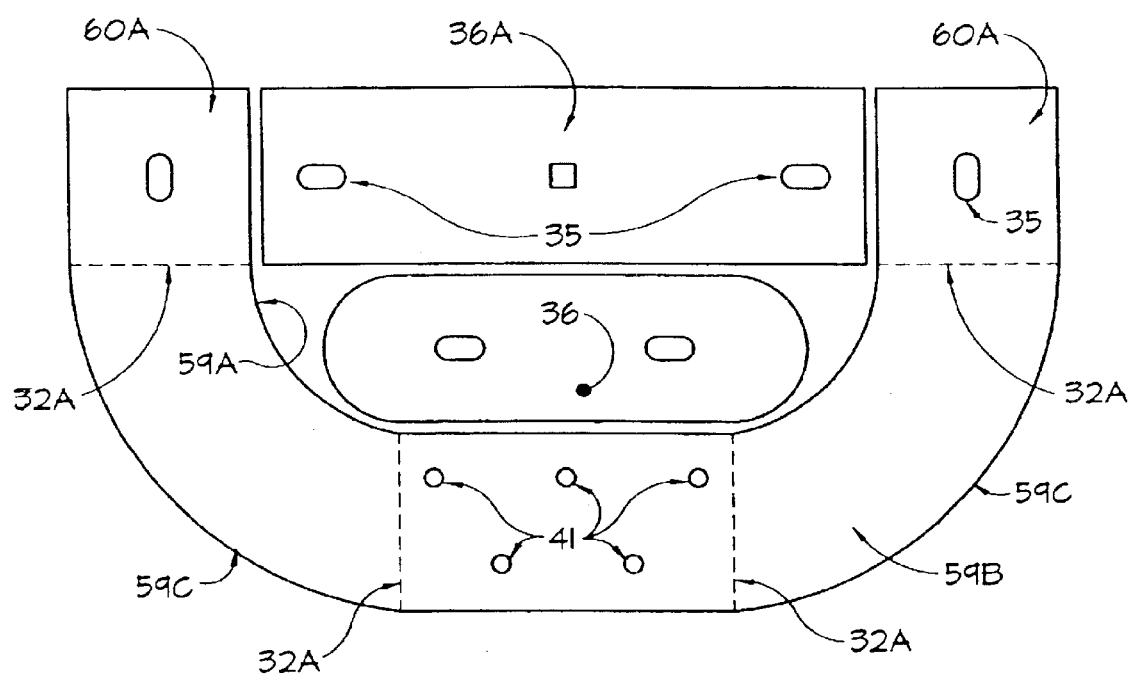
FIG. 20A is a flat pattern layout for a gable span, roof plate, and roof overlay.

FIG. 20A shows a flat-pattern layout for a gable span 59, roof plate 36, and roof overlay 36A. The gable span 59 has an inner radius 59A on the curve 59B that allows it to clear molding, trim, wires, cable or other material that would prevent other connectors, such as a gable connector 34, from having a close fit to the edge of a gable and roof. The gable span 59 also contains two roof links 60A, a gable link 60B, and two curves 59B. There are four right angle bends 32A lines on the layout that forms each member on the gable span 59.

The roof links 60A have bolt slots 35, that are similar to bolt slots 35 on a gable connector 34. The curve 59B forms and inner radius 59A and an outer radius 59C. The gable link 60B has nail holes 41 for attachment to the outside sheathing and underlying structural members including the rafter and top chord.

FIG. 20B

Figure 20B:
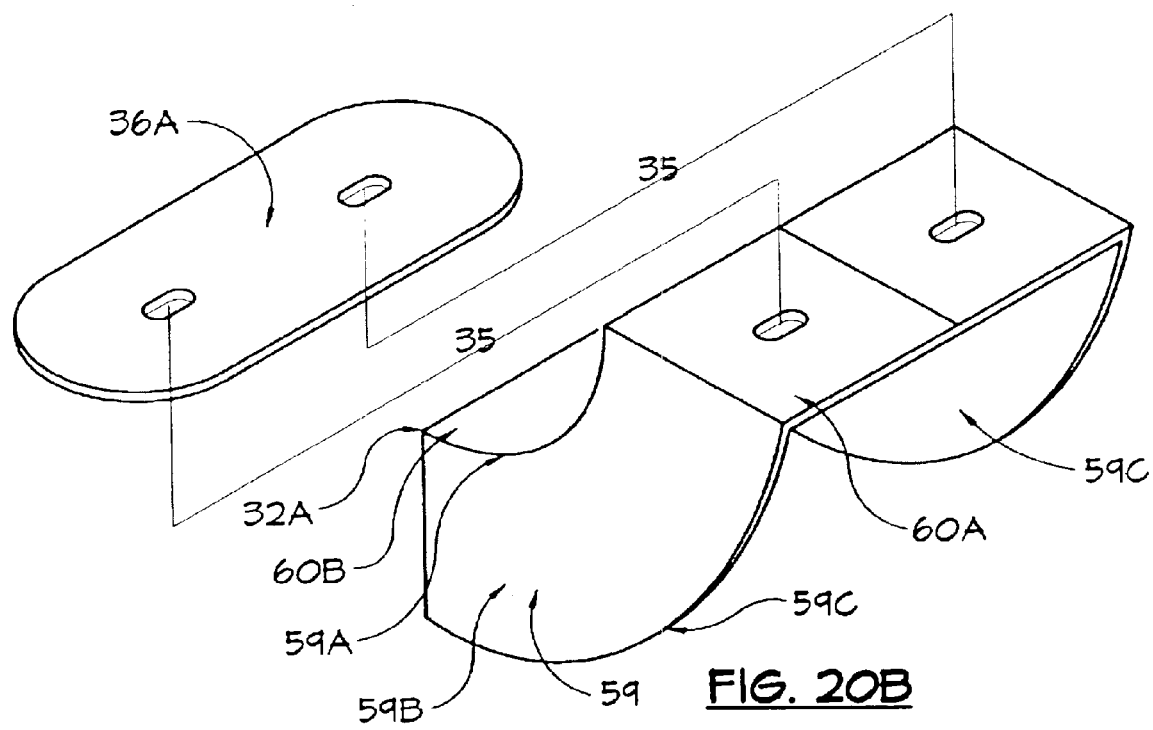
FIG. 20B is a perspective view of a gable span and roof plate attached to a house.

FIG. 20B shows the gable span 59 as it would be attached to a house, or tying together other structural members that have an interfering member that prevents a standard connector from being snug next to both members. FIG. 20B shows how the right-angle bends 32A form a mostly closed loop of curves 59B, roof links 60A, and a gable link 60B.

The gable span 59 would be placed against a gable end and underside of a roof. The inner radius 59A would clear obstructing wires, trim, molding, and cables. The outer radius 59C would be pleasing architecturally, and could be filled in with filler material such as wood or plastic.

When a gable span 59 is connected under a roof, holes can be drilled up through the roof and a roof plate 36, from FIG. 12C, can be attached from the roof using carriage bolts 37A and nuts 37B. This will tie the outside sheathing, rafter or top chord, roof sheathing, and roofing material together.

FIG. 20C

Figure 20C:
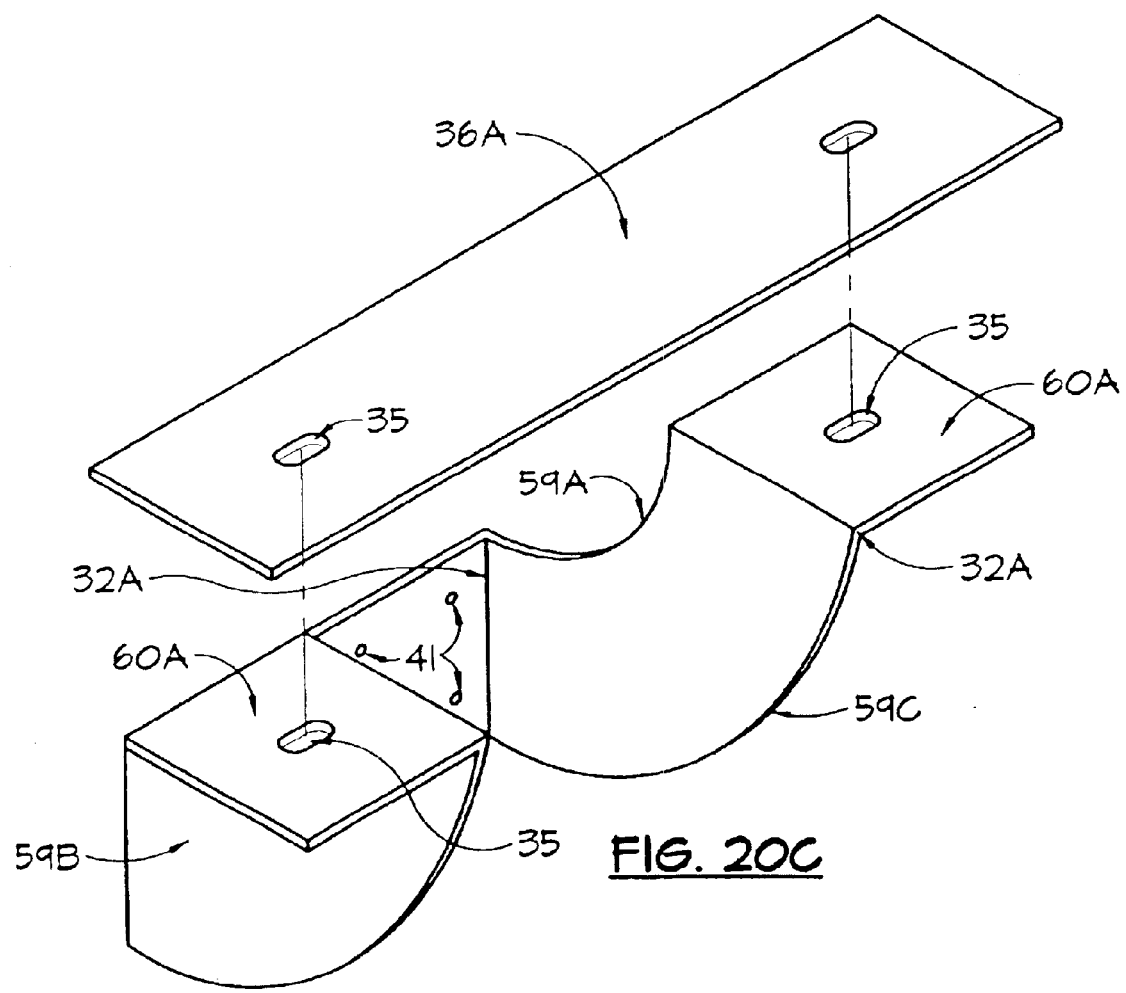
FIG. 20C is a perspective view of a gable span and roof plate.

FIG. 20C shows a gable span 59 with the roof links 60A bent outward at right angle bends 32A. The inner radius 59A still clears obstructions, and the gable link 60B has nail holes for attachment to the gable wall. With the roof links 60A bent outward, a roof plate 36, from FIG. 12C, can be used on top of the roof as the bolt slots 35 Will line up as shown in FIG. 20C.

The gable span can be made from many materials, but the preferred method is stamped sheet metal using standard tool and die methods.

FIG. 21A

Figure 21A:
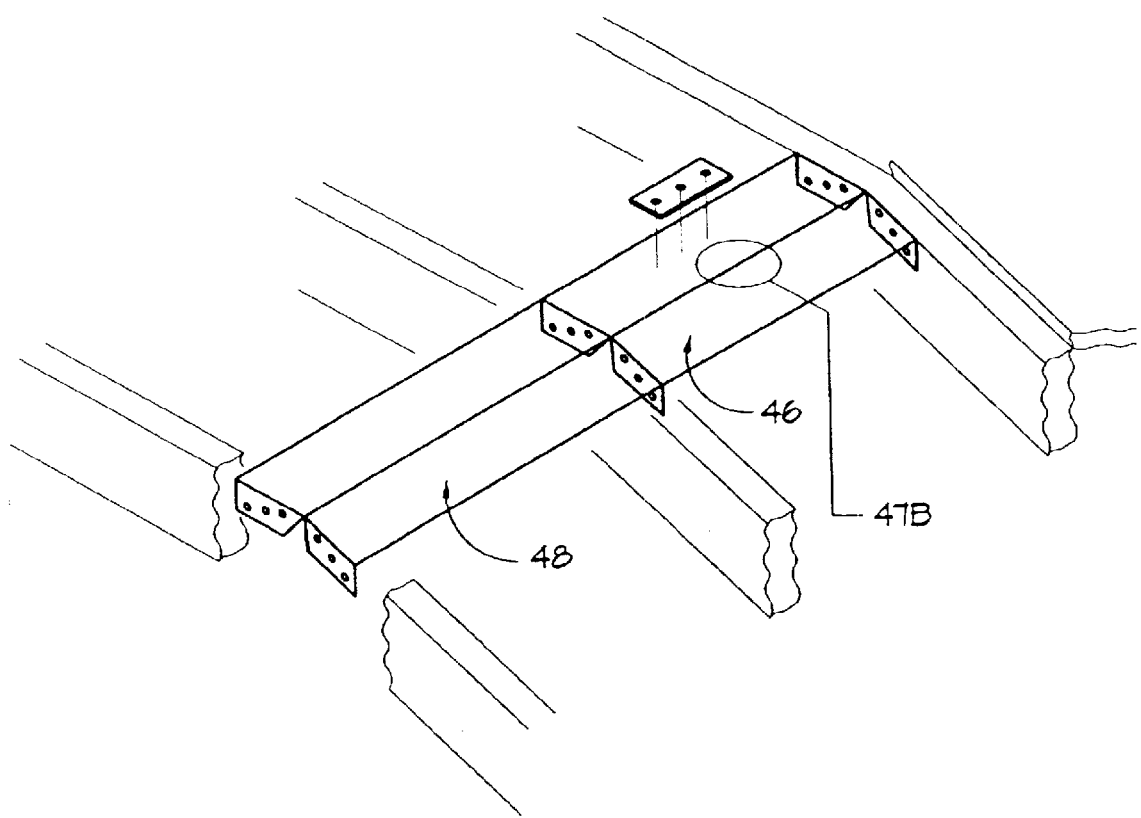
FIG. 21A is a ridge plate with a bend line.
Figure 21B:
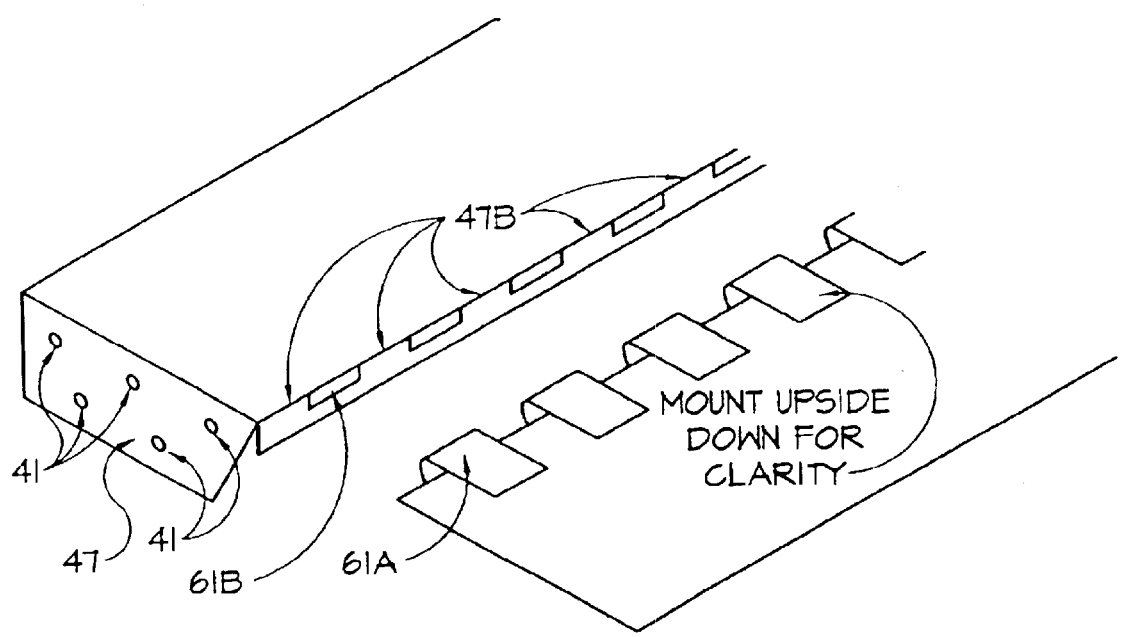
FIG. 21B is a perspective view of a latch mechanism.

FIG. 21A shows a ridge plate 46 and how it can be split in half along bend line 47B. On the ridge plate 46 and on the truss support 48, the bend line 47B is bent to fit specific pitches of roofs. On the ridge plate, the bend line 47B could also be cut through to make two approximate halves, which could be installed to the rafters, on either side of the ridge beam. The bend line 47B does not have to be bent at all but could be one solid piece. This would allow the ridge plate 46 to be installed on one side of the ridge beam. The ridge plate could also fit upside-down underneath the ridge beam, tying the rafters from either side of the house together as one unit.

The truss support 48, shown in FIG. 21A, is for use on trusses which have no ridge beam. The bend line 47B does not have to be pre-bent and can remain straight to fit on one side of the ridge. The bend line 47B could also be cut through to make two separate halves, which could be installed to the top chords, on either side of the ridge. To provide the most support, the preferred location for the truss support 48 and ridge plate 46 is at the ridge.

FIG. 21B

FIG. 21 shows a perspective view of a latch mechanism 61 on a ridge plate 46 that can permit the bend lines 47B to pivot and fit ridges on roofs of any pitch. The bend lines 47B are detached to form two approximate halves; the side with the latch holes is bent down at approximately a right angle bend 32A.

The latch mechanism 61 consists of latch tabs 61A on one side, and latch holes 61B on the other side of the bend line 47B. The latch tabs 61A fit into the latch holes 61B at an obtuse angle, then when the two halves of the truss support 48 or ridge plate 46 are set to a roof angle, they are locked together. The latch mechanism 61 is strong, can swivel to work on any roof, and can fit on or under roofs of any pitch.

FIG. 21C

Figure 21C:
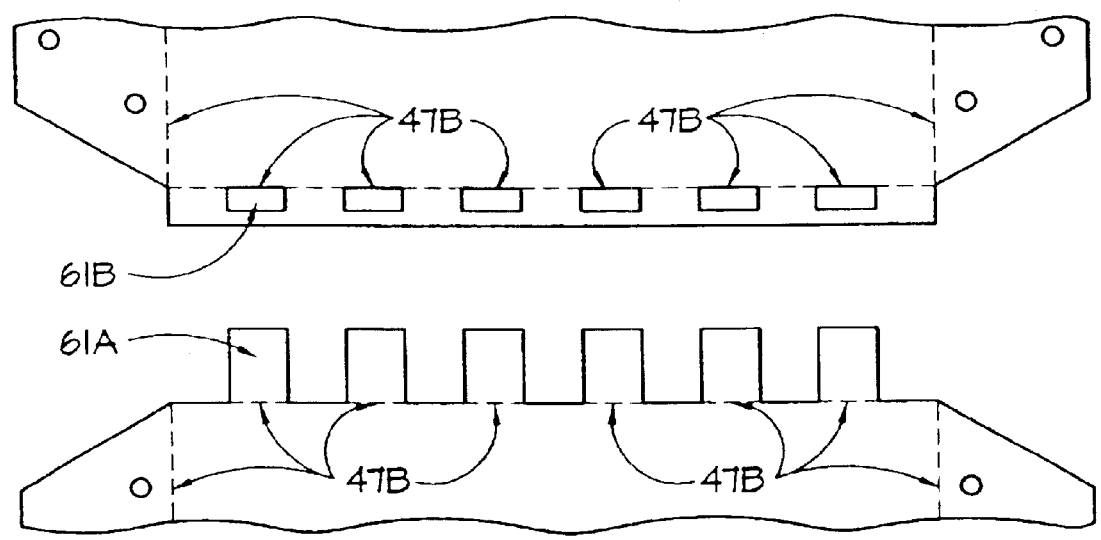
FIG. 21C is a flat-pattern layout of a latch mechanism.

FIG. 21C shows a flat pattern layout of a latch mechanism 61 prior to bending. The latch tabs 61A, along a bend line 47B, are shown as they would be fit into the latch holes 61B at an obtuse angle. FIG. 21C shows that once the two halves are straightened out, they form a latch mechanism 61, which is a strong, simple-to-make, hinge, with pivot support along the entire edge. The latch mechanism can be stamped from sheet metal, using tool and dies.

FIG. 21D

Figure 21D:
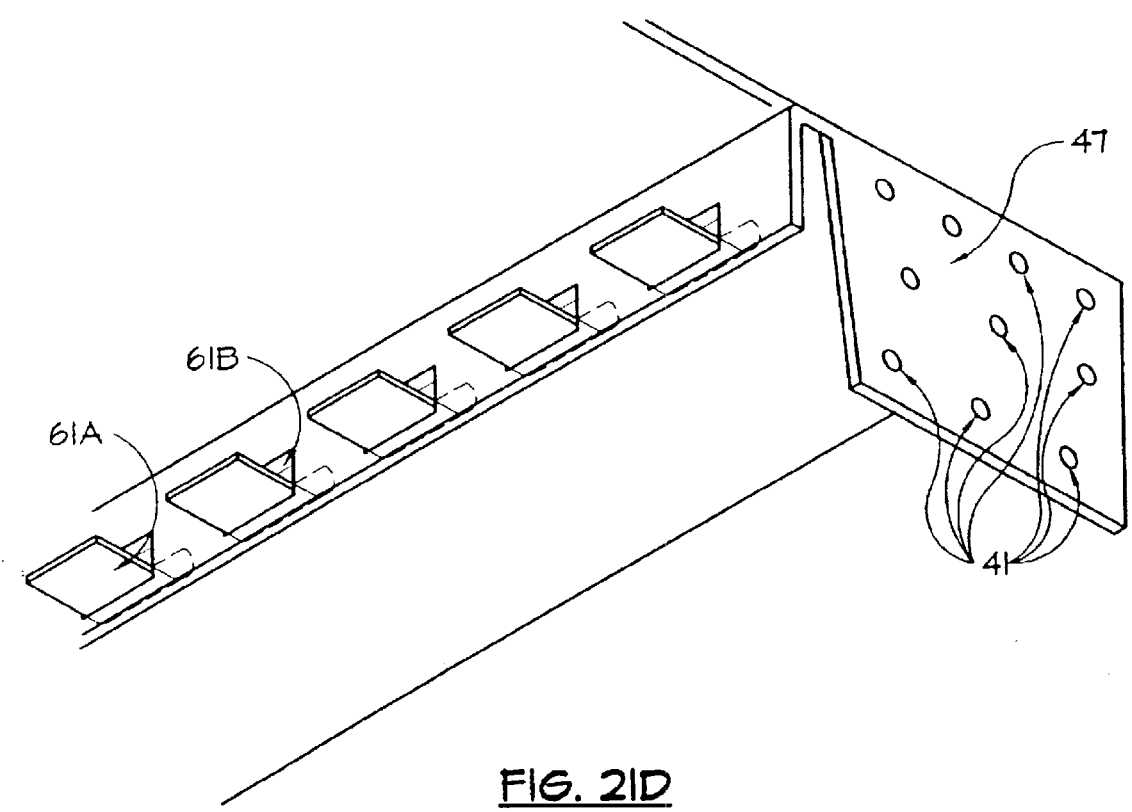
FIG. 21D is a perspective view of a latch mechanism from below.

FIG. 21D shows a perspective view, from the underside, of two halves of a ridge plate 46 linked together at the bend line 47B with latch tabs 61A locked into latch holes 61B.

FIG. 21E

Figure 21E:
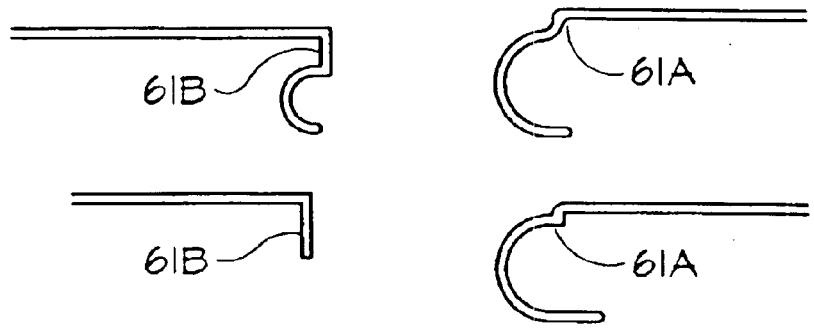
FIG. 21E is a side view of latch mechanism prior to attachment.

FIG. 21E shows a side view of the latch tabs 61A prior to locking using different embodiments of flat (bottom) and curved (top) latch holes 61B.

FIG. 21F

Figure 21F:
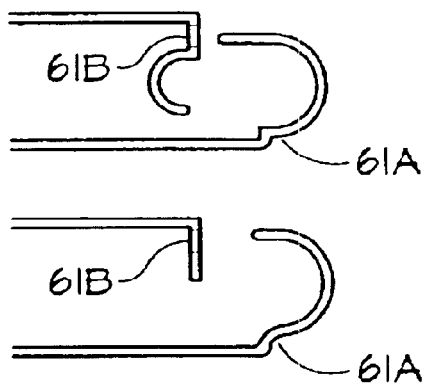
FIG. 21F is a side view of latch mechanism at obtuse angle.

FIG. 21F shows a side view of the latch tabs 61A at an obtuse angle prior to latching, using different embodiments of flat (bottom) and curved (top) latch holes 61B.

FIG. 21G

Figure 21G:
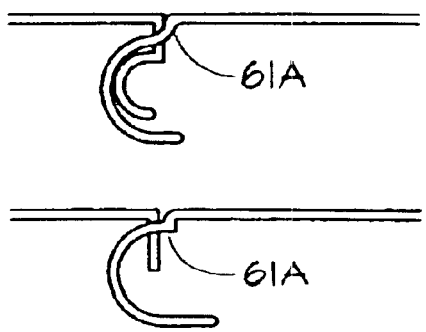
FIG. 21G is a side view of latch mechanism locked.

FIG. 21G shows a side view of the latch tabs 61A in the latched position, using different embodiments of flat (bottom) and curved (top) latch holes 61B. The ridge plate 46 can now be set on any slope ridge line.

FIG. 22

Figure 22A:
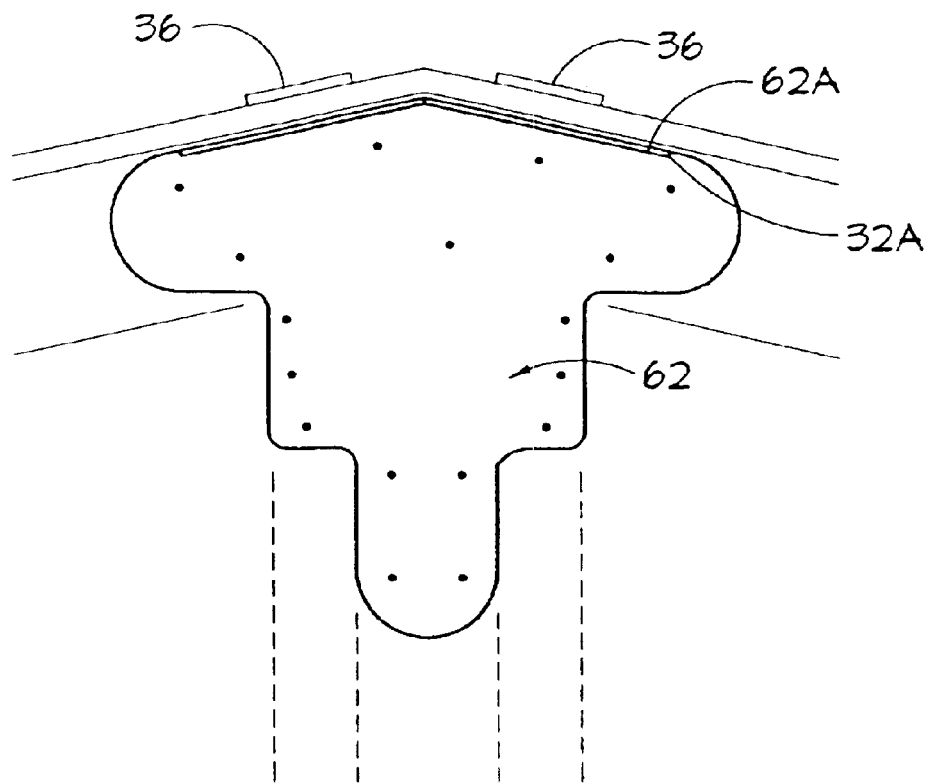
FIG. 22A is a front view of a center gable plate attached to a house.
Figure 22:
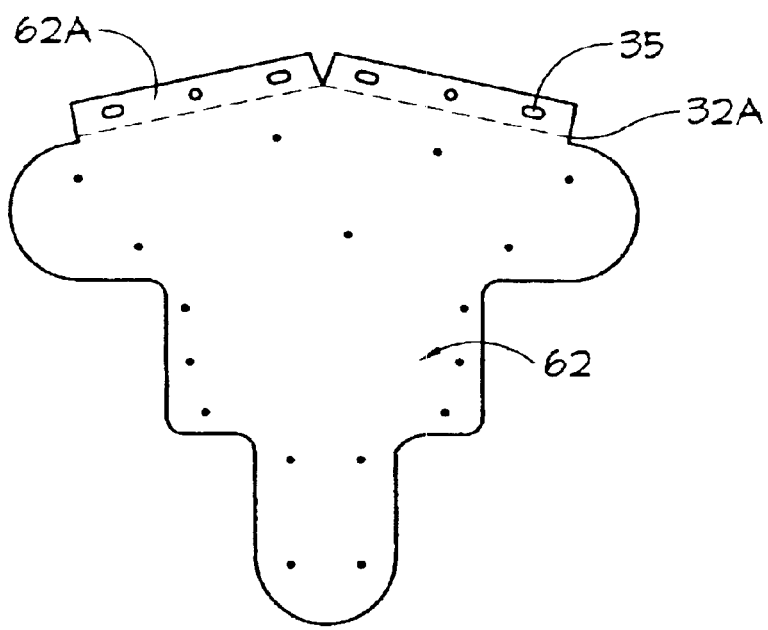
FIG. 22 is a flat pattern layout for a center gable plate.

FIG. 22 shows a flat layout for a center gable plate 62 with nail holes 41, and eave plates 62A with bolt slots 35, and bend line 32A.

FIG. 22A

FIG. 22A shows a front view of a center gable plate 62 attached to the top center gable end of a house. It is shown holding the outside sheathing to the underlying rafter, ridge beam, and ridge posts, using nails or screws in nail holes 41. The eave plates 62A are holding the roof down, connected to a roof plate 36, on top of the roof.

FIG. 23

Figure 23:
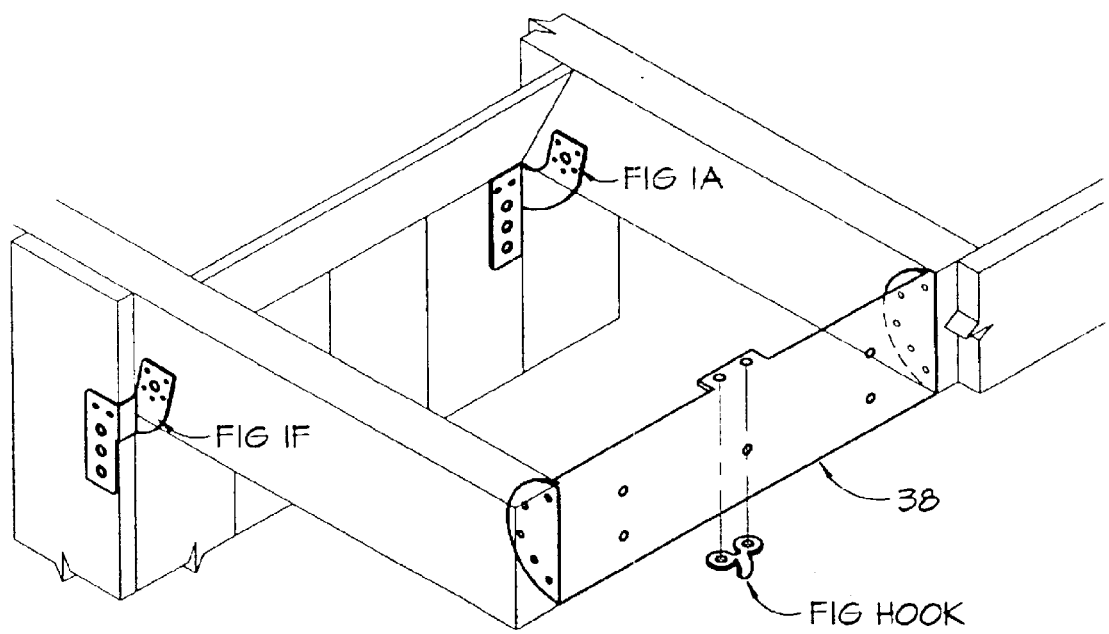
FIG. 23 is a perspective view of seismic clips and a metal facia plate attached to a house.

FIG. 23 shows a perspective view of a seismic clip 1, corner seismic clip 1A, metal facia plate 38, and hook 38A installed on a house.

FIG. 23A

FIG. 23 shows the preferred location on a house for attachment of a tomahawk connector 25, tee connector 22, banana clip 23, corner clip 33, gable connector 34, roof plate 36, metal facia plate 38, metal frieze plate 42, truss support 48, roof anchor 55, ridge plate 46, and center gable plate 62.

FIG. 23B

Figure 23A:
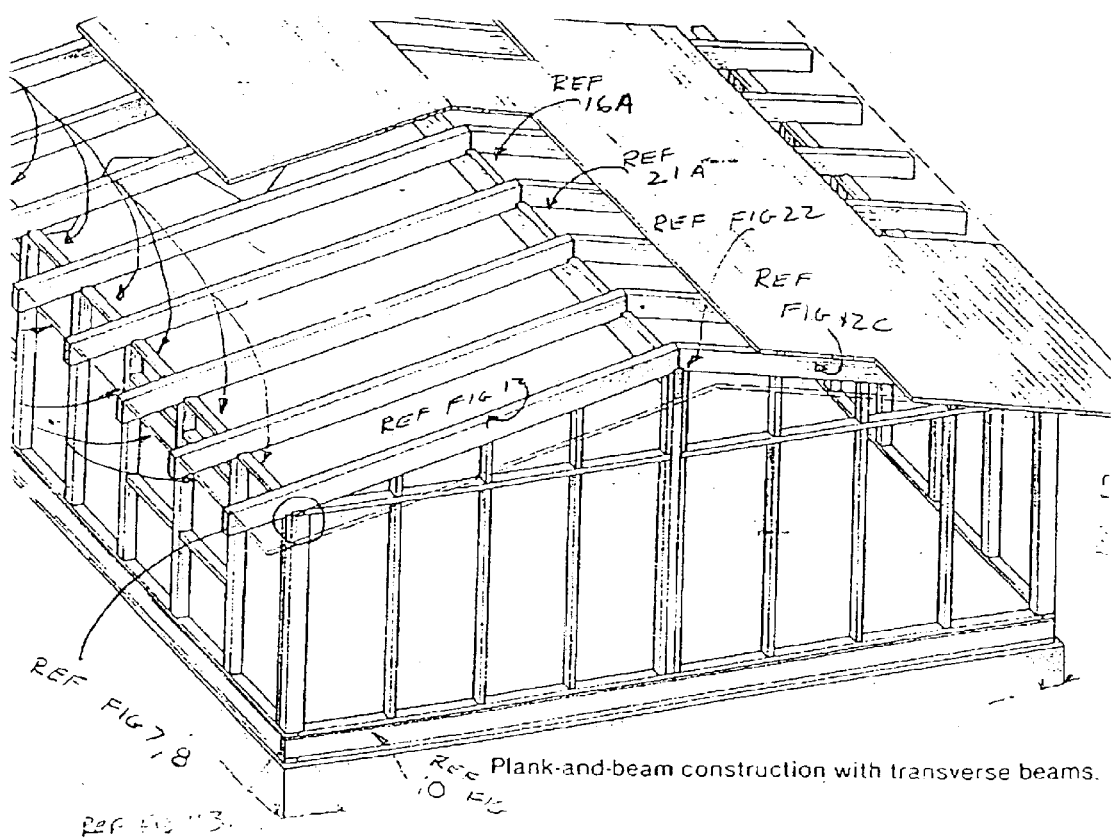
FIG. 23A is a perspective view of a house showing preferred locations for previous connectors.
Figure 23B:
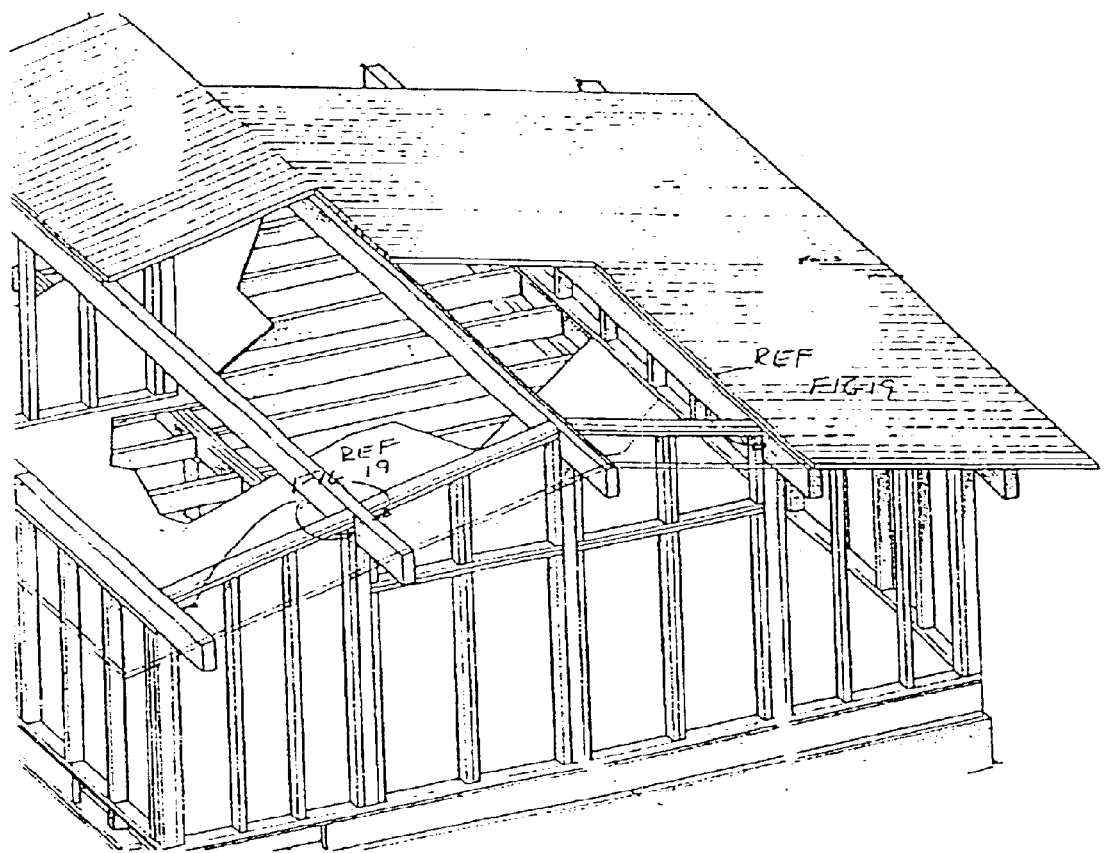
FIG. 23B is a perspective view of a house showing more preferred locations for previous connectors.

FIG. 23A shows several more preferred locations for a roof anchor 55.

Conclusion, Ramifications, and Scope of Invention

Thus the reader can see that the hurricane and seismic connectors and fasteners of this invention are unique, strong, permanent, functional, and necessary. They are also simple and economical to make, requiring simple tool and dies and no welding.

This invention solves the problem of retrofitting houses to minimize high wind and seismic dangers by using these ingenious and practical connectors and fasteners. Many homeowners stay in their house during hurricanes, because they do not want to be caught in traffic jams trying to escape the fury, or they are caught unaware.

While my above description contains many specificities, these should not be construed as limitations on the scope of the invention, but rather as an exemplification of one preferred embodiment thereof. Many other variations are possible.

For example, since the connectors are on the outside of a building, the shape can be changed slightly to make them more architecturally appealing on certain types of houses. To fit on some architectural styles of houses, the shape can be changed slightly without comprising the structural integrity of the clip. The thickness of the connector can be altered slightly, or have beveled edges or chamfer.

Rubber, plastic, foam, or resilient pad could be inserted between the connector and the outside sheathing. This would help absorb the earthquake forces without cracking, and deaden the shocks, and after-shocks.

The bushings could have a rubber washer or O-ring at the bearing surface in order to make the connection water-proof. This may allow the bushing to hold roof sheathing to the rafter, without letting water into the house. The bushings could use this rubber to reduce loading and deaden shocks from a seismic event.

The bushings could have plastic or PTFE between the bearing surfaces in order to have less friction between the bushing and the connector. This would allow the connection to be very tight, but still able to move slightly. Lag bolts with washers may be readably available, and could be used to fasten the connectors to a house.

To fit on an infinite variety of houses, the connectors could be made of two or more pieces. The pieces could be held together by nuts and bolts in slotted holes, so that the connector could be adjusted to go around ornamental or structural members on the outside of a house.

The invention could use different manufacturing techniques including manipulated sheet metal, casting, forging, extrusion, and plastic molds or injection. There can also be minor variations in color, size, and materials.

This invention was over-designed in order to exceed building codes in force or any that can be anticipated. Certain elements could be deleted from some embodiments, such as the screw in the Christmas tree bushing, but that would make them less effective in preventing damage to a home.

The embossments holes could be left out of several embodiments, but embossments make the holes stronger, less resistive to deflection, and more resistant to cracking. Lag bolts, nails, screws, or bolts and washers could be used to fasten the connectors to the house, if bushings are not available.

One die can be used to cut out FIG. 20A, and with the addition of punches can be used for four different configurations. FIGS. 19B and 19C can use one die for both pieces and can be used for every ridge beam and header by varying angles. Thus saving substantially on dies, storage, and less inventory. The bushing is designed with most holding done by bottom web where upload is greatest and doesn't damage as much of the wall sheathing. Rafter tabs are offset to prevent nail splitting.

I claim:

1. A retrofit connector for securing sheathing and underlying structural members of a building comprising:
   a. a generally flat plate having a generally arch-shape;
   b. said plate having a generally flat front and back;
   c. said front and back having a generally flattened arch-shape profile;
   d. said front having a generally smooth surface;
   e. a substantial part of said back having a plurality of barbs;
   f. the top part of said arch-shape having outer edges curved down for shedding moisture.

2. The connector of claim 1 wherein said flat plate having said arch-shape generally rounded and planer to said flat plate, whereby said front and back sides of said flat plate are flat and generally parallel to each other.

3. The connector of claim 1 wherein said arch-shape having a predetermined height and width for arrangement of a plurality of nail holes.

4. The connector of claim 1 wherein said arch-shape having a predetermined curvature whereby each end of said arch having a nail hole or attachment to a generally horizontal structural member, such as a sill plate, and a nail hole near the top of said arch for attachment to a generally vertical structural member, such as a wall stud.

5. The connector of claim 1 wherein said flat front and back having a predetermined area and a plurality of nail holes for attaching to outside sheathing and the underlying structural members of a building.

6. The connector of claim 1 wherein said front and back having a predetermined area that is substantially facing against the sheathing, and predetermined thickness for preventing said attached sheathing from splitting during strong wind and seismic events.

7. The connector of claim 1 wherein some barbs on said back having a predetermined arrangement and a predominately horizontal orientation for preventing uplift of said attached sheathing, and preventing detachment of said sheathing from said underlying structural members during strong winds.

8. The connector of claim 1 wherein some barbs on said back having predetermined arrangement and a predominately horizontal orientation for preventing lateral movement of said attached sheathing, and preventing detachment of said sheathing from said underlying structural members during seismic events.

* * * * *